United States Patent
Baratta

(10) Patent No.: US 6,955,167 B2
(45) Date of Patent: Oct. 18, 2005

(54) PAVEMENT WORKING APPARATUS AND METHODS OF MAKING

(75) Inventor: Anthony Baratta, Oak Park, CA (US)

(73) Assignee: Electrolux Professional Outdoor Products, Inc., Cleveland, OH (US)

( * ) Notice: Subject to any disclaimer, the term of this patent is extended or adjusted under 35 U.S.C. 154(b) by 102 days.

(21) Appl. No.: 10/101,473

(22) Filed: Mar. 18, 2002

(65) Prior Publication Data

US 2003/0172917 A1 Sep. 18, 2003

(51) Int. Cl.[7] .................................................. B28D 1/08
(52) U.S. Cl. ...................................... 125/21; 125/13.01
(58) Field of Search .............................. 125/12, 13.01, 125/14, 38

(56) References Cited

U.S. PATENT DOCUMENTS

| | | | |
|---|---|---|---|
| 3,124,998 A | | 3/1964 | Raehrs |
| 3,323,507 A | * | 6/1967 | Schuman .................... 125/14 |
| 3,722,497 A | * | 3/1973 | Hiestand et al. ............. 125/14 |
| 3,763,845 A | * | 10/1973 | Hiestand et al. ............. 125/14 |
| 3,988,285 A | | 10/1976 | De Vrieze ................. 260/33.6 |
| 4,306,479 A | | 12/1981 | Eberhardt |
| 4,557,245 A | | 12/1985 | Bieri |
| 4,631,012 A | | 12/1986 | Eckman |
| 4,702,124 A | | 10/1987 | Schleicher |
| 4,836,494 A | * | 6/1989 | Johnsen .................... 248/669 |
| 4,979,412 A | | 12/1990 | Anders ....................... 83/397 |
| 4,986,252 A | | 1/1991 | Holmes et al. |
| 4,989,686 A | | 2/1991 | Miller et al. |
| 4,998,775 A | | 3/1991 | Hollifield |
| 5,055,087 A | | 10/1991 | Koch ......................... 474/73 |
| 5,078,119 A | | 1/1992 | Holmes et al. |
| 5,245,770 A | | 9/1993 | Ko et al. |
| 5,299,885 A | | 4/1994 | Prassas et al. ............... 405/45 |
| 5,370,341 A | | 12/1994 | Leon |
| 5,588,418 A | | 12/1996 | Holmes et al. |
| 5,679,432 A | | 10/1997 | Holmquest et al. |
| 6,170,478 B1 | * | 1/2001 | Gorder ....................... 125/12 |
| 6,314,826 B1 | | 11/2001 | Cunningham et al. | |

FOREIGN PATENT DOCUMENTS

| | | |
|---|---|---|
| DE | 199 42 993 | 3/2001 |
| DE | 100 06 001 | 8/2001 |
| EP | 0 633 106 | 1/1995 |
| EP | 0 822 062 | 2/1998 |
| EP | 0 950 482 | 10/1999 |
| EP | 1 072 396 | 1/2001 |
| FR | 2 624 049 | 6/1989 |
| GB | 2 050 213 | 1/1981 |
| GB | 2 300 589 | 11/1996 |
| JP | 02076684 | 3/1990 |
| JP | 06039747 | 2/1994 |

OTHER PUBLICATIONS

DIMAS U.S.A., Instruction Manual, 360–1500H, Wall Saw, Operation Maintenance Parts, Issue No. 4144, Oct. 1, 1993, Torrance, CA.

DIMAS U.S.A., Instruction Manual, 360–2100S, Wall Saw, Operation Maintenance Parts, Issue No. 101, May 10, Torrance, CA.

COMPOSITETEK; Composites Design Guide; Sep. 1, 1999; Revision 1; Boulder, Colorado 80301.

"Neues Getriebe mit Timken–Wälzlager ausgerüstet", ATZ Automobil Technische Zeitschrift, Franckh ' Sche Verlagshandlung., vol. 94, No. 12, Dec. 1, 1992, p. 629.

* cited by examiner

Primary Examiner—Dung Van Nguyen
(74) Attorney, Agent, or Firm—Henricks, Slavin & Holmes LLP

(57) ABSTRACT

A portable machine, for example a saw, has a light construction using composite materials such as fiber reinforced resins and a closed cell foam. The saw may have a housing formed from multiple skins of the composite materials in which in the closed cell foam. Metallic inserts may be used to bond to either or both of the foam and the composite skin to accept working components. A saw is also described which uses gears sharing the same support element.

42 Claims, 50 Drawing Sheets

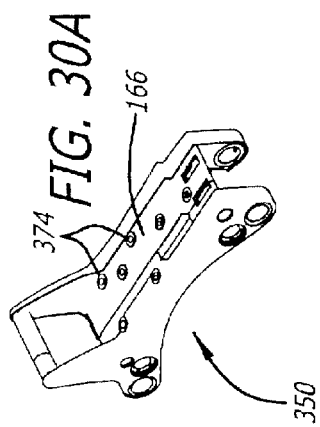
FIG. 30A
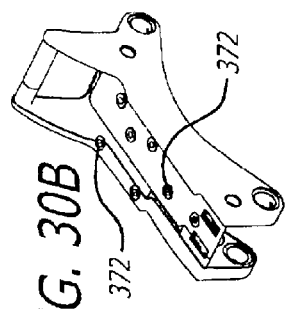
FIG. 30B
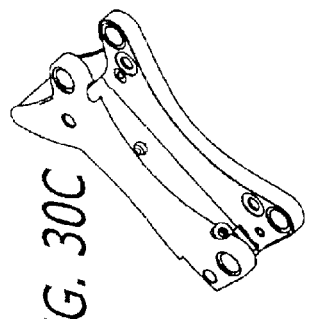
FIG. 30C
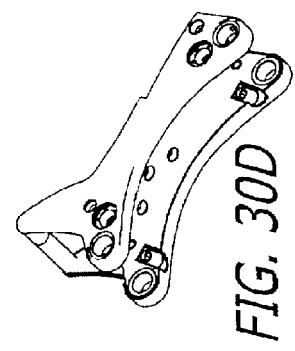
FIG. 30D
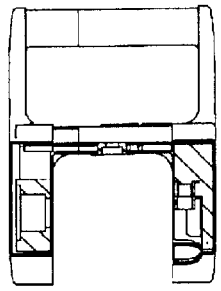
FIG. 30G SECTION B-B
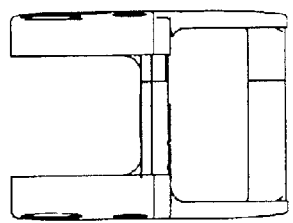
FIG. 30H
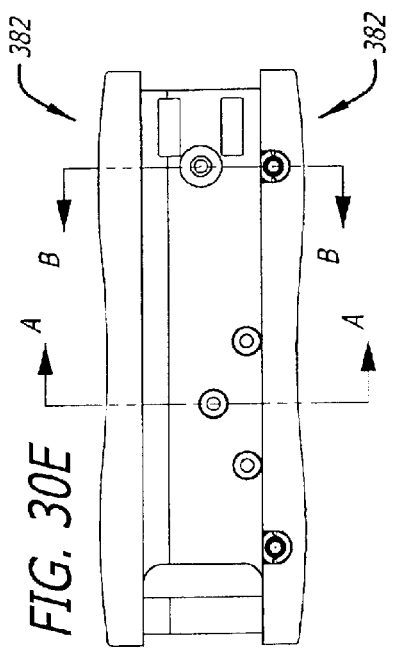
FIG. 30E
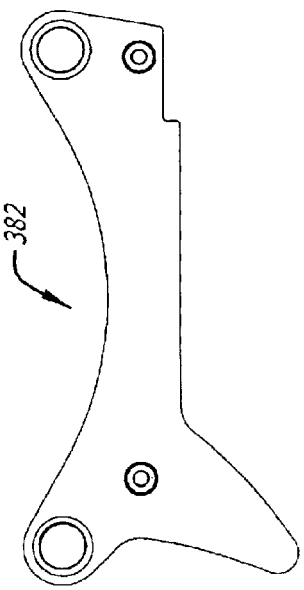
FIG. 30I
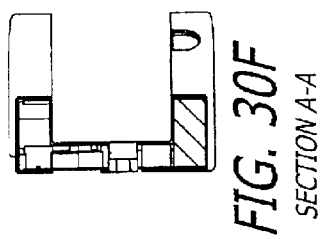
FIG. 30F SECTION A-A

SECTION A-A

SECTION B-B

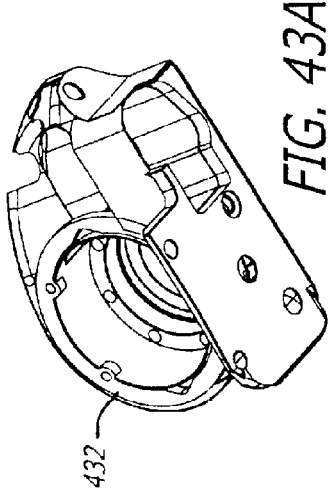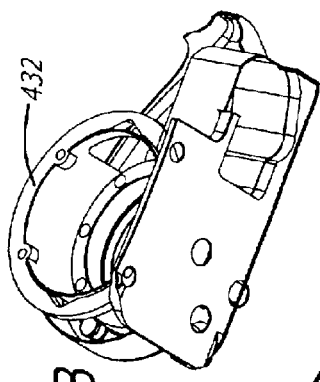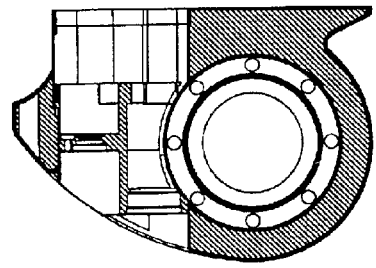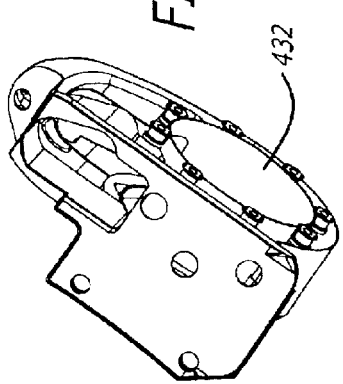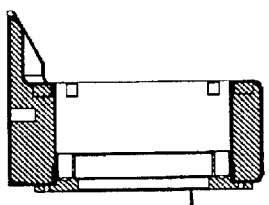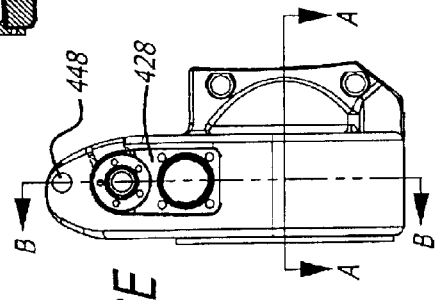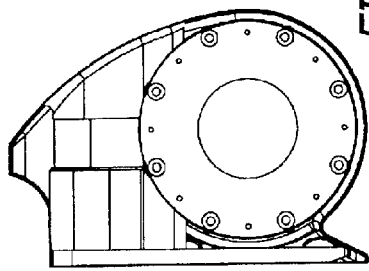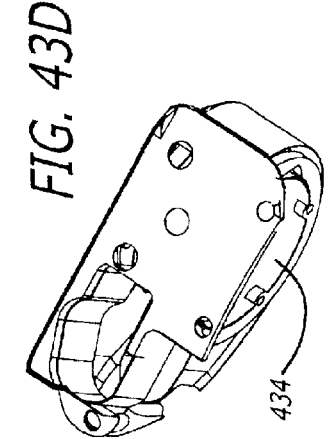

SECTION B-B

SECTION A-A

PAVEMENT WORKING APPARATUS AND METHODS OF MAKING

BACKGROUND OF THE INVENTIONS

1. Field of the Invention

This relates to movable machinery, including hand-held, portable, self propelled and similar machinery, and including saws, drills for example coring drills, cutting and grinding machinery and other machinery for treating concrete, paving, masonry and the like.

2. Related Art

Machinery design for movable machinery takes into account the function of the machinery, strength and reliability, cost of materials and similar considerations. Machine design sometimes results in machines that are difficult to maneuver and heavy. Depending on the application, machinery such as saws are made primarily of metal parts and sometimes plastic housings, switches or controls to lower the weight of the product.

While it should be understood that the present inventions may apply to a wide variety of different types of movable machinery, the present discussion and examples will be directed to wall saws, such as those used to cut lines or openings in walls, such as those made by Dimas and sold under model number 360-1500H or 360-2100S, the instruction manuals for which are incorporated herein by reference. Elements of model No. 360-2100S are also described in U.S. Pat No. 5,588,418, also incorporated herein by reference.

One example of a wall saw is shown in FIGS. 1–2, in which are shown a concrete wall 100 (FIG. 1) a track 102 mounted to the wall through clamps 104 and having a gear track 106 along which the saw 108 travels. A typical saw includes a carriage 110, a bearing housing and assembly 112, a gearbox 114, saw blade 116 and a blade guard 118 (FIGS. 1 and 2).

Considering the saw and track in more detail with respect FIG. 2, the bracket 104 includes leveling screws 120 and track 102 is mounted to the brackets 104 through cap screws 122. The saw is mounted and retained on the track through retention rollers 124 positioned at least at respective ends of four legs extending downwardly from the carriage 110 alongside the track. Only one retention roller 124 is shown in FIG. 2. A plurality of guide rollers 126 are supported by the carriage 110 and guide the carriage along the track. A manual travel control 128 is accessible from the top of the saw. The travel control 128 is turned with a suitable wrench so as to move a gear (not shown) under the carriage along the track rack 106 through a series of intermediate gears.

The bearing housing and assembly 112 include an outer housing 130 and suitable gears, drive shaft and bearings. The assembly 112 receives drive input from a hydraulic drive motor (not shown) mounted to the housing opposite the gearbox 114 and drives the saw blade through the gearbox 114. The assembly 112 also includes gears for positioning the blade relative to the work piece, such as the concrete wall 100.

A blade depth control 132 is also accessible from the top of the saw. It is turned with a suitable wrench so as to move the gear (not shown) in the bearing assembly 112 which then pivots the gearbox about the drive shaft, which in turn adjusts the position of the saw blade relative to the work piece.

The gearbox 114 transmits drive power to the saw blade mounted to a blade drive shaft through inner and outer blade flanges 134. The blade flanges 134 also include internal structures for passing fluid along the sides of the saw blade. A blade guard coupler 136 mounts a blade guard support 138 to a blade guard support bracket for supporting the blade guard.

SUMMARY OF THE INVENTIONS

Methods and apparatus are described for producing a portable machine, for example a wall saw, having a light construction. Methods and apparatus are also described for producing a portable machine having light components and having strength sufficient to operate as a portable machine, for example in a wall saw. Methods and apparatus are discussed for producing components of a portable machine that can form a final assembly wherein at least one or part of one of the components is formed as a composite material, at least one component of which is plastic, for example a thermosetting resin. Methods and apparatus are also disclosed that can produce a portable machine that is more versatile and easier to use.

In one example of methods and apparatus disclosed herein, a portable machine, in one example a wall saw, is formed with at least one housing formed from a composite material. In one example, the composite material includes fibers, for example carbon fibers, glass fibers, Kevlar or other reinforcing material, the composite material may include a thermosetting resin, and the material may include both a reinforcing fiber and a thermosetting resin. In an example of a component made with a composite material, a carriage for a wall saw is formed with composite material skins. In another example of a component made with a composite material, a bearing housing for a wall saw is formed with composite material skins, and in another example a travel gear housing is formed from a composite material. In a further example, a gearbox is formed from a composite material, and in another example a gearbox is formed from a combination of composite material and metal to form the gearbox housing and support for the gears and bearings. In a preferred form, the skin thickness ranges from about 0.030 inch to about 0.060 inch, with areas having greater strength having a greater thickness. In another preferred form, the skin is formed from about six layers of fiber, and may also be formed from four layers, five layers, seven layers or eight layers.

In a further example of methods and apparatus disclosed herein, a portable machine, for example a wall saw, includes least one component formed with a housing formed from multiple skins of composite material. The skins include edge portions which preferably overlap each other. In a further preferred form, the overlapping edge portions adhere to each other. In a still further preferred form, the overlapping edge portions adhere to each other through an adhesive, for example an epoxy adhesive. In a preferred form, the adhesive thickness is about 0.005 inch and may be somewhat higher up to about 0.010 inch or somewhat lower.

In another example of methods and apparatus disclosed herein, a portable machine, for example a wall saw, is formed with at least one component assembled from a composite skin and a foam core or body to form a housing for components or to form a support structure, for example a carriage. In one form, the foam core is formed of a closed cell foam. In another example, the composite skin and the foam are bonded, adhered or fixed together. Preferably, the composite skin and the foam are bonded with an adhesive, for example an epoxy adhesive. In another form, the foam core is formed from multiple pieces of foam, adjacent ones of which are adhered or bonded or fixed to each other, for example by an adhesive. In another example, more than one component is assembled from a composite skin and foam core or body. In still another example, all of the housing's enclosing or supporting moving components such as gears, shafts and the like are formed from a composite skin and foam core or body. In a further example, where he composite skin and foam are to be bonded together, the composite skin can be formed with an attached etching paper, which can later be peeled or pulled off to give a rough surface for receiving the adhesive for bonding the composite with the foam. In another example, where a closed cell foam is used within a composite skin in a component for a portable machine, the closed cell foam is preferably at least 60 percent closed cell and preferably in a range from 80 percent to 98 percent, and more preferably about 96 percent. Where closed cell foam's are used, the closed cell foam is preferably a high-density foam.

In an additional example of methods and apparatus disclosed herein, a portable machine, for example a wall saw, is formed with at least one component assembled from a composite skin and inserts wherein the inserts are configured to receive other components. In several examples, the other components can be fasteners, component housing's, bearing supports, motor supports, component mounts, and the like. The inserts are preferably bonded, adhered or otherwise fixed to portions of the composite skin. In a further example, at least one component of a portable machine, for example a wall saw, is formed with a housing having at least one component as a composite skin, a foam core or body and inserts, and at least two and preferably each of the composite skin, foam core and inserts are bonded or adhered to adjacent ones of the other. For example, a portion of the composite skin and an adjacent insert can be bonded together, a foam core and an adjacent insert can be bonded together or a composite skin and an adjacent foam core can be bonded together. Where a given insert is adjacent both a composite skin and a portion of foam, the insert is preferably bonded to each. In those examples using either a composite skin and a foam, a composite skin and inserts, or a foam and inserts, or any combination thereof, the equipment, procedures and materials used by Composite Tek of Boulder, Colo., or a similar company are preferably used. Possible techniques and configurations for components described herein can be found in their Composites Design Guide, Revision 2, incorporated herein by reference.

In one example of methods and apparatus disclosed herein, a portable machine, for example a wall saw, is formed with at least one component having a housing formed from a composite skin coated with a UV absorbing material. For example, a carriage, bearing housing, motor mount, and/or gearbox have housing's formed from composite materials coated with a UV absorbing material. In one example, the composite material may be coated with a PPG high-grade UV protecting clear coat automotive paint.

In another example of methods and apparatus disclosed herein, a portable machine, for example a wall saw, includes several transmission components, such as gears, supported on a common support, such as a common shaft. For example, idler gears may be supported on common or coaxial shafts. In the example of a wall saw, a gear for driving the saw blade may be supported on the same axis, and may be coaxial with, the gear used to keep the blade guard level relative to the work surface such as a concrete wall. In another example, the saw blade may have a blade shaft drive gearing ratio of 3.512:1, and the blade guard leveling gears may have a ratio of 1:−1.

A further example of methods and apparatus disclosed herein include a portable machine, for example a wall saw, having two drive gears, wherein a given drive gear is used to engage a track rack with the saw oriented in one direction and the other drive gear is used to engage the track rack with the saw oriented in another direction. This allows, for example, a track having an offset rack to be used with the saw going in either direction without having to reorient the track.

In an example of methods and apparatus disclosed herein, a portable machine, for example a wall saw, is formed with at least one component having a housing formed from at least one of and preferably both a composite and a foam with metal inserts bonded to one or both of the composite and the foam. Preferably, the inserts are formed from AL4-6V titanium or from 2024-T351 aluminum that is hard anodized. These materials are lightweight, minimize galvanic action between the metal and carbon fiber and have high material yield properties. The gears may be formed from stainless steel, such as 416 stainless or 86L20 alloy, and the shafts may be stainless as well, but they may be lighter if formed from heat-treated aluminum or from titanium.

These and other aspects of the present inventions can be considered in more detail in conjunction with the drawings, a brief description of which follow, and the detailed description.

BRIEF DESCRIPTION OF THE DRAWINGS

FIG. 30A is a right front isometric view of a carriage for use with the saw of FIG. 3.

FIG. 30B is an upper left isometric view of the carriage of FIG. 30A.

FIG. 30C is a lower left isometric view of the carriage of FIG. 30A.

FIG. 30D is a lower right isometric view of the carriage of FIG. 30A.

FIG. 30E is a bottom plan view of the carriage of FIG. 30A.

FIG. 30F is a vertical transverse cross-section of the carriage of FIG. 30E taken along line A—A.

FIG. 30G is a vertical transverse cross-section of the carriage of FIG. 30E taken along line B—B.

FIG. 30H is an inverted front view of the carriage of FIG. 30A.

FIG. 30I is an inverted left side view of the carriage of FIG. 30A.

FIG. 43A is a bottom left front isometric view of foam and metal inserts for the bearing housing of FIG. 42A.

FIG. 43B is a bottom left rear isometric view of the inserts of FIG. 43A.

FIG. 43C is a bottom left isometric view of the inserts of FIG. 43A.

FIG. 43D is a bottom right rear isometric view of the inserts of FIG. 43A.

FIG. 43E is a bottom plan view of the inserts of FIG. 43A.

FIG. 43F is a front sideways view of the inserts of FIG. 43A.

FIG. 43G is a left side view of the inserts of FIG. 43E.

FIG. 43H is a vertical transverse section of the inserts of FIG. 43E taken along line A—A.

FIG. 43I is a vertical longitudinal cross-section of the inserts of FIG. 43E taken along line B—B.

DETAILED DESCRIPTION OF THE PREFERRED EMBODIMENTS

The following specification taken in conjunction with the drawings sets forth the preferred embodiments of the present inventions in such a manner that any person skilled in the art can make and use the inventions. The embodiments of the inventions disclosed herein are the best modes contemplated by the inventor for carrying out the inventions in a commercial environment, although it should be understood that various modifications can be accomplished within the parameters of the present inventions.

A movable or portable machine is described which is lighter than conventional counterparts, and which can be made more reliable. Methods and apparatus are also described for making an improved movable or portable machine, for example a portable machine for working on work piece, in the disclosed example a wall saw. While the disclosed example is directed to a wall saw, the inventions can be applied to other portable machines, including hand-held machines and power tools, portable machines and power tools, self propelled machines and power tools, as well as other movable machines for operating on surfaces and work pieces. The inventions can be applied to machines used to work on concrete, pavement and other masonry forms or products, of which a wall saw and core drill are several examples. The wall saw described herein is an example of a device well-suited to application of the present inventions.

Figure 1:
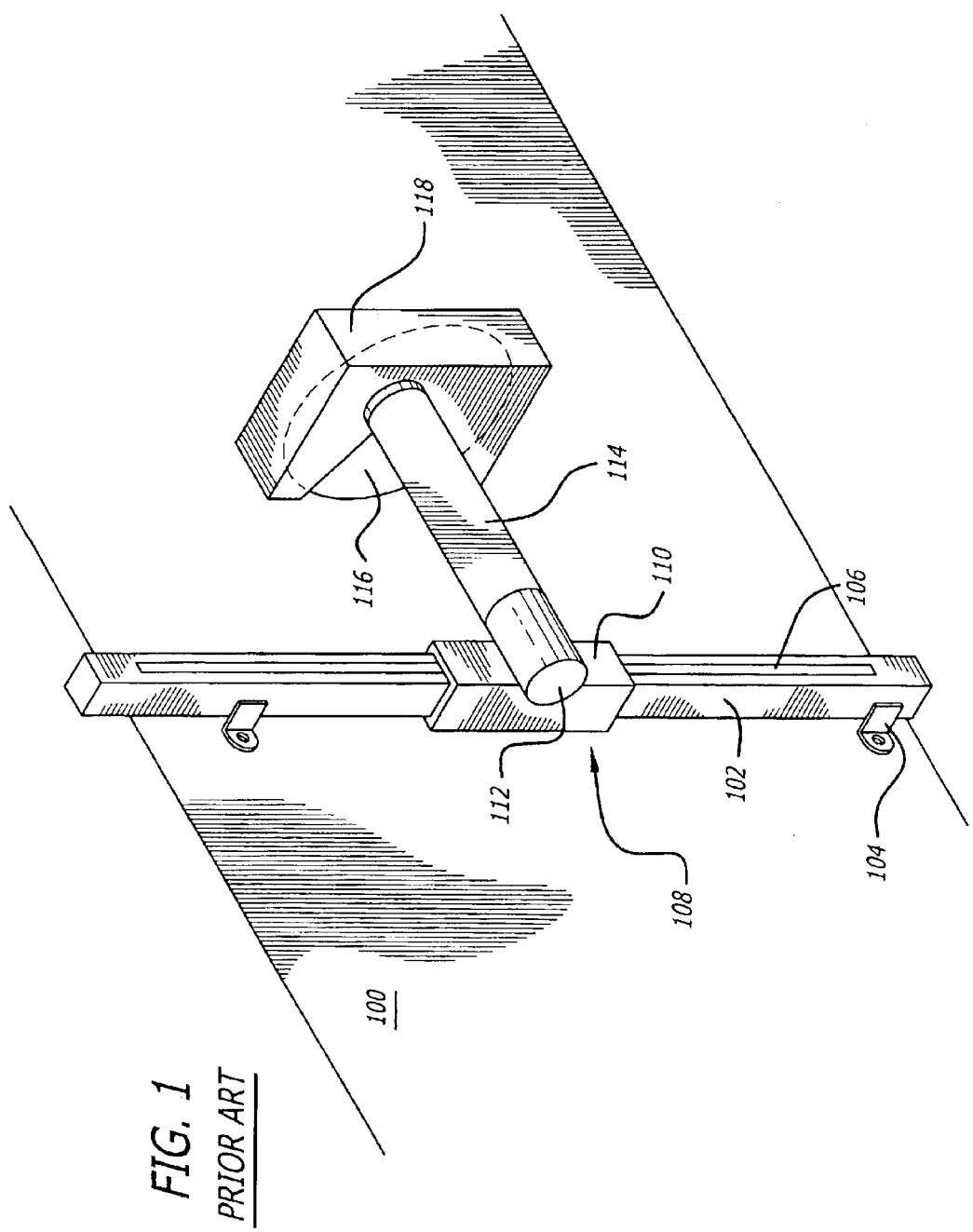
FIG. 1 is a schematic of an isometric view of a wall saw representing one example of a movable machine that can incorporate one or more of the present inventions.
Figure 2:
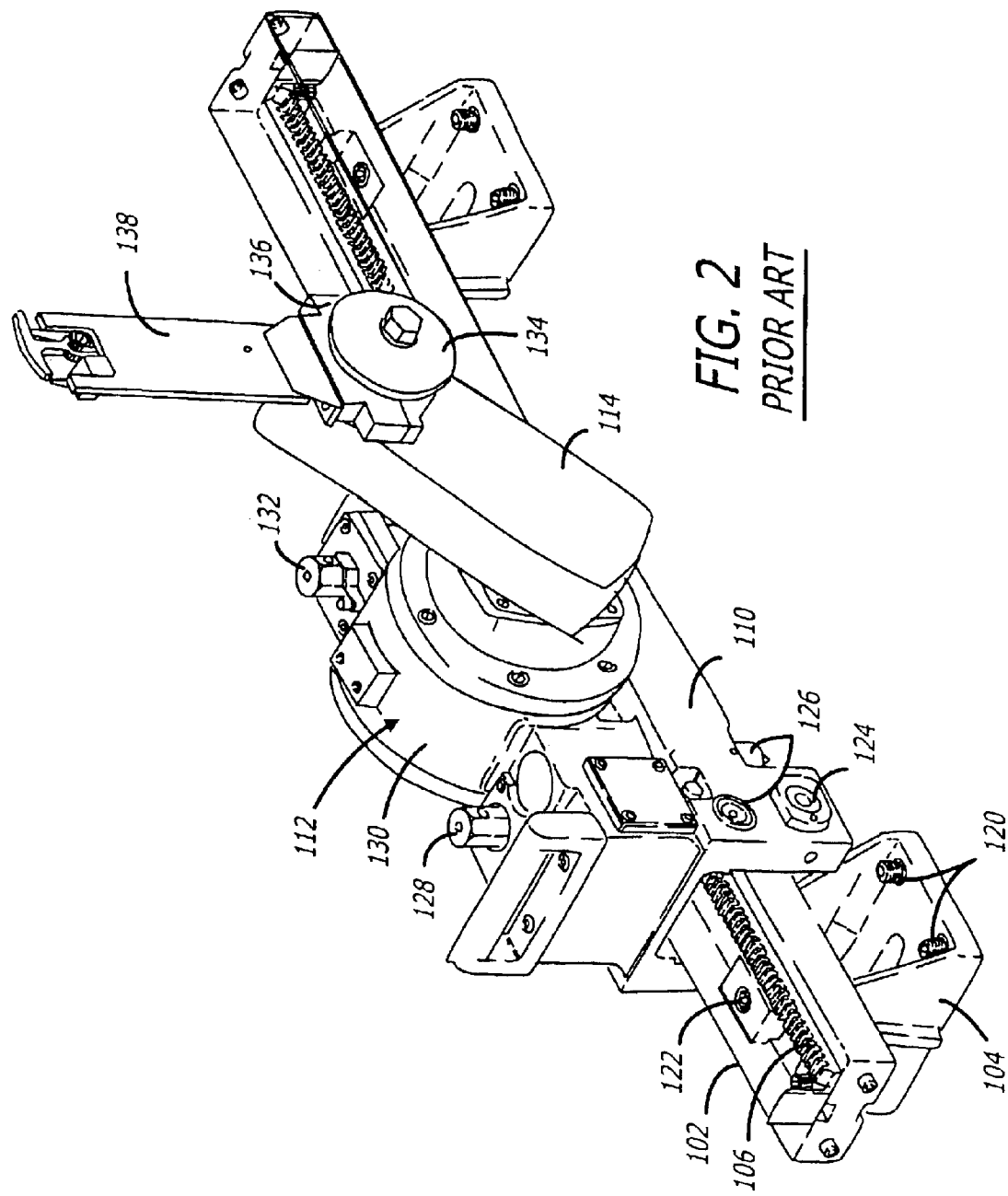
FIG. 2 is a front left side isometric view of a conventional wall saw on a track.
Figure 3:
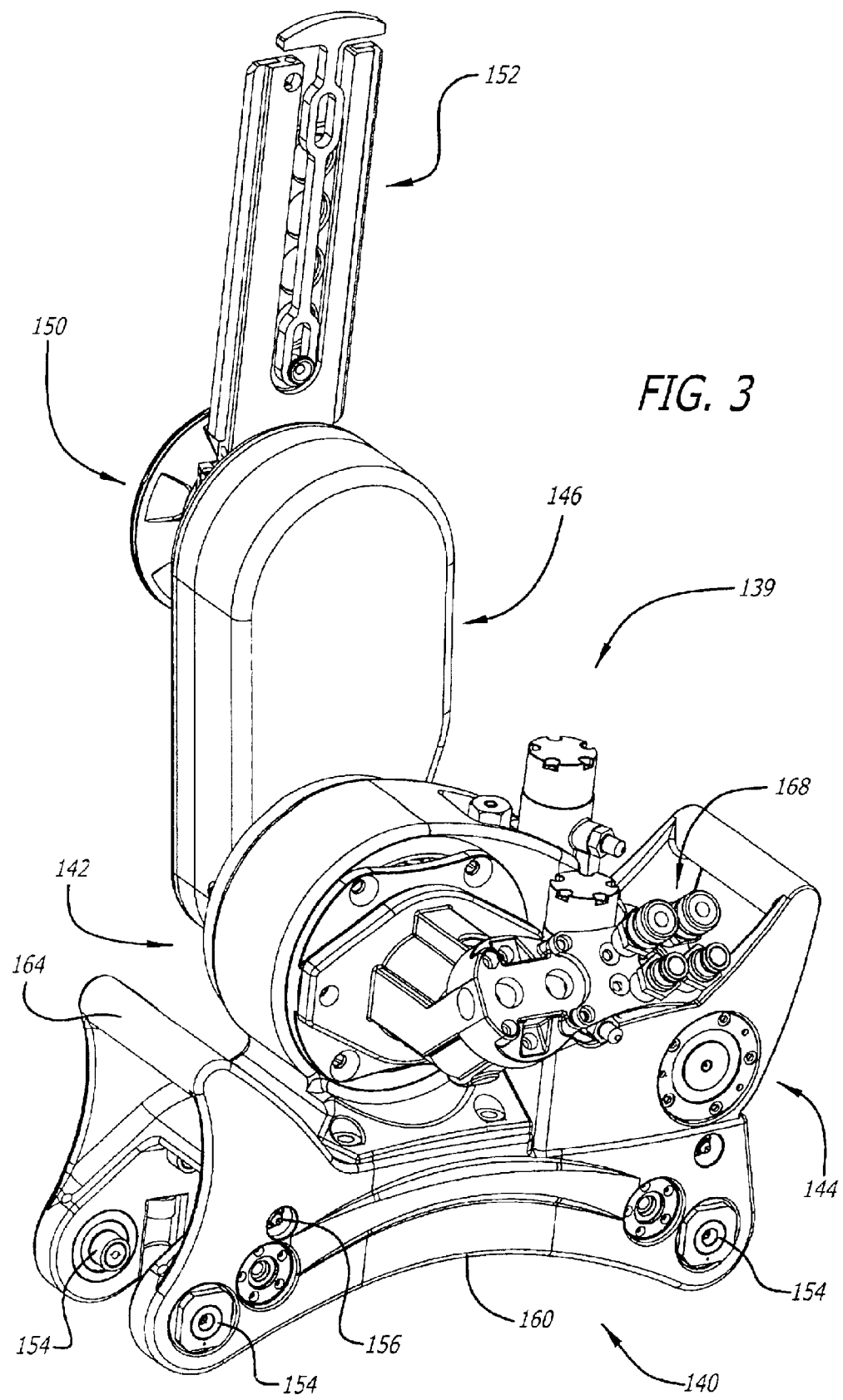
FIG. 3 is a right side and rear isometric view of one example of a wall saw incorporating several aspects of the present inventions.
Figure 4:
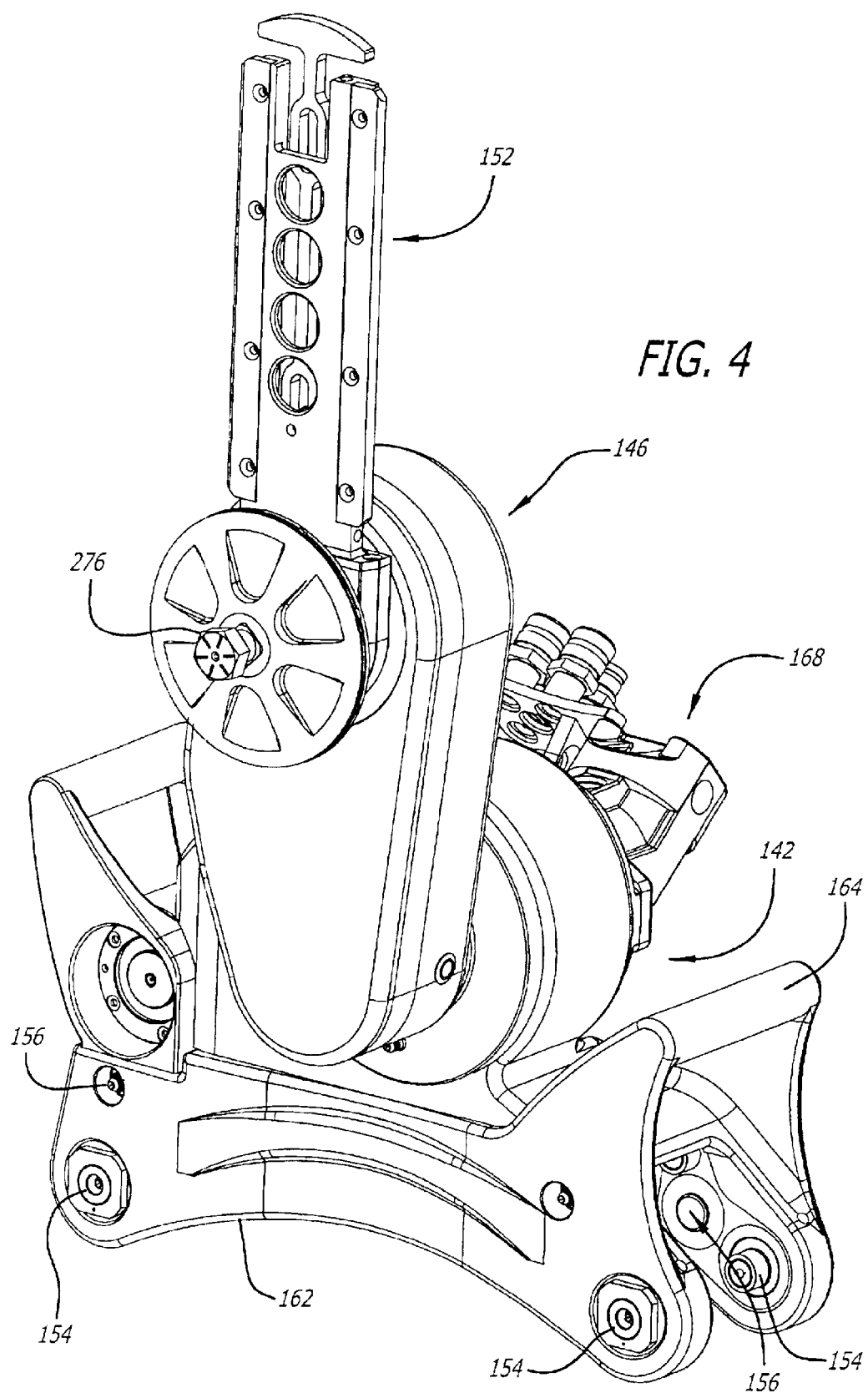
FIG. 4 is a left side and rear isometric view of the saw of FIG. 3.

A wall saw such as may be used with the track 102 of FIG. 1 may include a carriage 140, a bearing assembly 142, a travel assembly 144 which may include a saw drive mechanism for moving the wall saw along a work surface, a gearbox assembly 146 and blade flanges 150 for supporting a saw blade (not shown) and a blade guard support 152 for supporting a blade guard (not shown) (FIGS. 3–9). The blade guard support 152 may be a conventional structure, as may be the blade flanges 150. The carriage includes lower roller assemblies 154, which may be conventional roller assemblies or Nylatron roller assemblies, or combinations of the two. Preferably, at least one set of roller assemblies are eccentric rollers for permitting adjustment of the carriage position on the track. The carriage 140 also preferably includes a set of corresponding upper roller assemblies 156, which are preferably conventional roller assemblies. One or more side roller assemblies 158 may also be included. Each of the rollers are supported in the carriage 140 by respective inserts, described more fully below. The carriage also includes a right side wall 160 (FIG. 3) and a left side wall 162 (FIG. 4), a handle 164 and a platform 166 extending generally horizontally between the right side wall and left side wall (FIG. 30A) for supporting the bearing assembly 142 and the travel assembly 144, also as described more fully herein.

Figure 5:
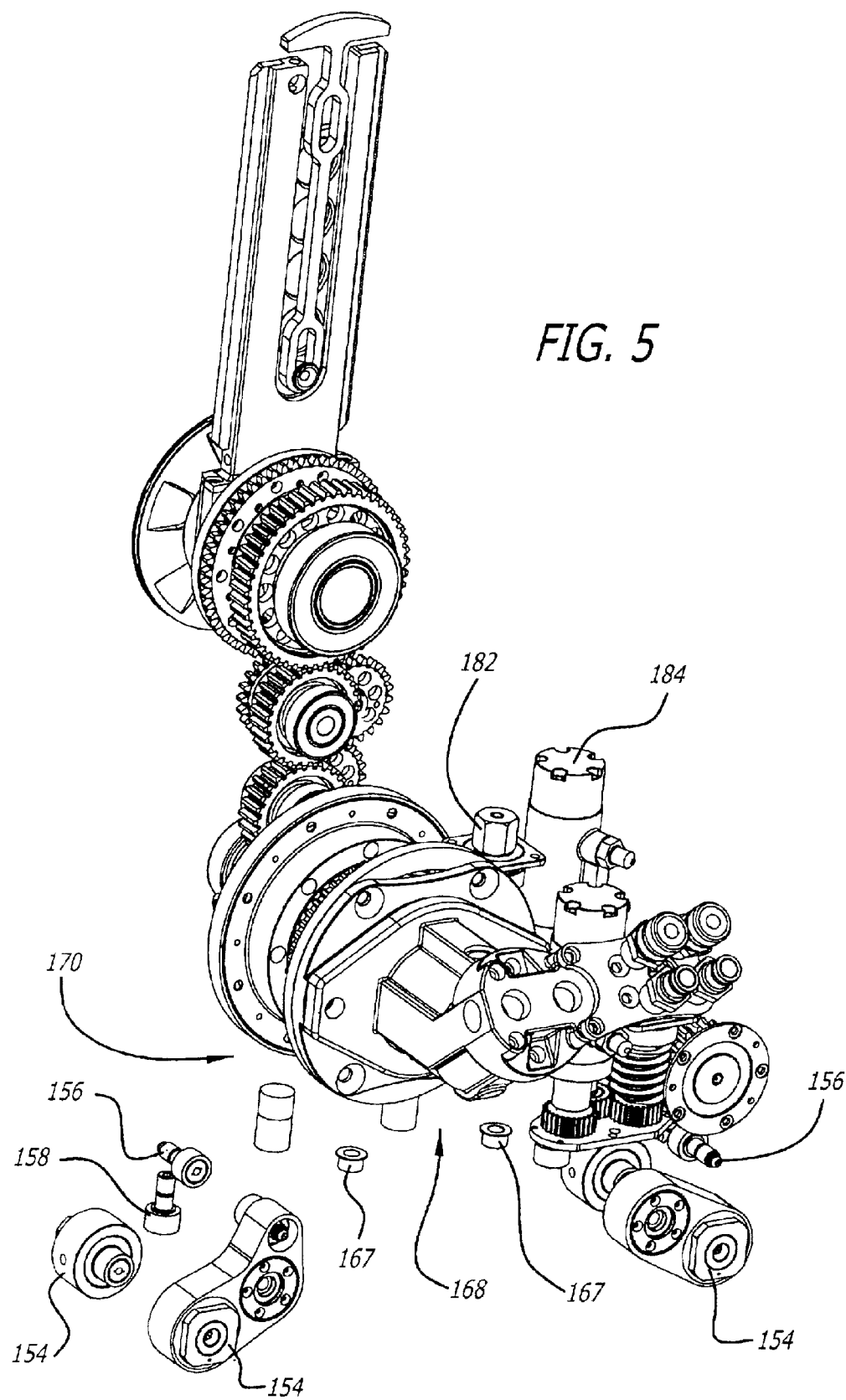
FIG. 5 is a right side and rear isometric view of the saw of FIG. 3 showing the working components of the saw and the housing components in phantom.
Figure 6:
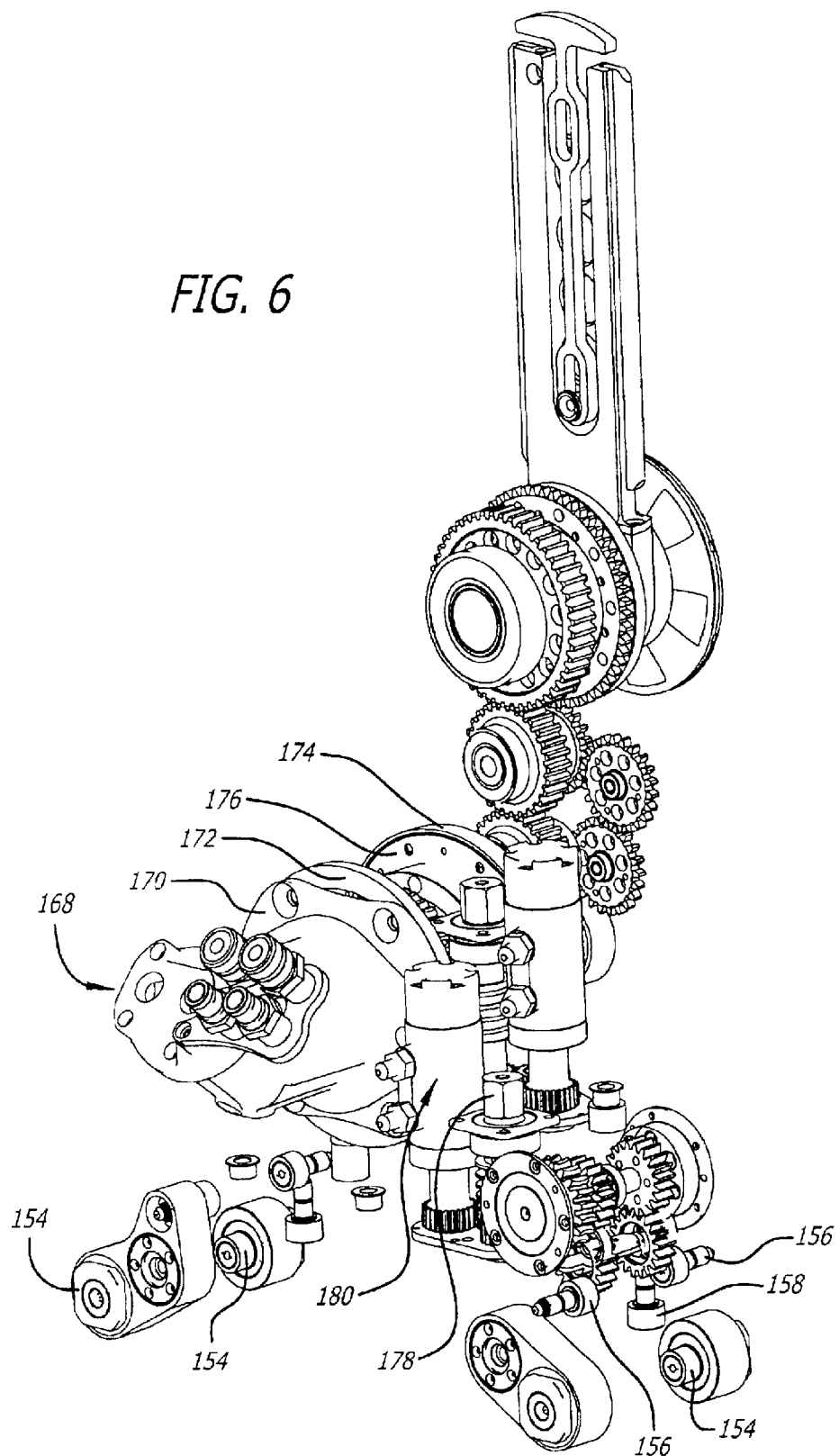
FIG. 6 is a right side and front isometric view of the saw of FIG. 3 showing the working components of the saw and the housing components in phantom.
Figure 7:
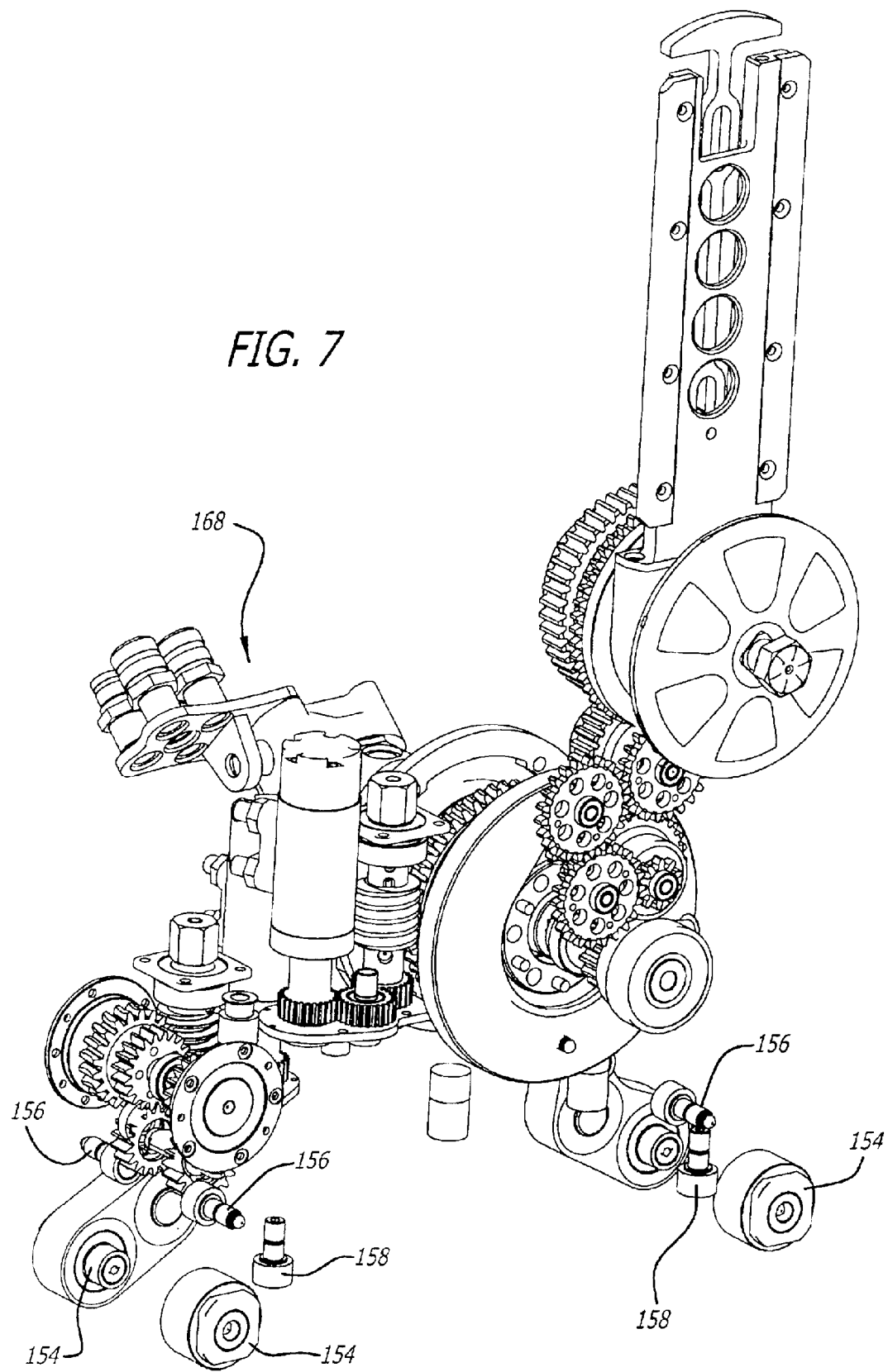
FIG. 7 is a left side and front isometric view of the saw of FIG. 3 showing the working components of the saw and housing components in phantom.
Figure 8:
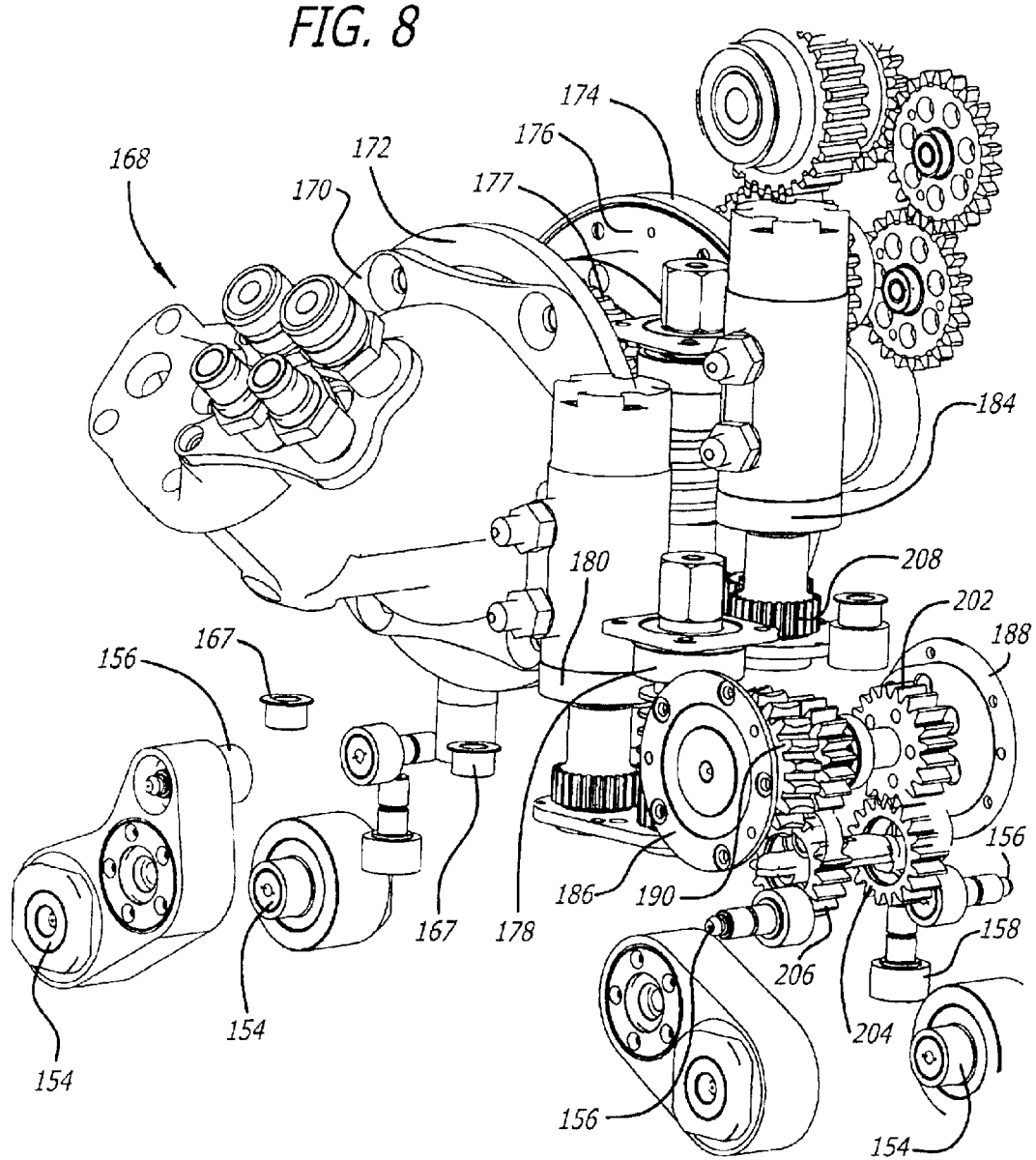
FIG. 8 is an enlarged view of FIG. 6.
Figure 9:
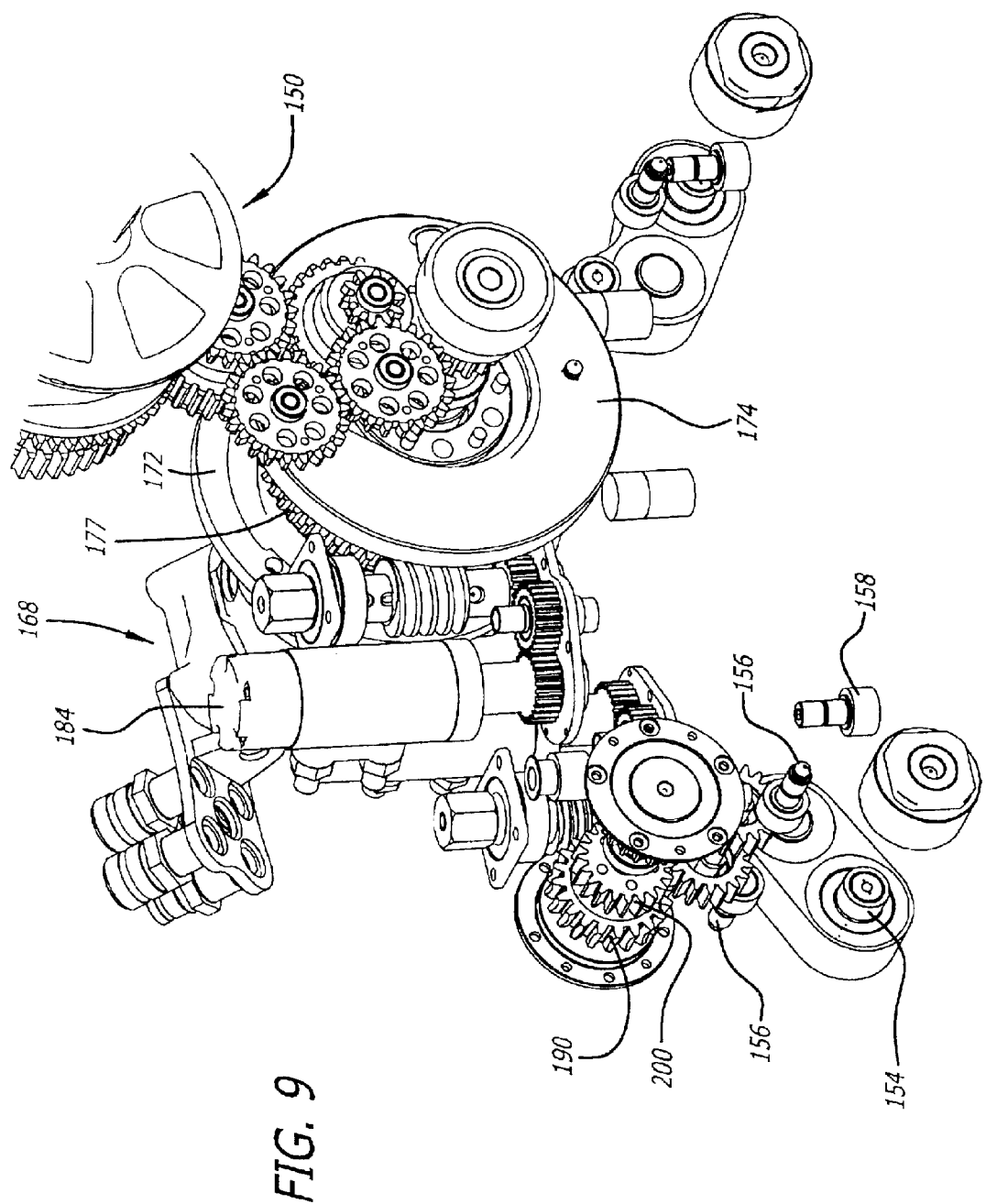
FIG. 9 is an enlarged view of FIG. 7.
Figure 10:
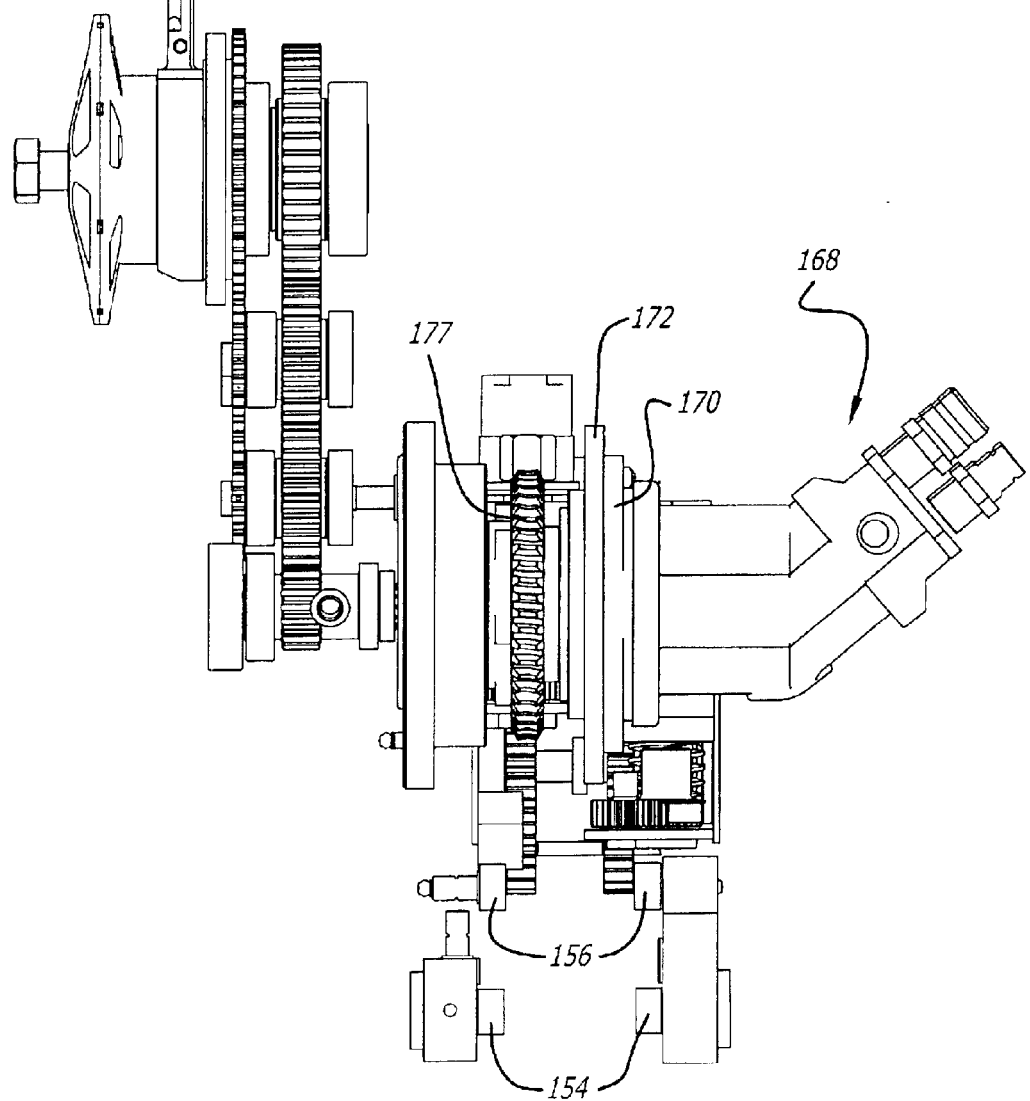
FIG. 10 is a rear elevation view of the working components of the saw of FIG. 3 with the housing components in phantom.
Figure 11:
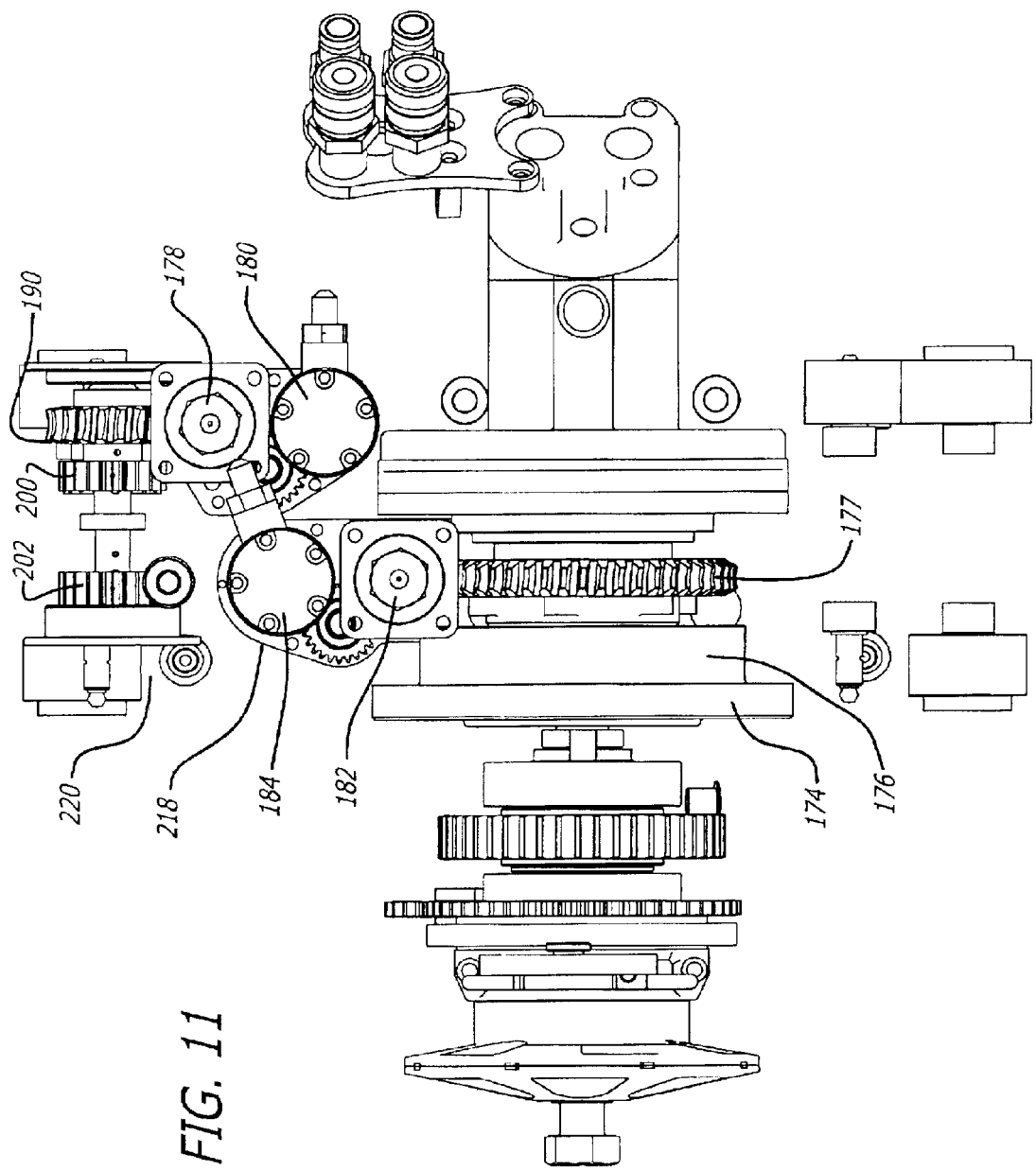
FIG. 11 is a top plan view of the working components of the saw of FIG. 3 with housing components and phantom.

The bearing assembly 142 is mounted and fixed to the carriage 140 through appropriate fasteners engaging respective inserts 167 (FIGS. 5, 8). The bearing assembly 142 has a conventional hydraulic motor assembly 168 mounted to a bearing housing mounting plate 170 (FIGS. 5, 6, 8 and 10). The hydraulic motor drives the saw blade through the saw blade drive train described more fully below. The mounting plate 170 is fastened to and supported by a hydraulic motor mount insert 172 supported and bonded or adhered to the inside of the right skin of the bearing housing. The insert is preferably titanium AL46V, as titanium is intended to support a heavier load than the hard anodized aluminum 2024 T351. The bearing housing also includes suitable bearings and seals about the main shaft through the bearing housing for supporting the main shaft in the housing. A second insert 174 in the bearing housing opposite the insert 172 is bonded or otherwise adhered to the inside of the left bearing housing skin for supporting a gearbox mount 176, which is supported on the main shaft by appropriate bearings and sealed by appropriate seals. The bearing housing also supports on the main shaft a gearbox rotation worm mating gear 177 (FIGS. 8–16). The worm mating gear 177 is driven by the gearbox rotation drive assembly for changing blade position or blade depth.

The travel assembly 144 includes a manual travel control 178 and a hydraulic travel control motor 180 (FIGS. 6 and 8) drive the travel gear train. A manual blade level control 182 and a hydraulic gearbox rotation motor 184 (FIGS. 5 and 11) control the level of the blade guard through rotation of the gearbox assembly. Both of the travel controls and blade level controls are mounted in and supported by the travel assembly 144, which in turn is supported by the carriage 140. The travel assembly 144 is mounted to the carriage 140 through appropriate fasteners engaging inserts in the carriage.

Figure 12:
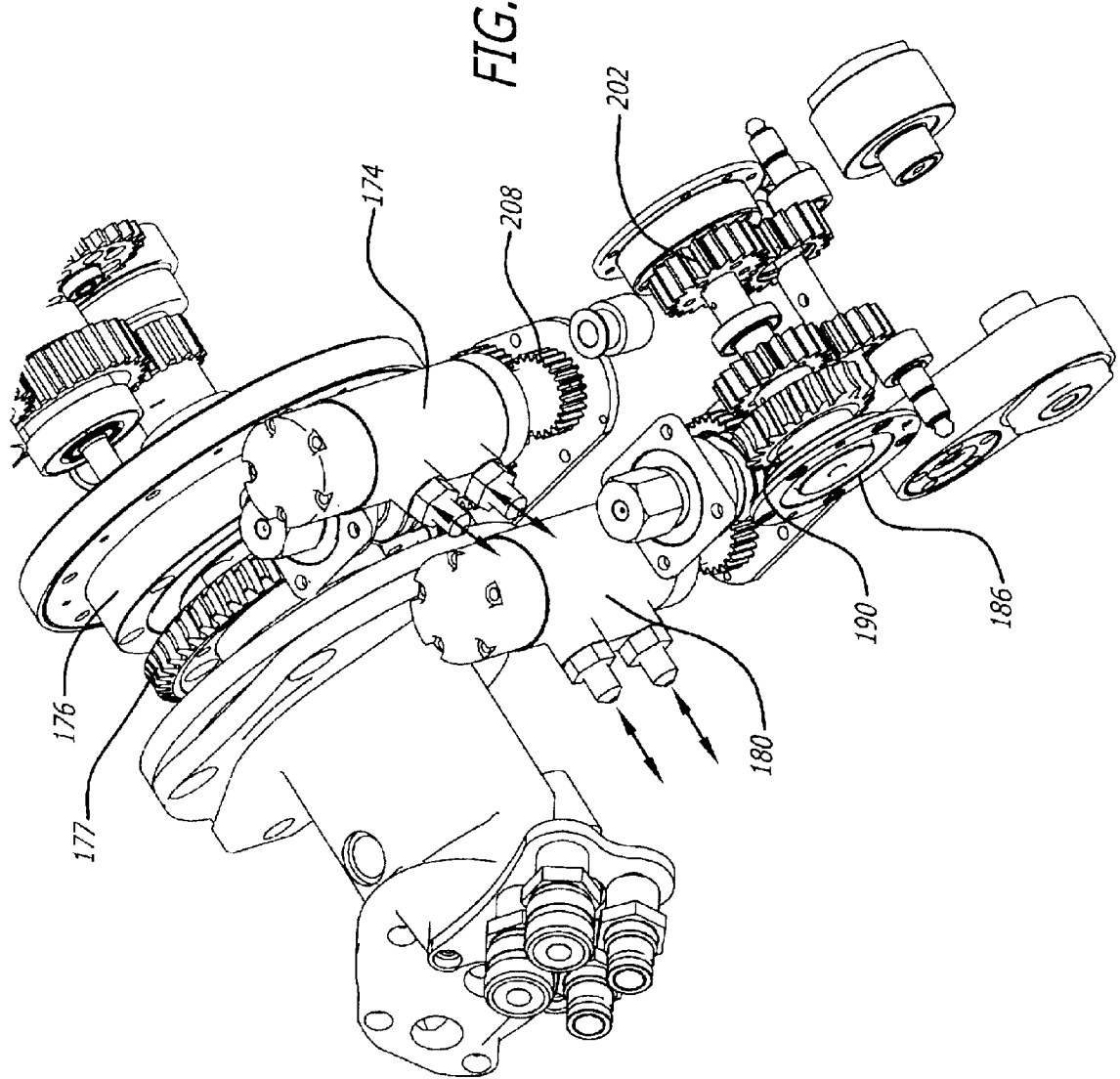
FIG. 12 is an upper right front isometric view of FIG. 6.
Figure 13:
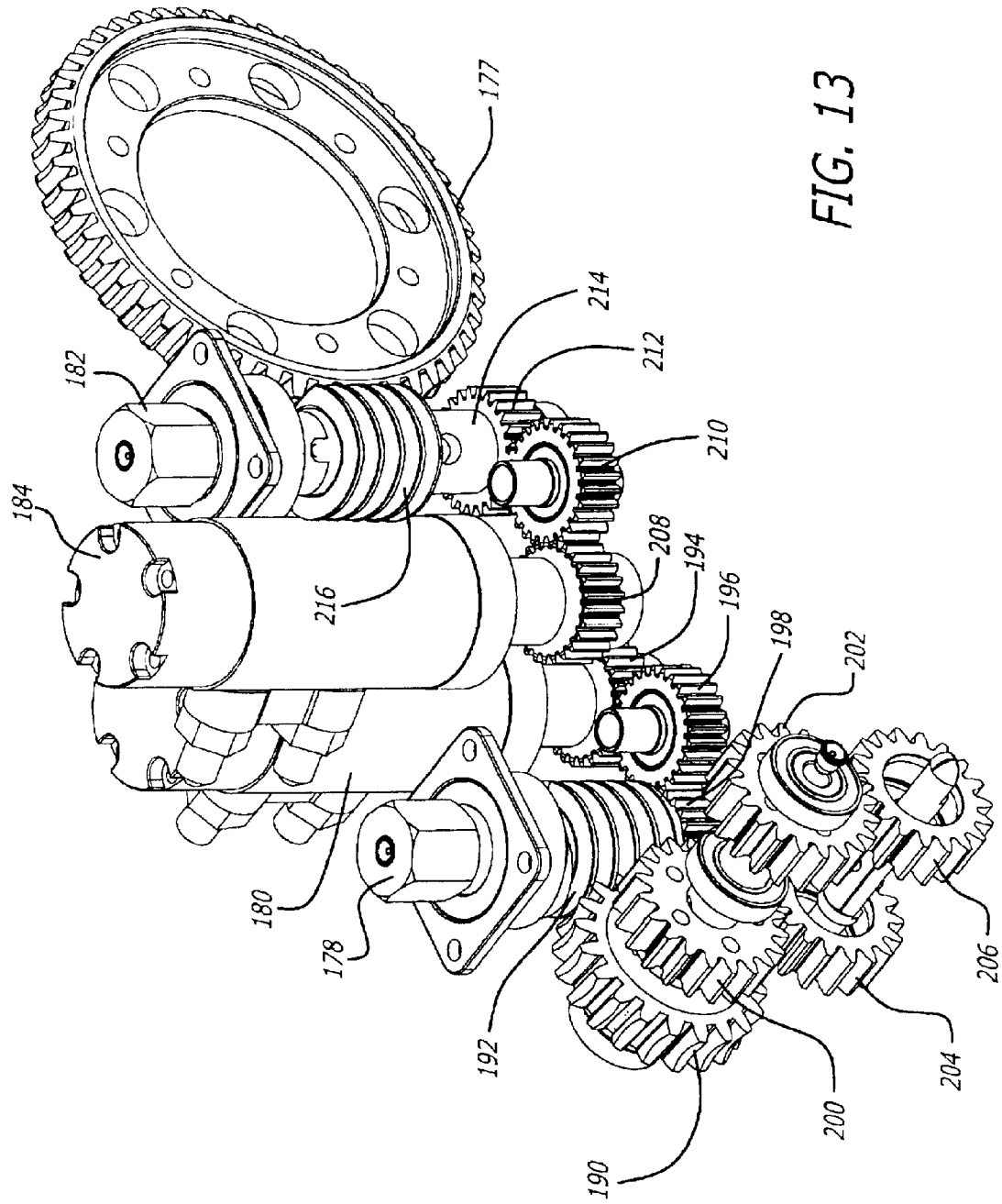
FIG. 13 is and upper left front isometric view of the travel drive assembly and the blade height drive assembly of the saw of FIG. 3.
Figure 14:
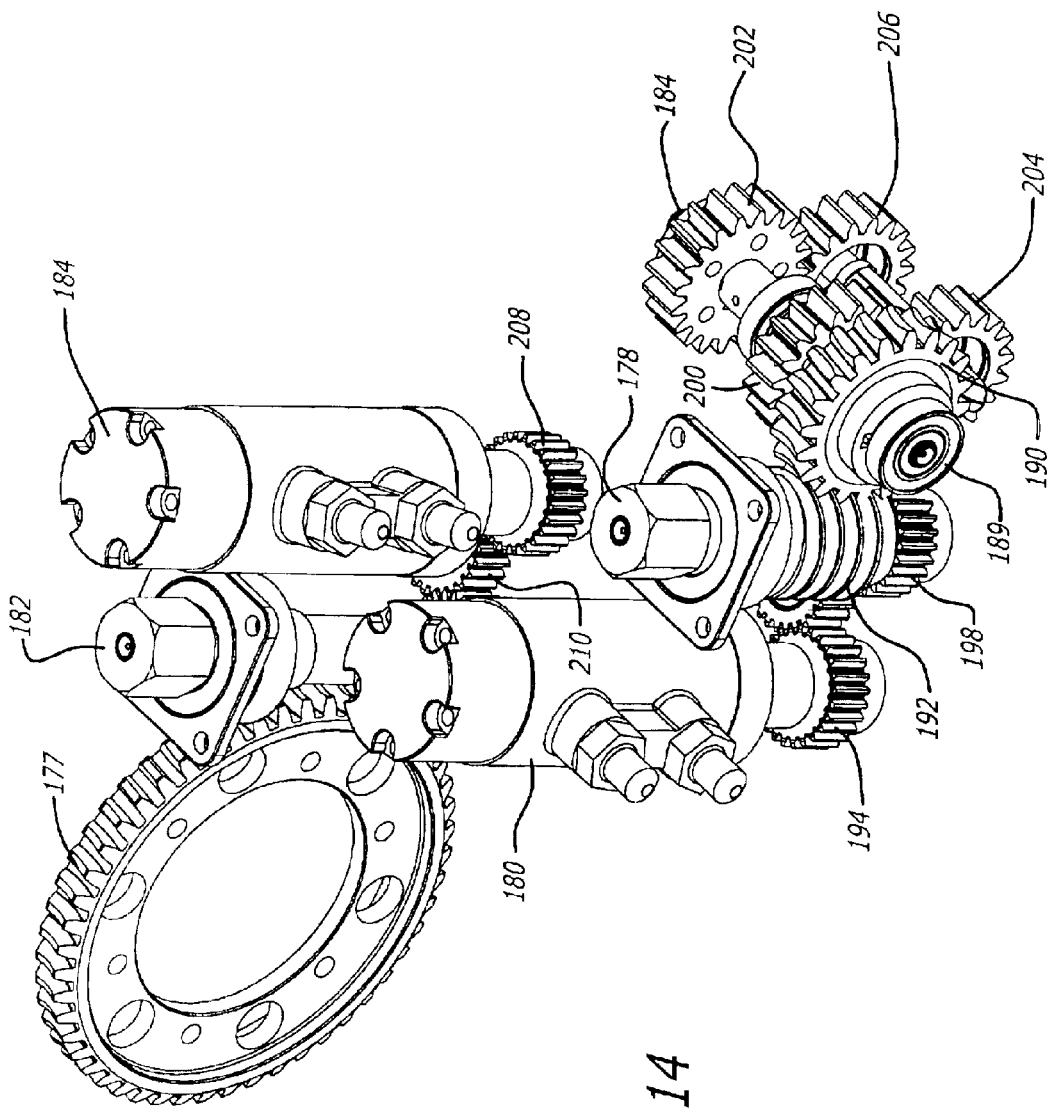
FIG. 14 is an upper right front isometric view of the travel drive assembly and the blade height drive assembly of the saw of FIG. 3.
Figure 15:
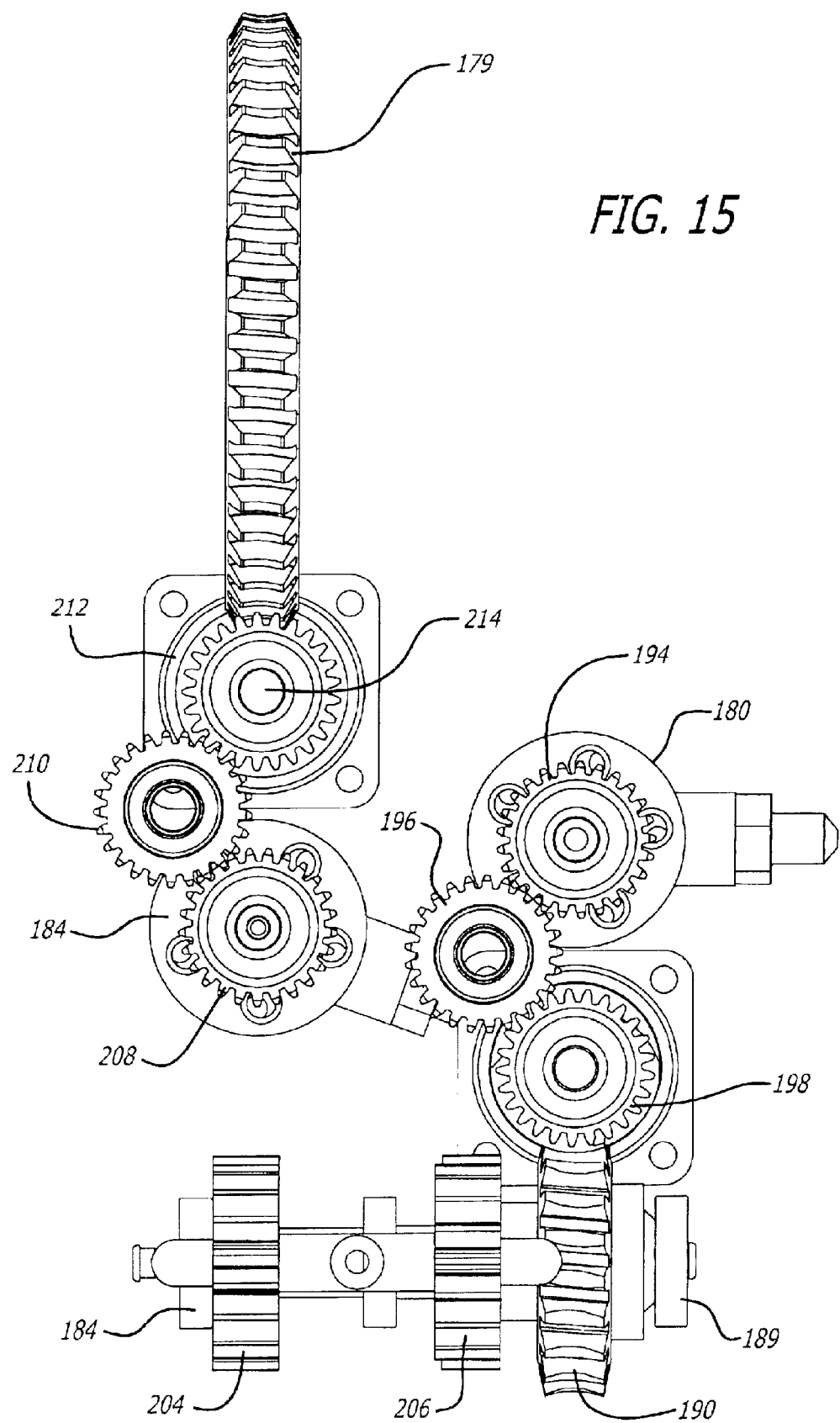
FIG. 15 is a bottom plan view of the travel drive assembly and the blade height drive assembly of the saw of FIG. 3.
Figure 16:
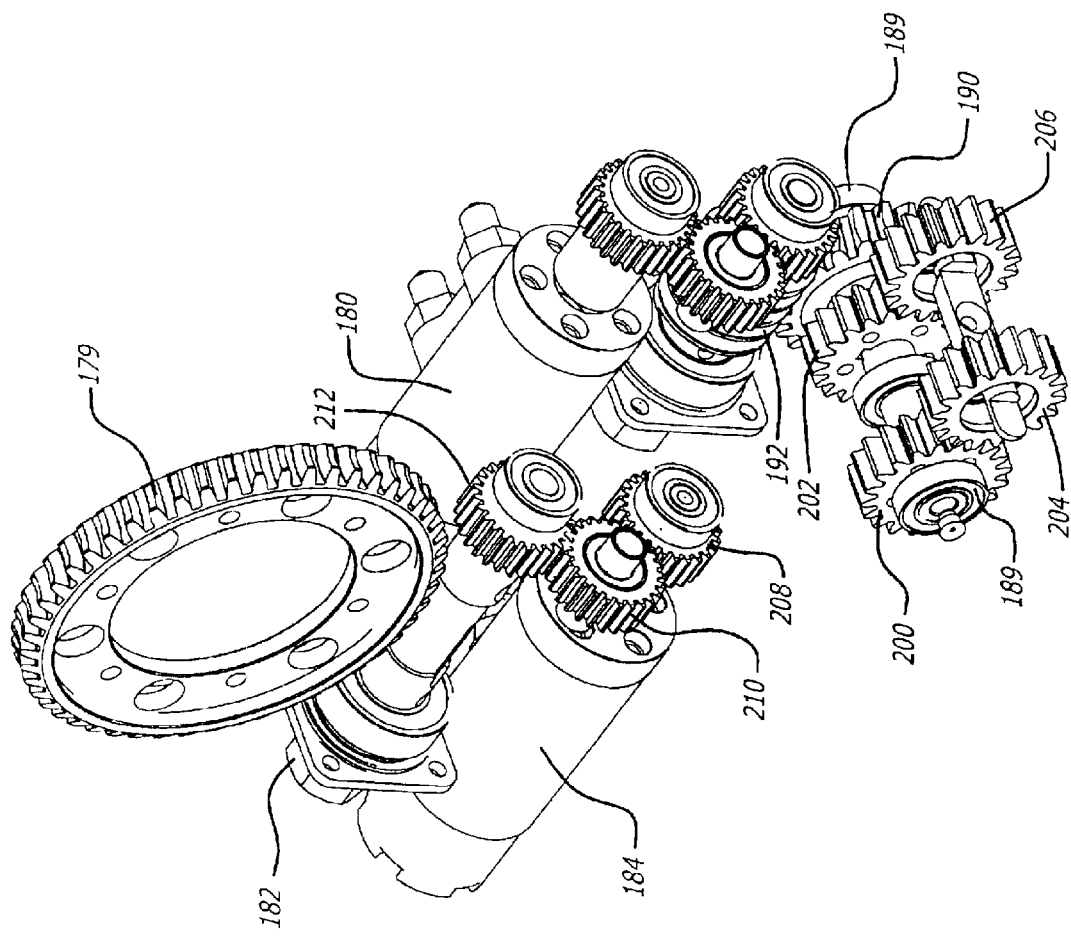
FIG. 16 is a lower left isometric view of the travel drive assembly and the blade height drive assembly of the saw of FIG. 3.

The travel assembly 144 includes access covers 186 and 188 (FIG. 8) supporting respective bearings 189 (FIGS. 14–16), which in turn support a driven worm gear 190 (FIGS. 9, 11, 12–16) controlled by worm gear 192. As shown in FIGS. 13–16, the worm gear is controlled by the manual travel control 178 and by the hydraulic travel control motor 180. The travel control motor 180 includes a drive gear 194 engaging an idler gear 196, which intern engages gear 198 on the shaft of worm gear 192. Rotation of the worm gear shaft moves the driven worm gear 190, which in turn rotates both of the worm driven gears 200 and 202. The worm driven gears 200 and 202 engage the drive pinion gears 204 and 206, respectively. The shafts supporting the worm driven gears 200 and 202 and the drive pinion gears 204 and 206 are also preferably formed from titanium. The drive pinion gears 204 and 206 are supported by respective bearings, as can be seen in FIGS. 8 and 12.

The gearbox rotation motor includes a gear 208 which drives idler gear 210, which in turn engages gear 212 on the shaft 214 of the gearbox rotation manual control 182. Rotation of shaft 214 turns worm gear 216, which in turn drives the worm mating gear 177 for moving the gearbox.

Aluminum inserts are placed in the travel housing for receiving and supporting the hydraulic motors, the manual drive shafts and/or the gear assemblies, if desired. A first insert 218 shown in phantom in FIG. 11 supports the gearbox rotation motor 184 and a second insert 220 supports the travel gear assembly. These aluminum inserts are preferably bonded or adhered within the travel housing in the same manner as the other inserts, as described more fully below.

Figure 17:
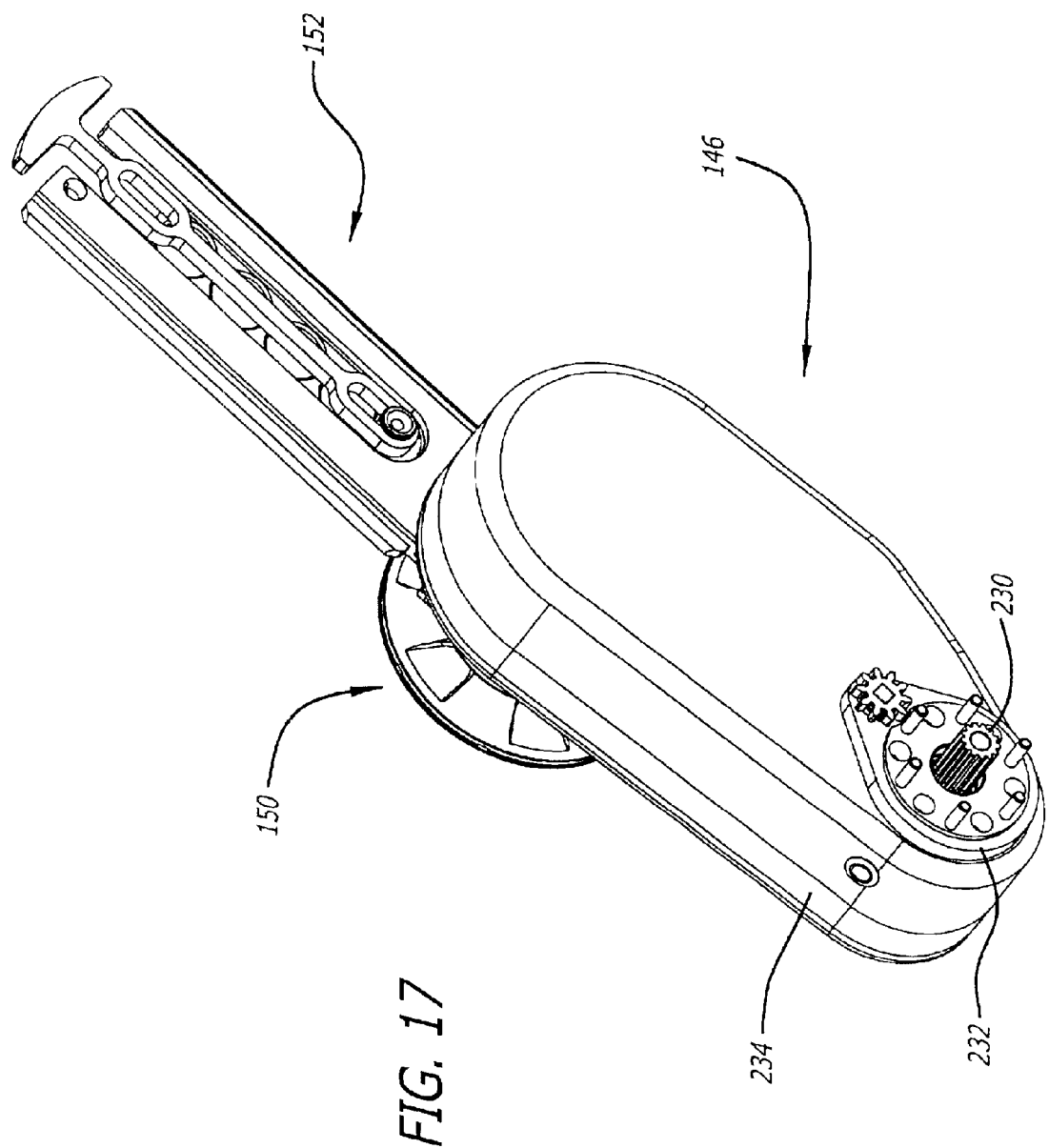
FIG. 17 is a right side isometric view of the gearbox and blade guard support of the saw of FIG. 3.
Figure 18:
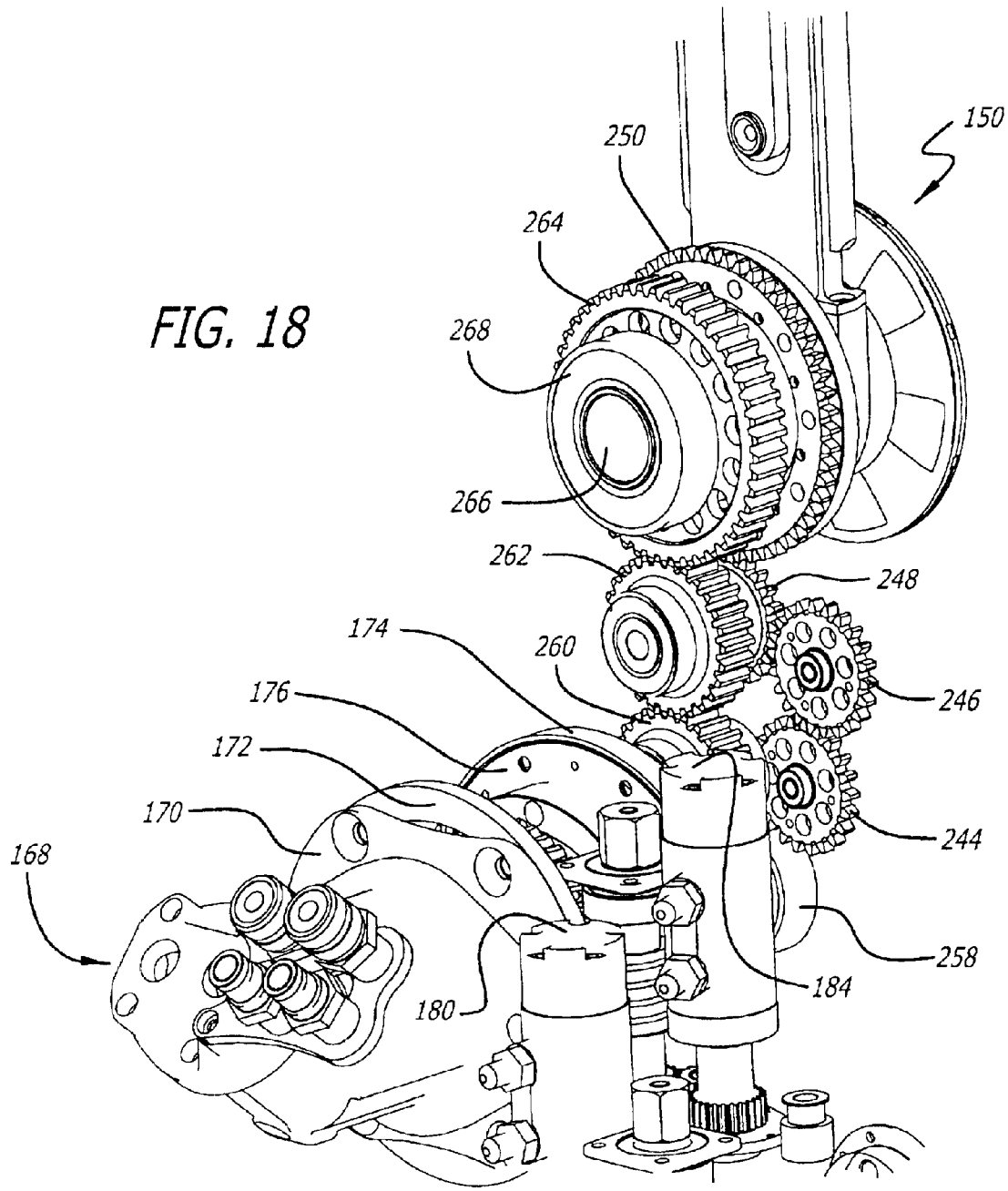
FIG. 18 is a right front isometric view of the working components of the gearbox with the gearbox housing in phantom for the saw of FIG. 3.
Figure 19:
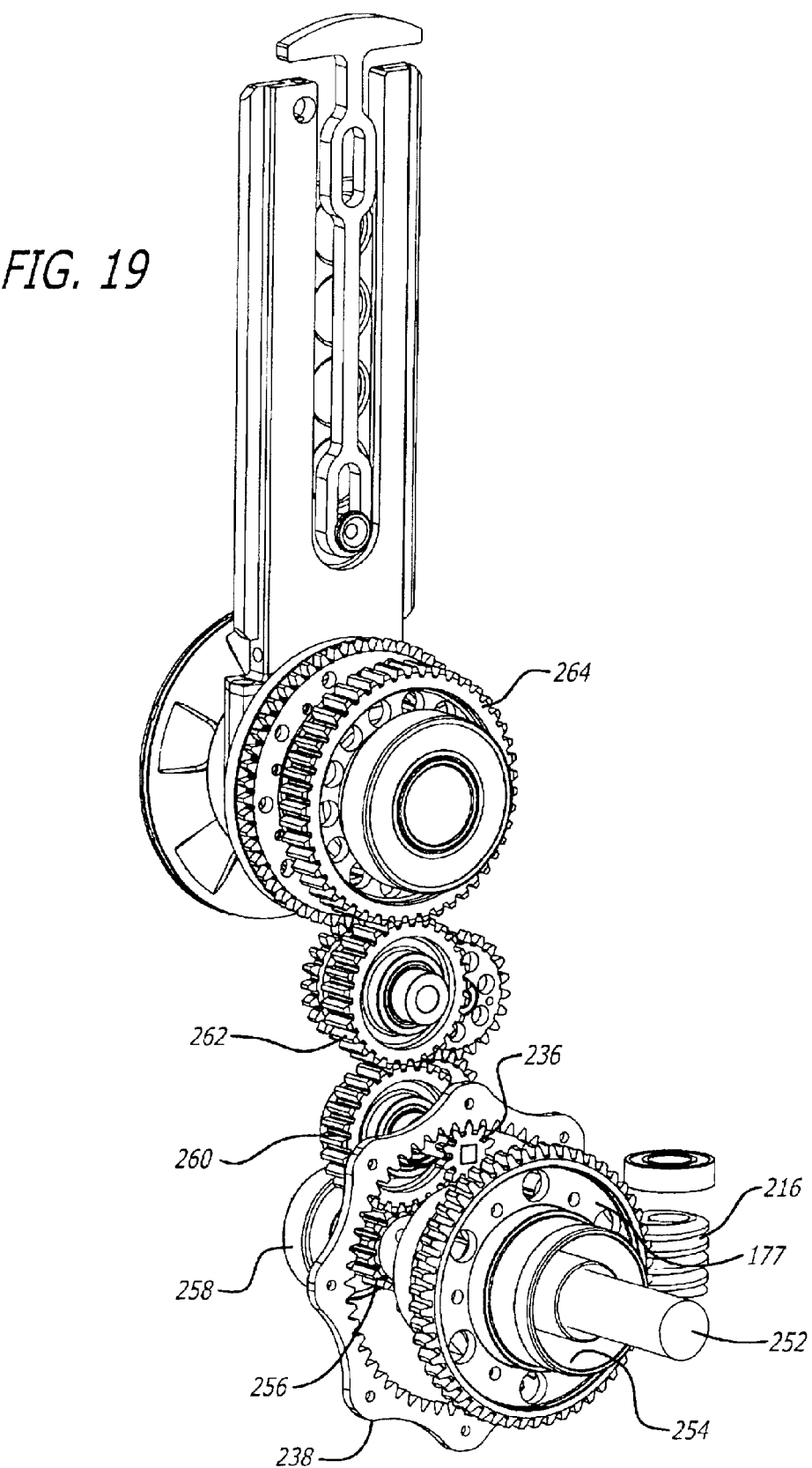
FIG. 19 is a right rear isometric view of the drive shafts and gear trains for driving the saw blade and positioning the blade height for the saw of FIG. 3.
Figure 20:
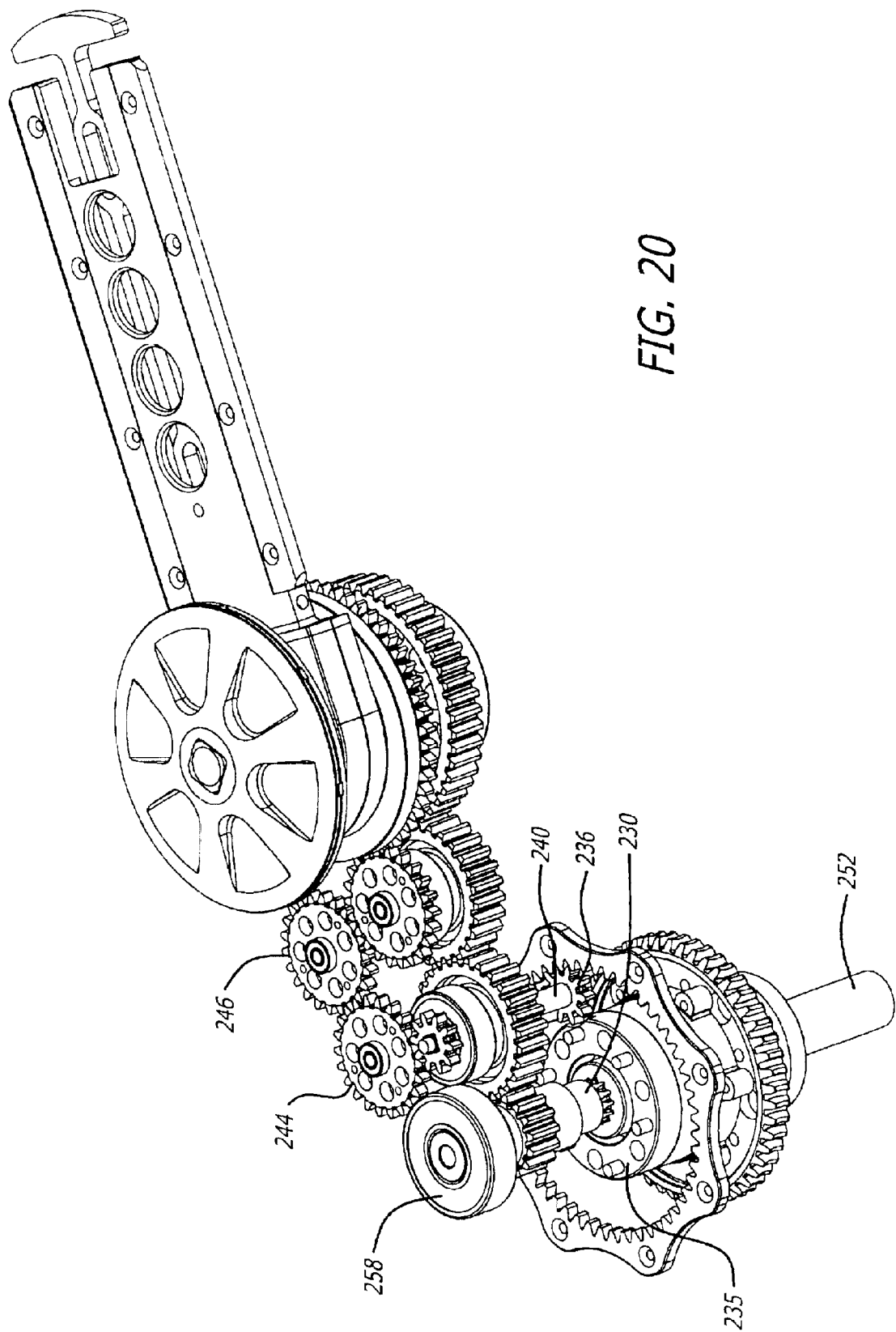
FIG. 20 is a lower right side isometric view of the drive shafts and gear trains of FIG. 19.
Figure 21:
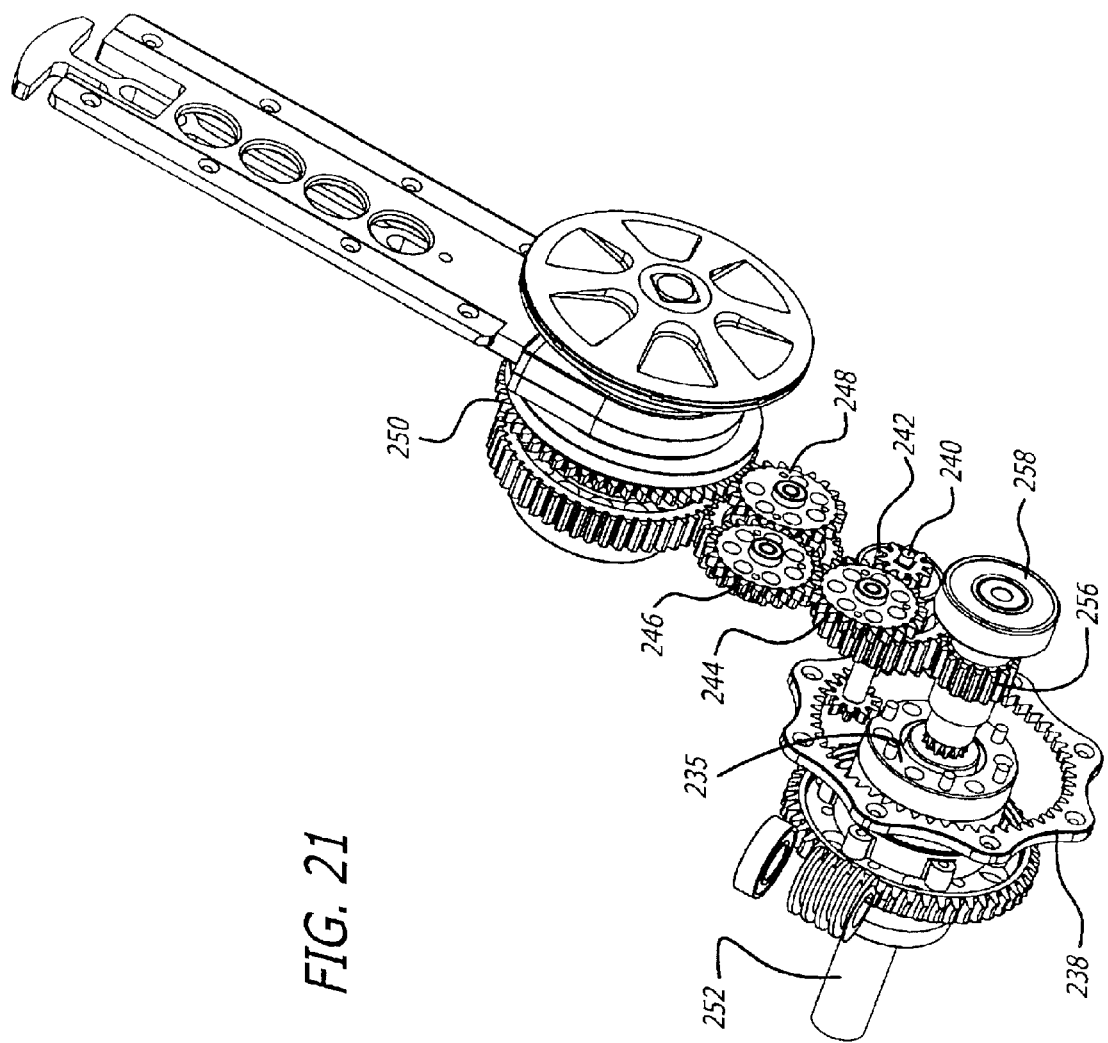
FIG. 21 is a front left side isometric view of the drive shafts and gear trains of FIG. 19.
Figure 22:
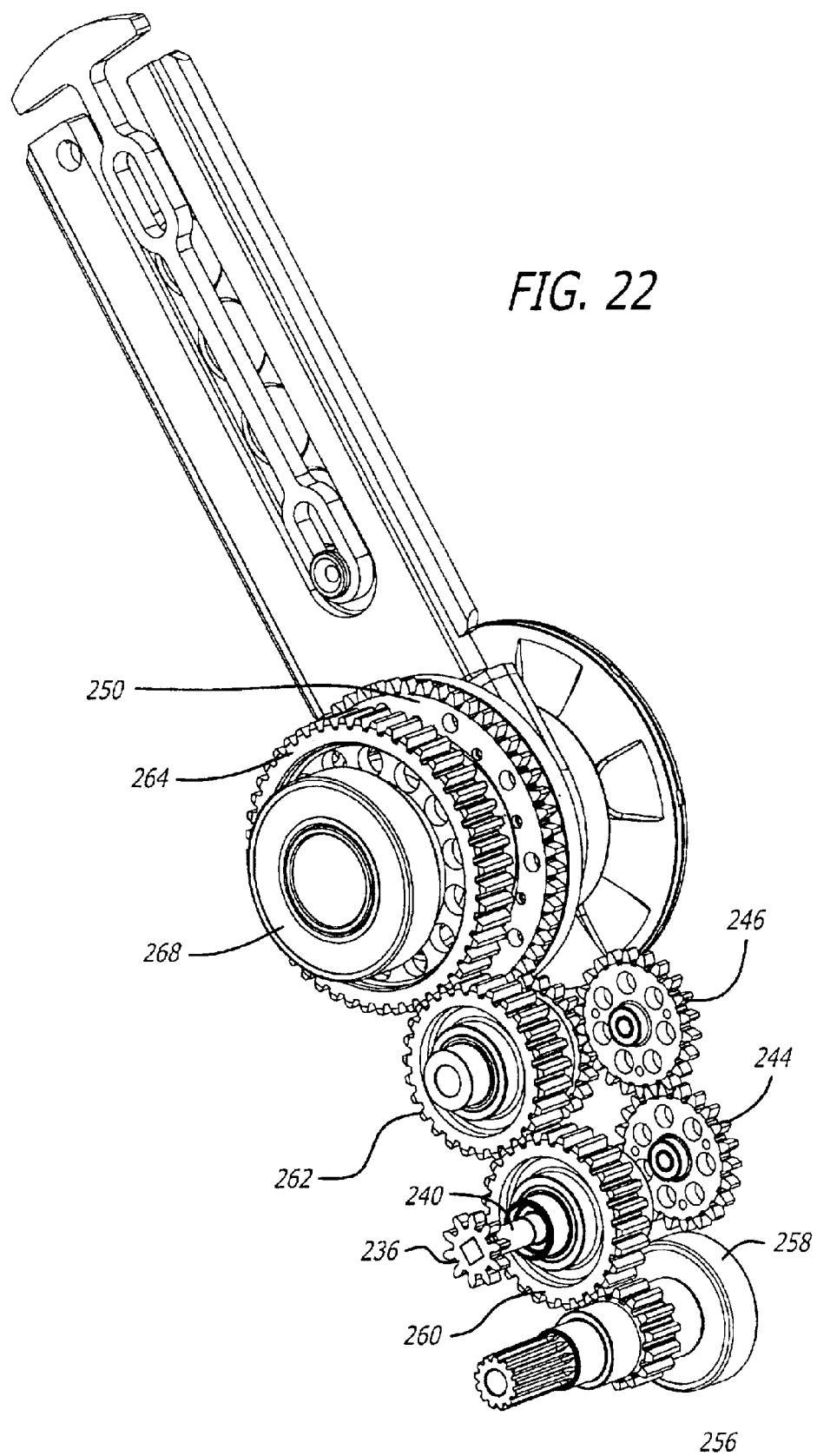
FIG. 22 is a right front isometric view of the shafts and gear trains of the gearbox of the saw of FIG. 3.
Figure 23:
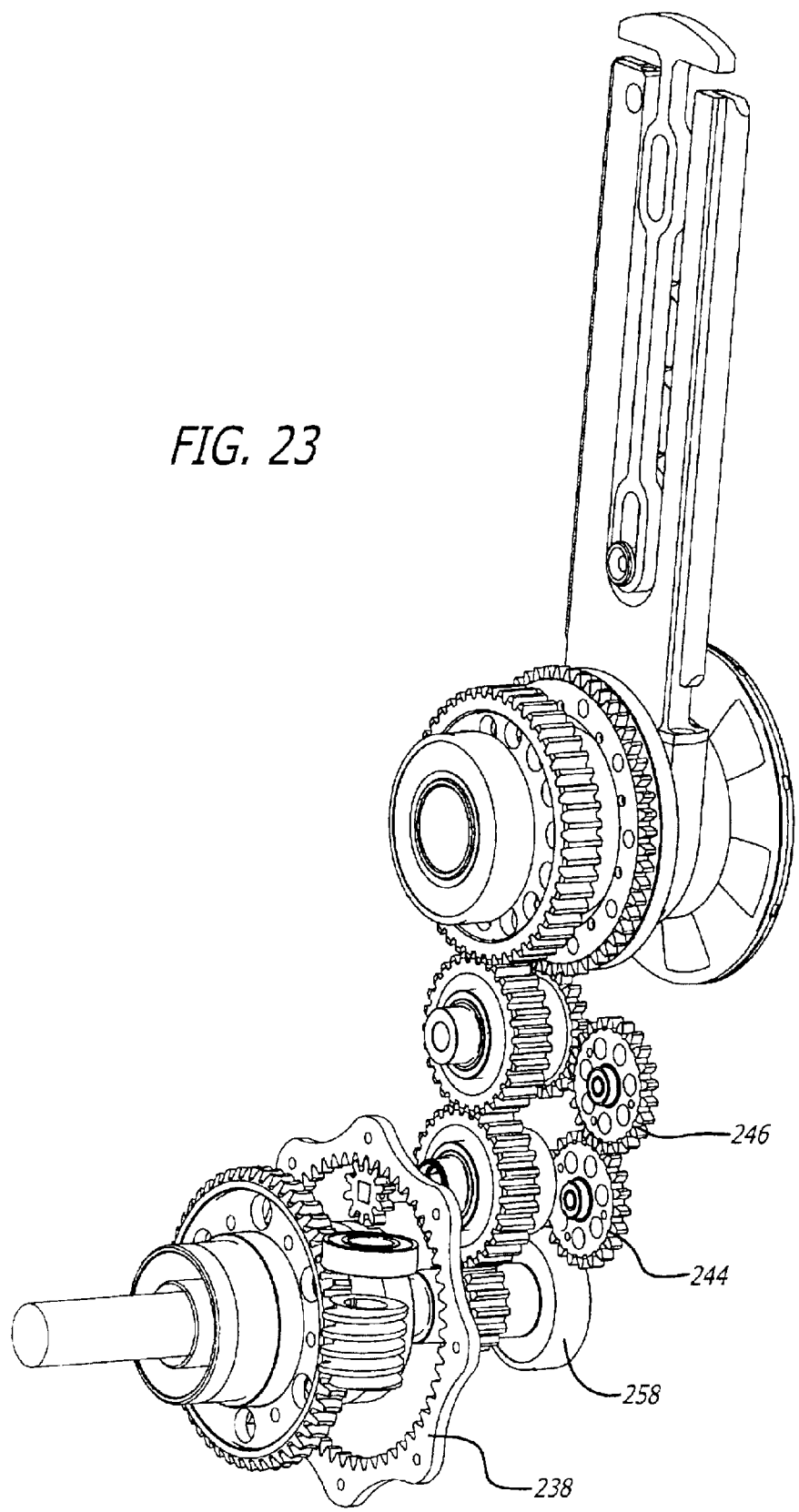
FIG. 23 is a lower right front isometric view of the drive shafts and gear trains for driving the saw blade and positioning the blade height for the saw of FIG. 3.
Figure 24:
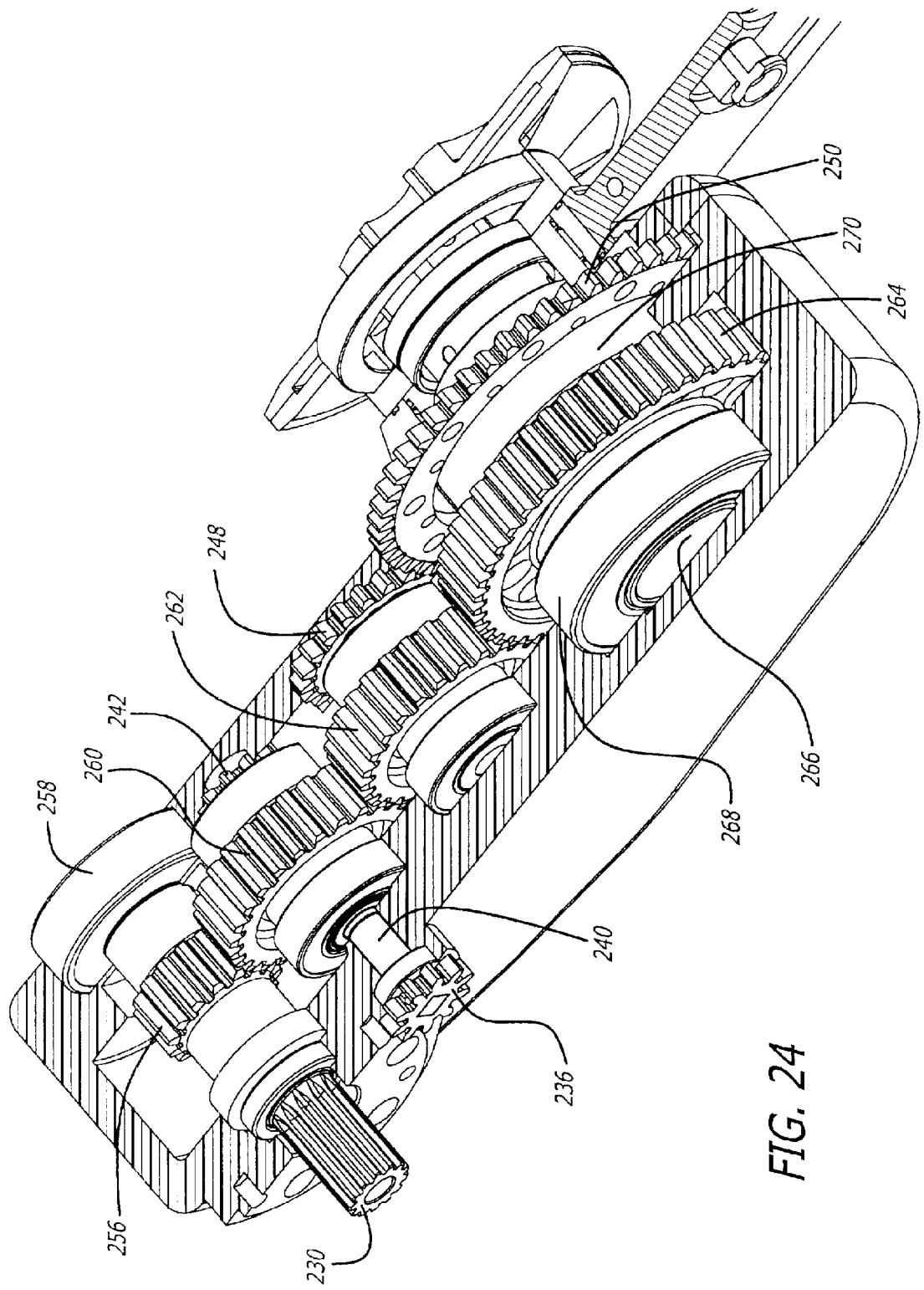
FIG. 24 is a lower right isometric view of the saw blade and blade guard gear trains and blade drive shaft positioned in a schematic of the gearbox housing.
Figure 25:
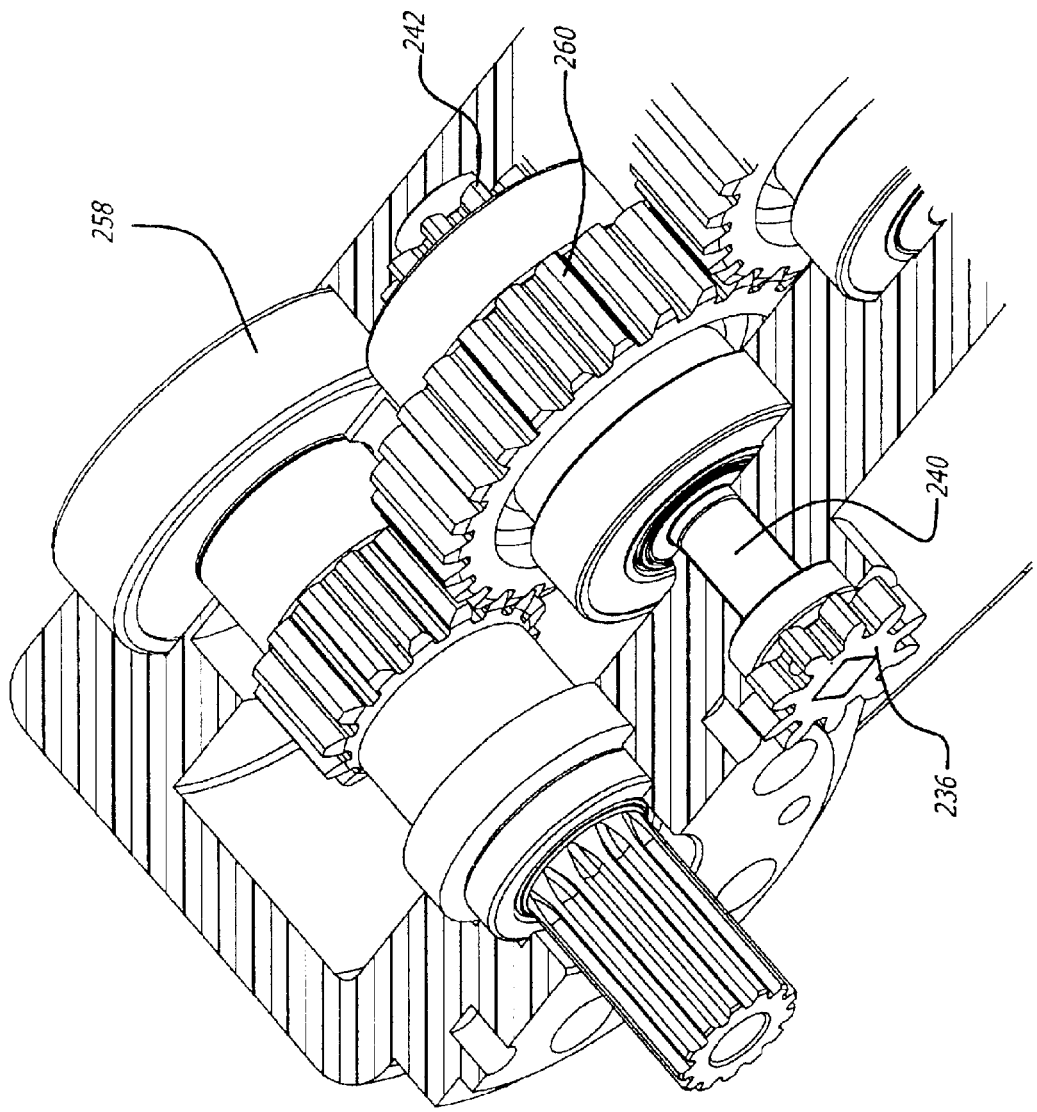
FIG. 25 is an enlarged view of the lower portion of the assembly shown in FIG. 24.
Figure 26:
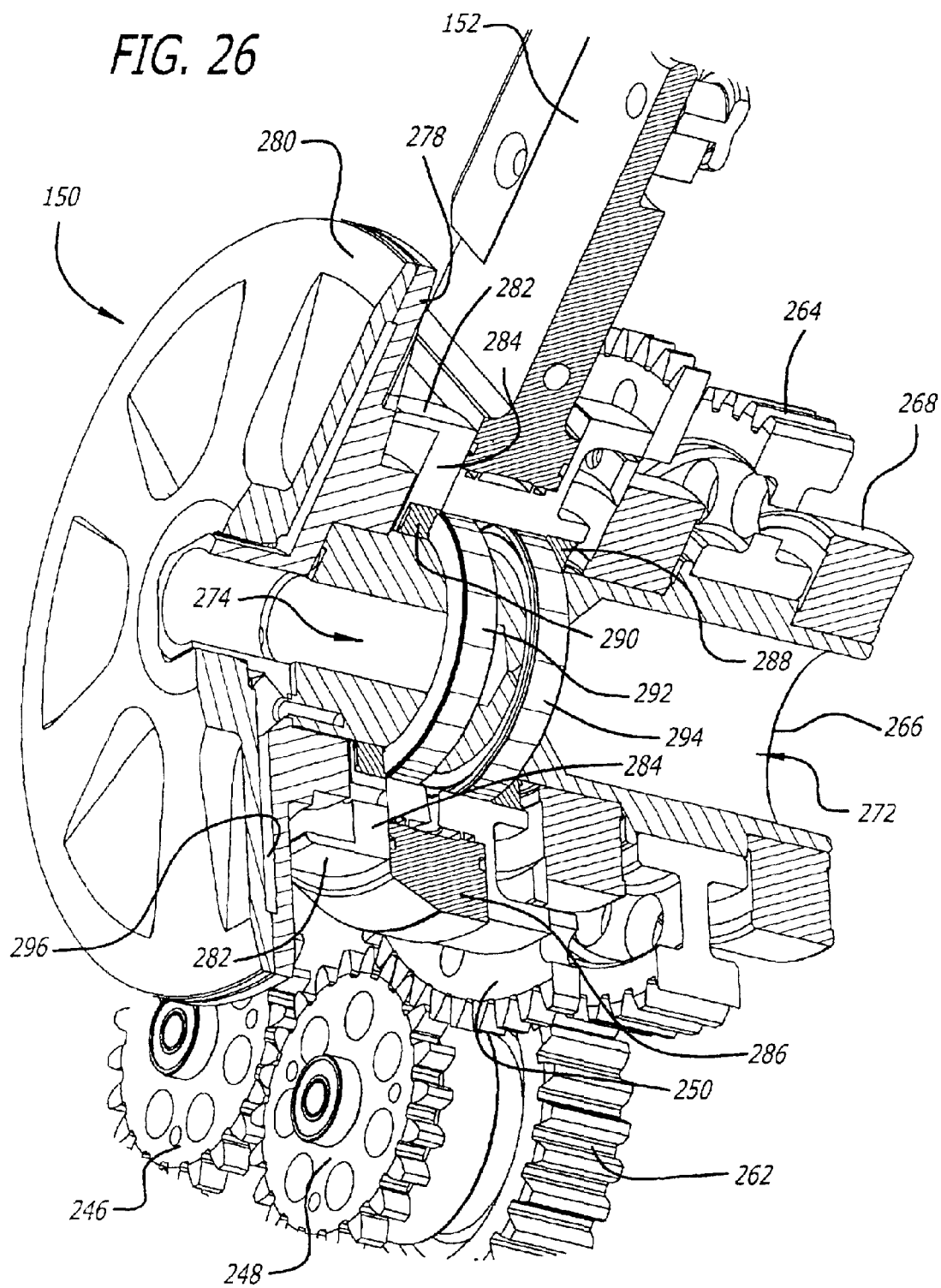
FIG. 26 is an enlarged view and partial section of the saw drive shaft and blade flanges.
Figure 27:
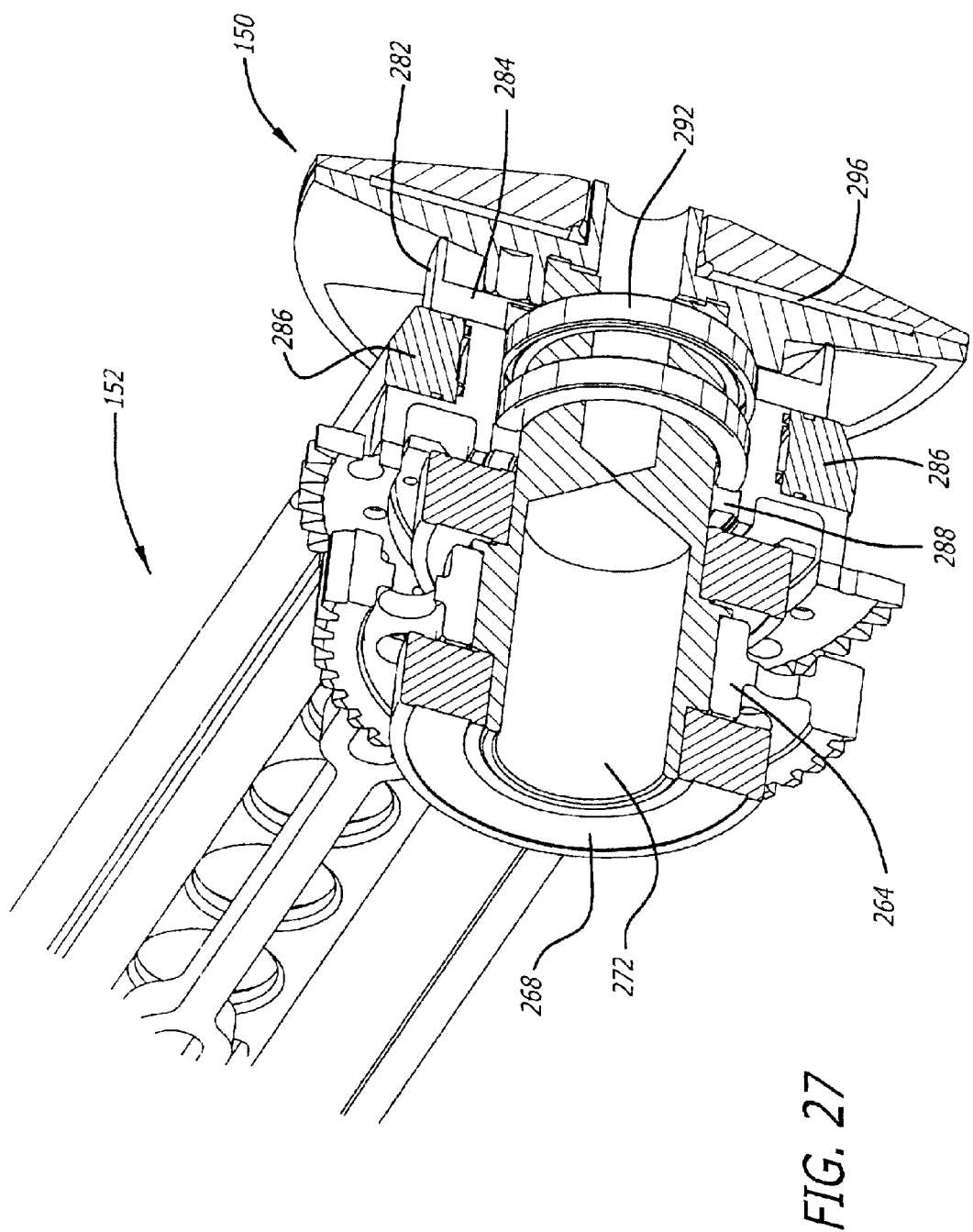
FIG. 27 is a transverse cross-section and isometric view of the saw blade drive shaft.
Figure 53:
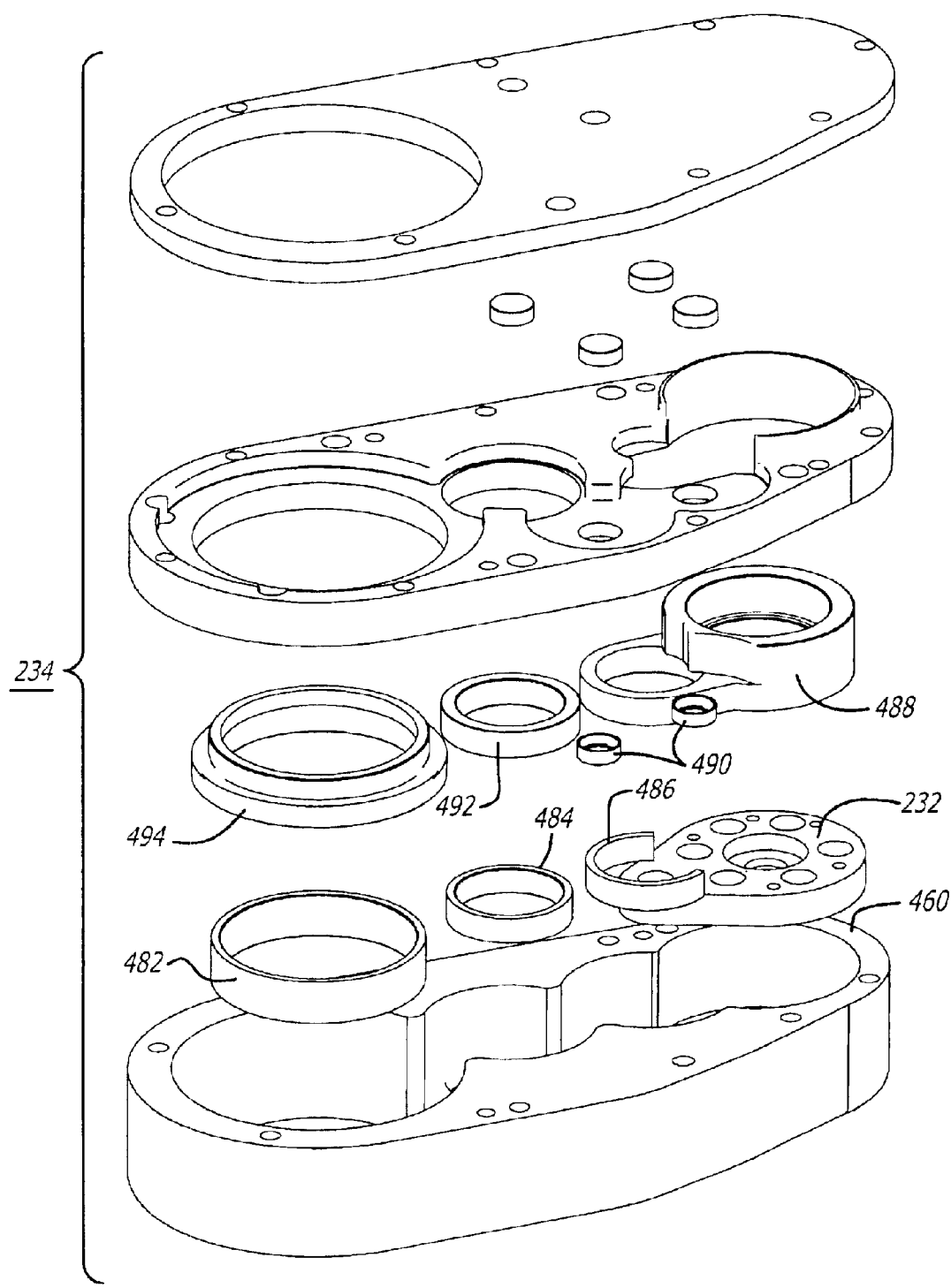
FIG. 53 is an exploded view of housing components for the gearbox of FIG. 50.

The gearbox includes a splined input shaft 230 engaging a complementary surface on the main drive shaft in the bearing housing 142 from the hydraulic drive motor. The shaft 230 extends into the gearbox as described more fully below. The gearbox housing includes a metal insert 232 (FIGS. 17 and 53) bonded into the gearbox housing 234 for mounting the gearbox to a corresponding mounting surface 235 (FIGS. 20 and 21) in the bearing housing so that when the worm mating gear 177 turns the gearbox turns at the same time. A follower one inch pitch diameter pinion gear 236 (FIGS. 17, 19, 22 and 24–25) runs on a stationary 5.2 inch pitch diameter ring gear 238 fixed within the bearing housing to the support 176 (FIGS. 6, 8, 11 and 12). The follower gear 236 is mounted on a shaft 240 supported on bearings, which in turn are supported by the gearbox. On the opposite end of the shaft 240, a one inch pitch diameter gear 242 drives a first 2.2 inch pitch diameter gear 244, which in turn drives an identical second 2.2 inch pitch diameter gear 246. The second gear 246 drives a third 2.2 inch pitch diameter gear 248, which in turn drives a 5.2 inch pitch diameter ring gear 250, resulting in a gear ratio from the bearing housing to the blade guard support of 1:−1. Therefore, as the gearbox rotates through action of the worm follower gear 177, the blade guard stays level with the work surface. Each gear is supported on a respective shaft supported by a pair of bearings.

The main drive shaft 252 passes through a bearing which supports an external shaft 254 (FIG. 19), which in turn supports the worm follower gear 177 so that the main drive shaft 252 can rotate independently of the worm follower gear 177. The main drive shaft 252 engages the splined shaft 230, which includes a 1.5 inch pitch diameter gear 256 and a bearing 258 for supporting the splined shaft. The gear 256 drives a 2.7 inch pitch diameter idler gear 260, which in turn drives a second 2.7 inch pitch diameter idler gear 262, which then drives the 4.7 inch pitch diameter output gear 264. The resulting gear ratio is 3.512:1, which produces a relatively high torque given the geometry constraints of the gearbox, the gear sizes and weights, and the like. The gear 264 is fixed to and drives the blade output shaft 266 supported by first and second bearings 268 and 270. Each gear is supported on a respective shaft supported by a pair of bearings.

The blade output shaft 266 is preferably substantially hollow over a significant length of the shaft. The shaft includes a first bore 272 having a relatively large diameter greater than approximately half the overall diameter of the shaft, about which the gear 264 is mounted. The bore 272 extends approximately half the length of the shaft. The other half is substantially solid except for bore 274 for receiving the blade mounting bolt 276 (FIG. 4) for mounting the inner blade flange 278 and the outer blade flange 280 to the output shaft 266. A blade flange seal 282 extends outwardly to the inner blade flange 278 for sealing with the blade flange. The blade flange seal 282 is supported by a blade guard mounting bracket 284, which also supports a blade guard coupler 286. A first bearing 288 and a second bearing 290 extend between the blade output shaft and the bracket 284. The ring gear 250 is mounted to the bracket 284 so that ring gear 250 and gear 264 are supported on a common shaft. The first and second bearings 288 and 290 each extend on the outer side of respective fluid seals 292 and 294. Fluid passes between the seals and around the output shaft and through a number of openings axially along the output shaft to the space 296 between the inner and outer blade flanges. The blade shaft may be formed from 416 stainless steel or from titanium, as with the other titanium parts described herein.

Figure 28:
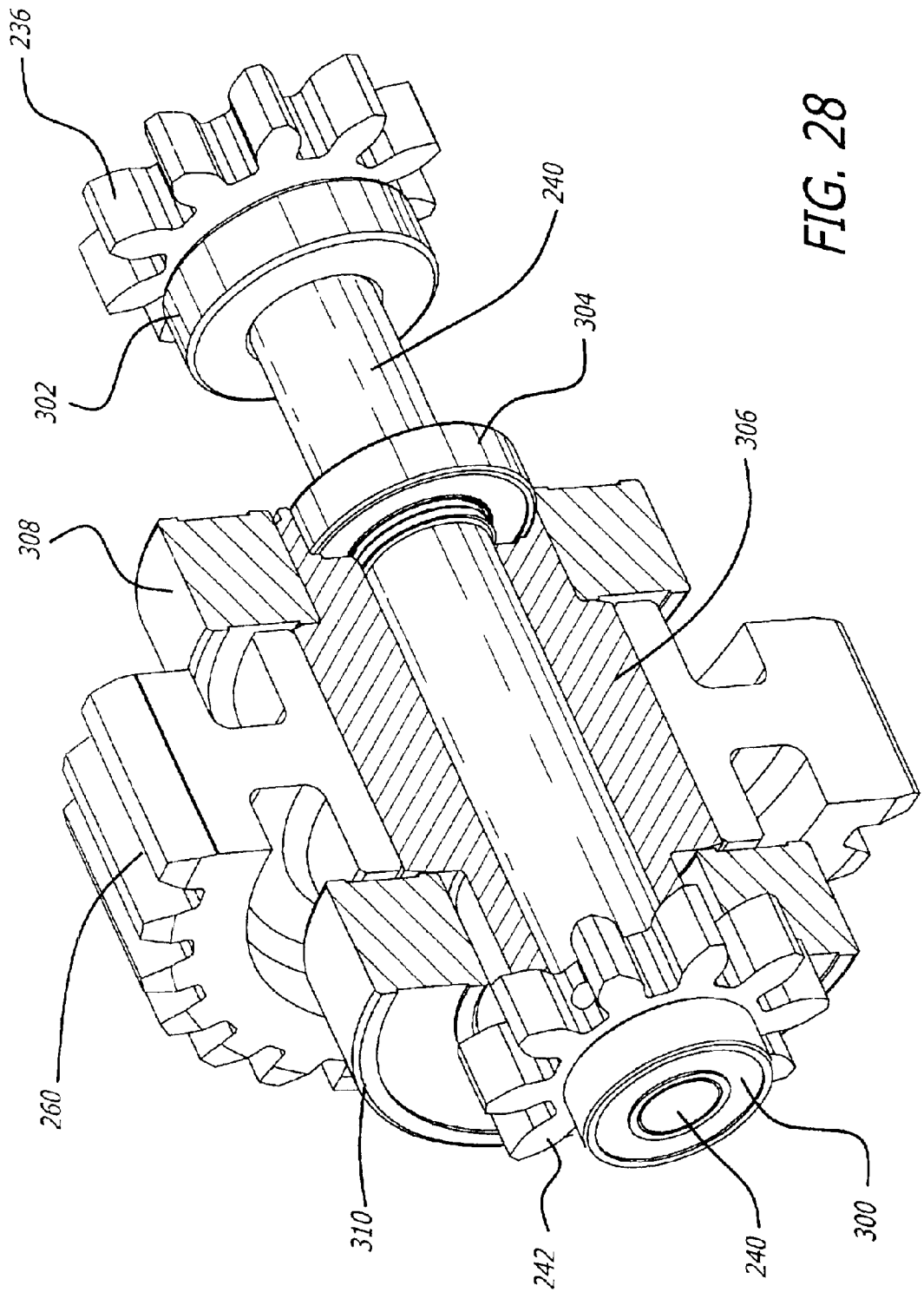
FIG. 28 is an isometric and partial sectional view of one of the saw blade drive gears and the blade height position gears supported on a common shaft.
Figure 29A:
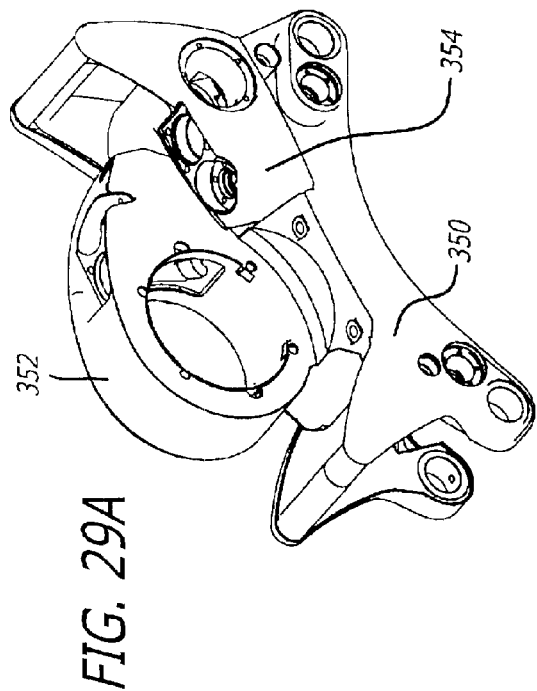
FIG. 29A is an upper right isometric view of the housings of the saw of FIG. 3.
Figure 29B:
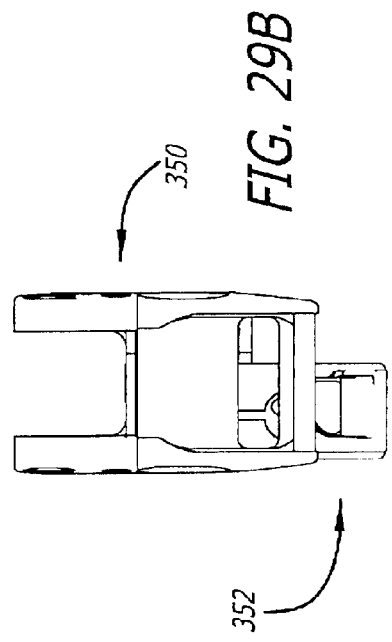
FIG. 29B is an inverted front plan view of the housings of FIG. 29A.
Figure 29D:
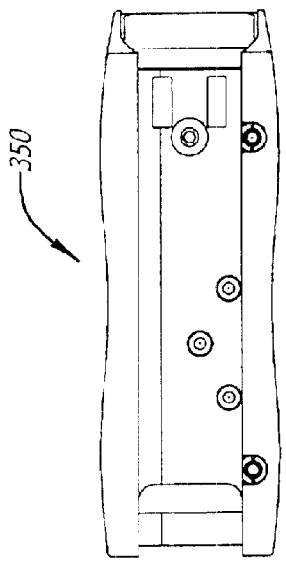
FIG. 29D is a bottom plan view of the housings of FIG. 29A.
Figure 29C:
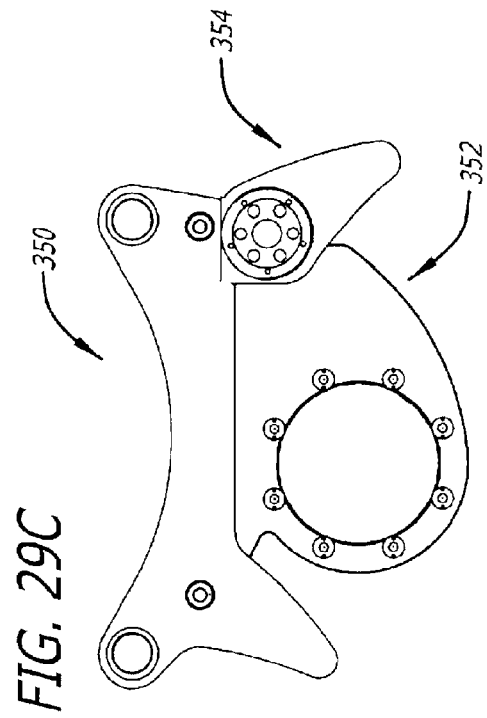
FIG. 29C is a left side elevation view of the housings of FIG. 29A.

Gears 236, 242 and 260 are supported on a common shaft and gears 248 and 262 are also supported on a common shaft. These gears and shafts include four bearings, such as shown in FIGS. 24–27 and also 28. As shown in FIG. 28, gear 236 is supported on shaft 240 which also supports gear 242. The shaft is supported in the gearbox by respective bearings 300 and 302, and the shaft 240 also supports bearing 304 which in turn support a coaxial shaft 306. The coaxial shaft 306 is supported in the gearbox by first and second bearings 308 and 310, respectively, and the coaxial shaft supports gear 260. A similar arrangement is used for gears 248 and 262.

The gears are preferably formed from 86L20 alloy or the equivalent and heat treated. The alloy is preferably heat treated to a case depth of 0.020 to 0.035, surface hardness of approximately 58 R/C and core hardness of between 35 and 45 R/C. The part is sub-zero cooled to within a range of minus 100 degrees Farenheit to minus 150 degrees Farenheit for a period of two hours starting within 20 minutes of the quench from the high temperature. The other metal parts may be formed from aluminum, 2024 T351 hard anodized, but they may also be made from other materials, including titanium AL46V. The inserts and other metal components supporting the greatest loads are preferably formed from titanium, while the other inserts are preferably formed from the hardened aluminum.

At least one of the housings (FIGS. 29A–29D), and preferably several, and more preferably each of the housings are formed from composite materials. Additionally, the same housings are preferably formed with a plurality of inserts that can be used to support, mount or otherwise serve as an interface for metal or other components of the machine. The carriage housing 350, bearing housing 352 and transfer housing 354 are preferably formed with composite skins of carbon fiber and thermoplastic resins such as epoxy resin. The housing skins may then be coated with a UV absorbing paint. In a further preferred form of the inventions, any housing which includes a composite material skin also includes a foam core or body for adding strength to the housing. In one example, the foam is a closed cell foam, and may be as much as 96 to 98 percent closed cell, but could be as low as 60 percent.

Figure 33:
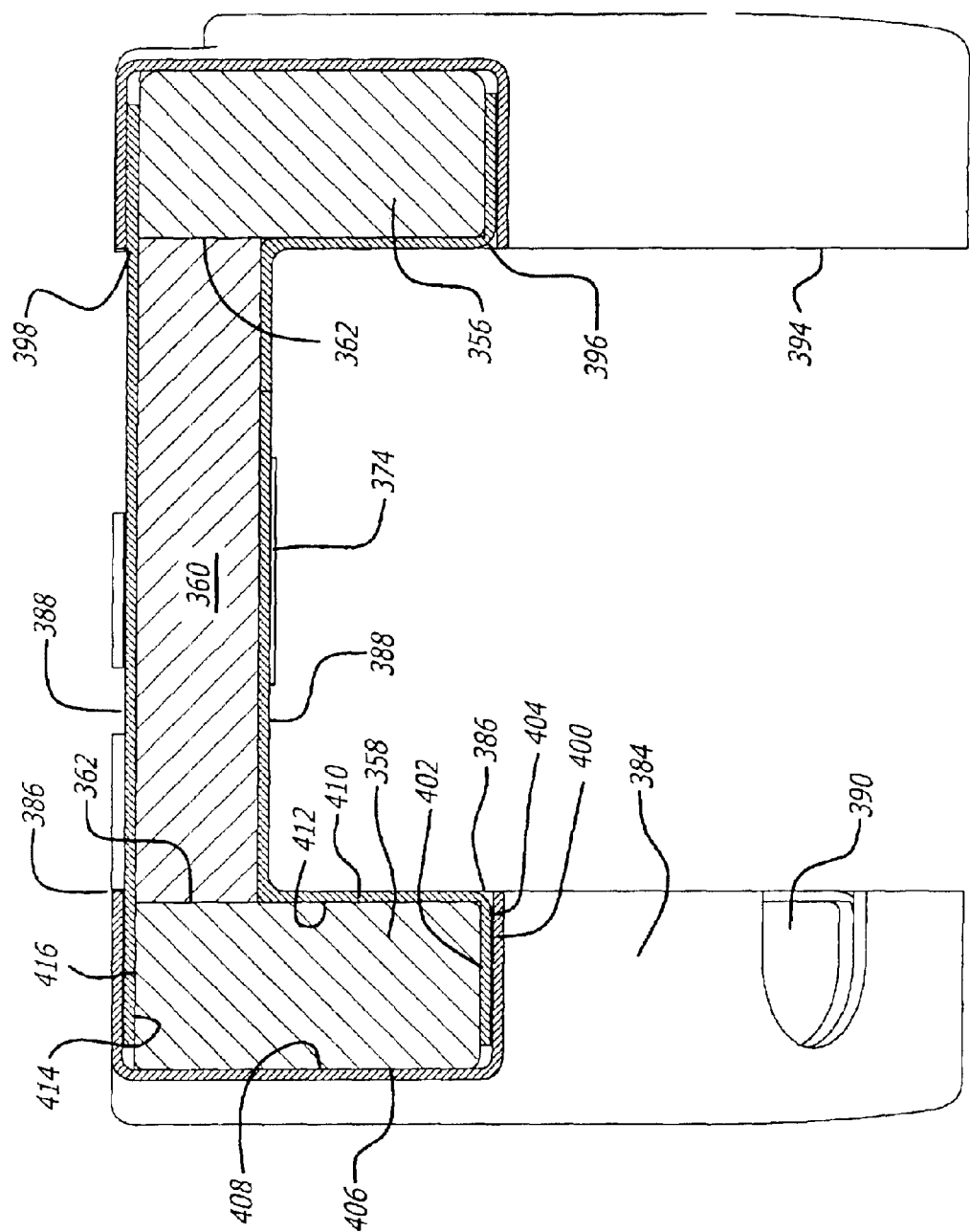
FIG. 33 is an enlarged view of a vertical transverse section of the carriage housing of FIG. 30A taken behind the section for FIG. 30F.
Figure 34:
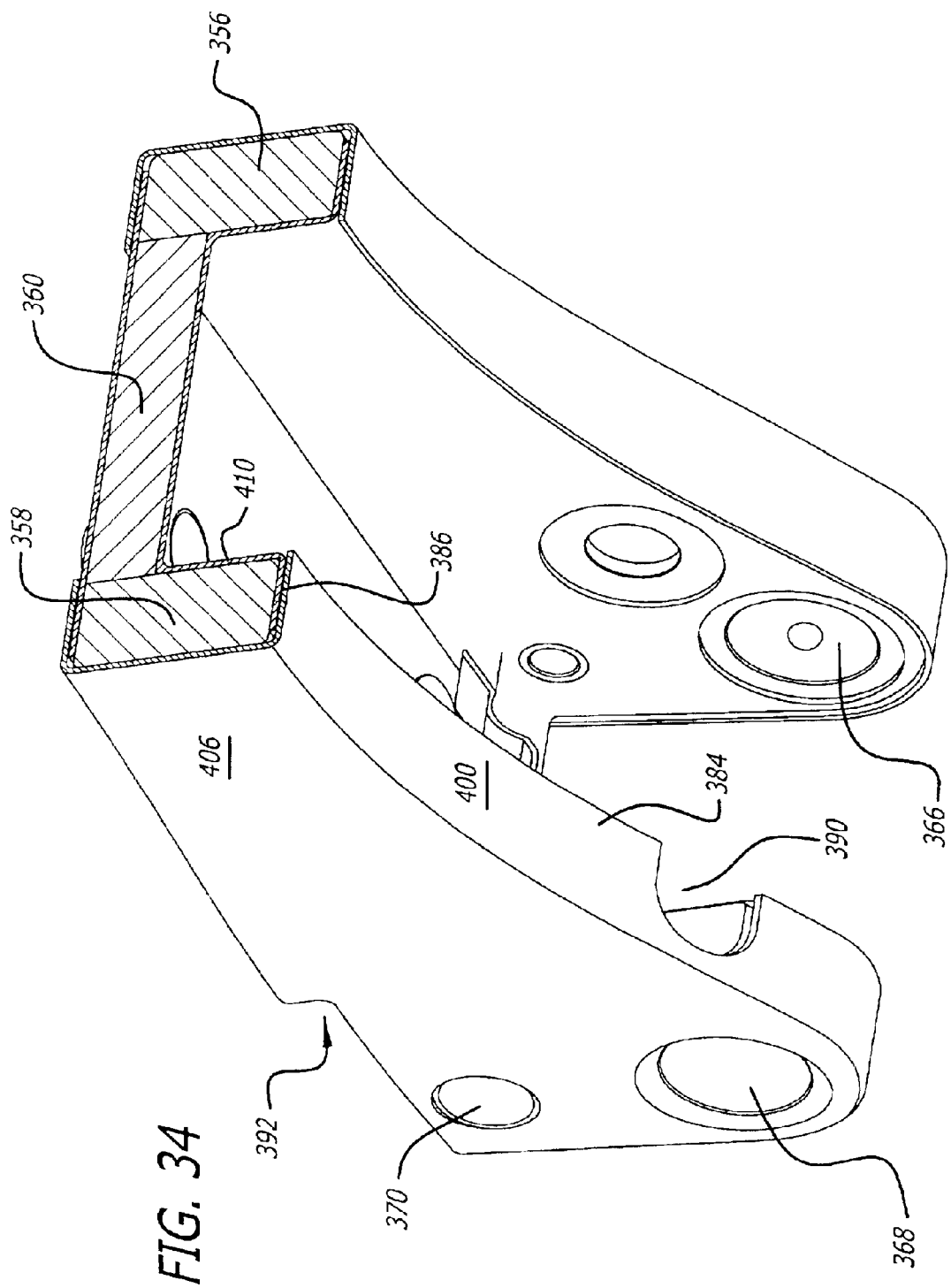
FIG. 34 is a lower left rear isometric view of the section of FIG. 33.
Figure 35:
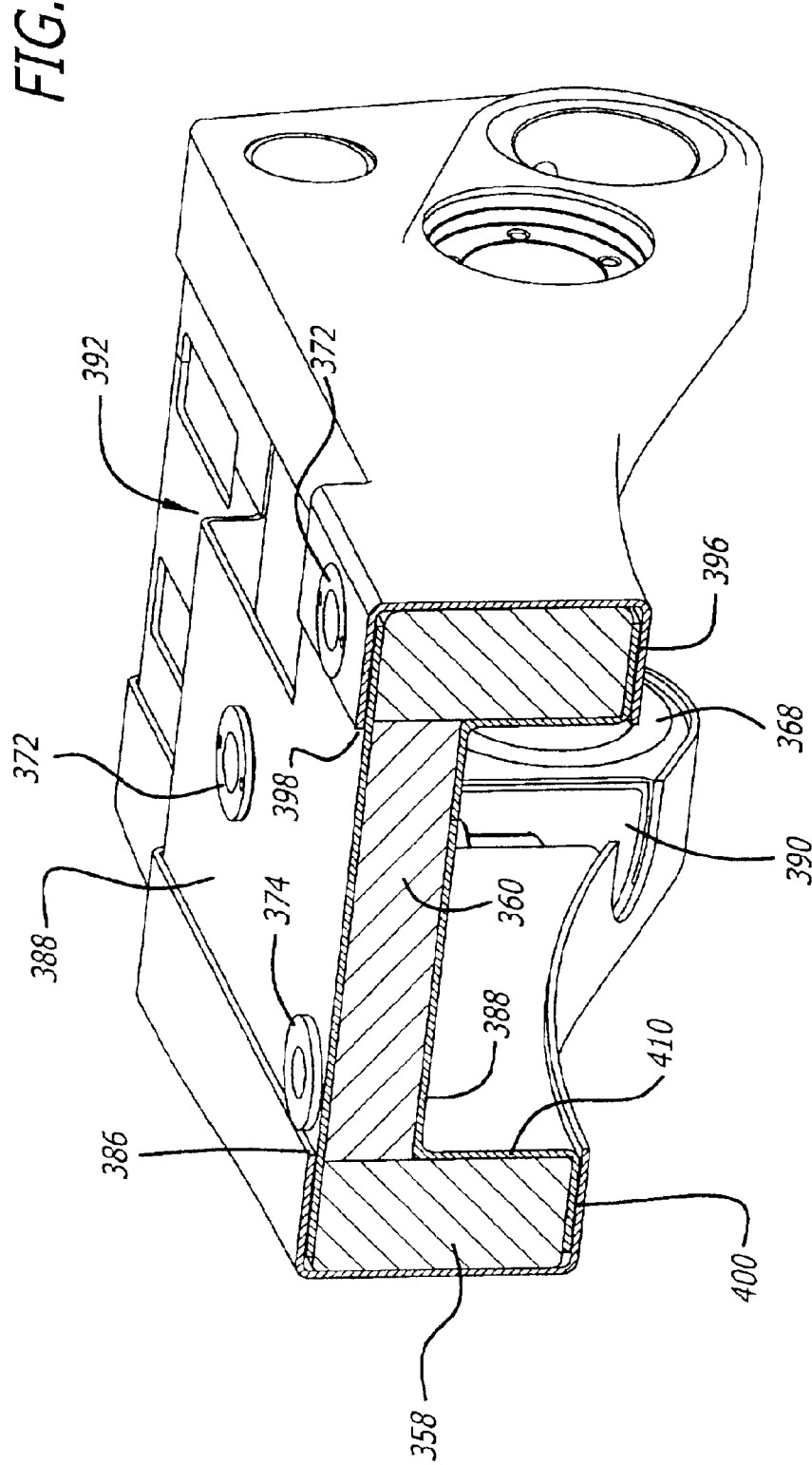
FIG. 35 is an upper right isometric and partial cutaway view of the section of FIG. 33.
Figure 36:
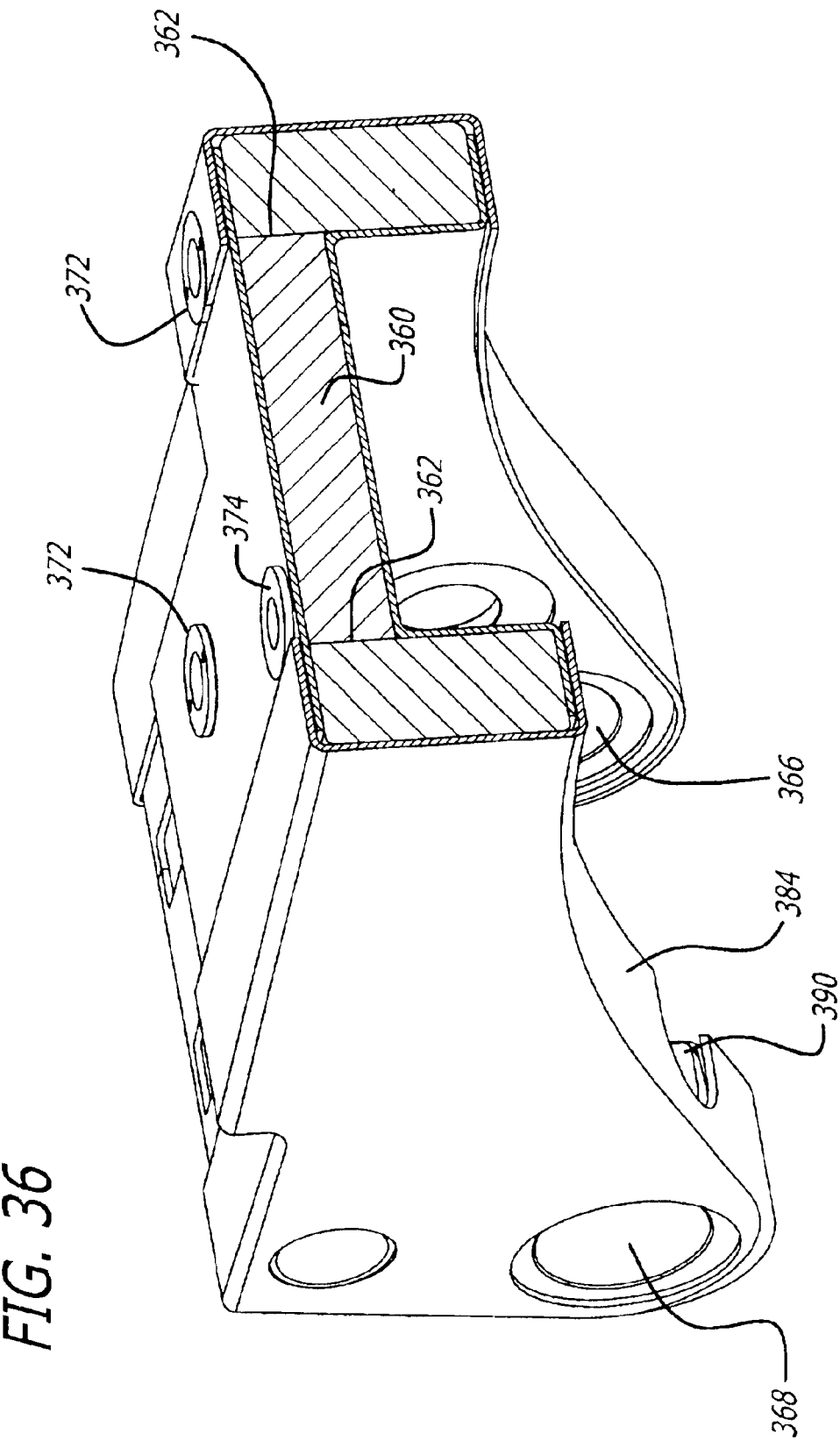
FIG. 36 is an upper left isometric view and partial cutaway of the section of FIG. 33.

Considering one example of the carriage housing 350 in more detail, the carriage housing is preferably formed from three milled closed cell foam sections, including a right side section 356, a left side section 358 and a center section 360, each of which are preferably milled precisely to fit within the skins of the housing, leaving an approximately 0.005 inch space for adhesive, preferably on all surfaces between the foam and the skin. The left and right side foam sections preferably extend to the bottom surface of the top carriage skin and the center section preferably meets the sides of the right and left side sections, as shown in FIGS. 30F and 33. As the drawings of FIGS. 3–53 are Solid Works drawings, a number of the lines intermediate and surfaces are drawing transition lines rather than end surfaces of the material. However, it should be understood that any given foam section can be configured to be assembled from two or more individual sections. However, it is preferred that the number of individual sections forming the core is minimized. Any joining foam surfaces between one foam section and another is preferably sealed with a suitable adhesive, preferably about 0.005 inch thick and possibly up to about 0.010 inch thick. For example, adhesive 362 is applied between the joining surfaces between the left side section 358 and the center section 360 and between the center section 360 and the right side section 356 (FIG. 33). Additionally, if a given foam section is formed as multiple sections, they are preferably joined together with a suitable layer of adhesive.

Figure 37:
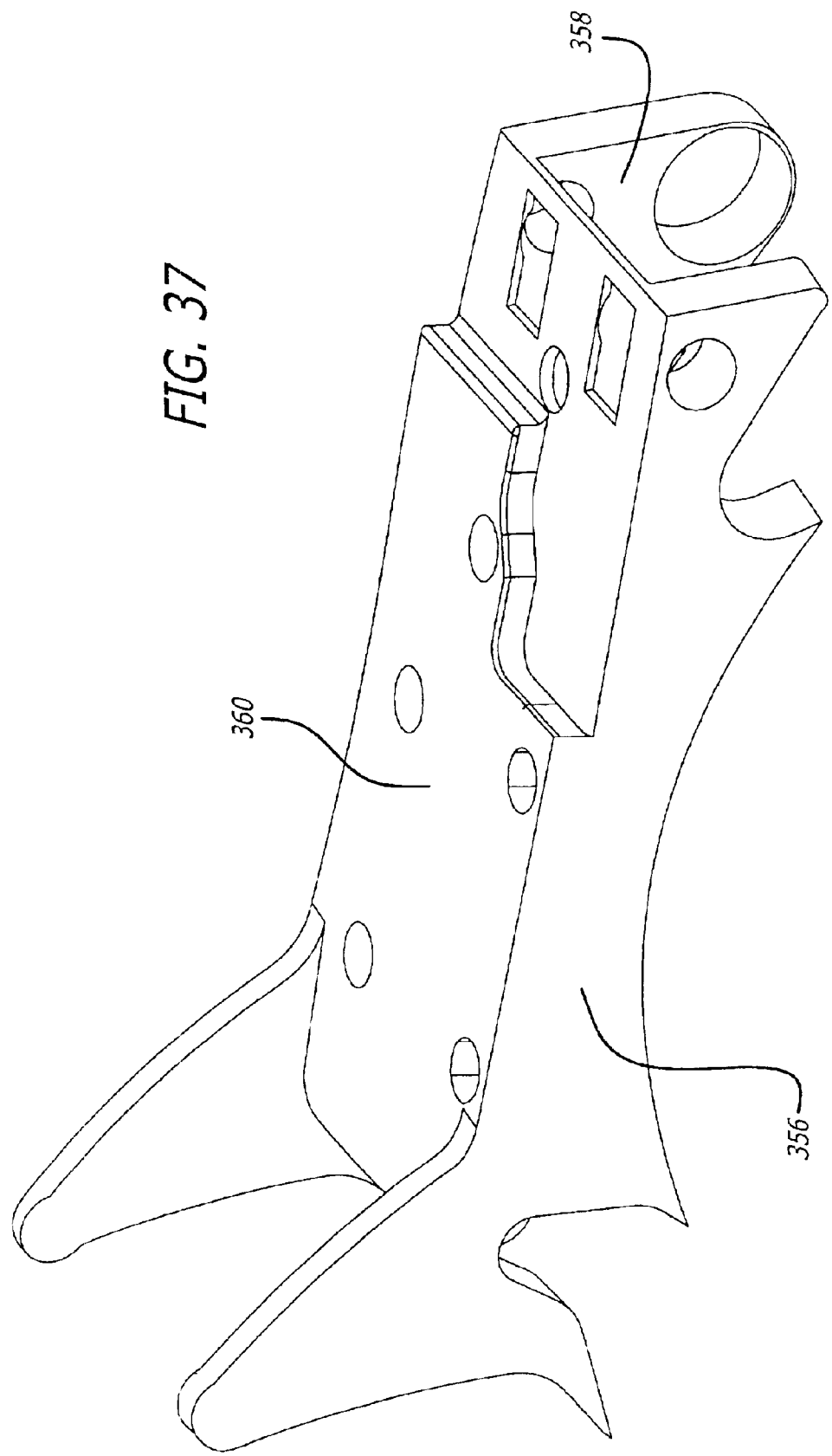
FIG. 37 is an upper right isometric view of a foam assembly for use with the carriage of FIG. 30A.
Figure 38:
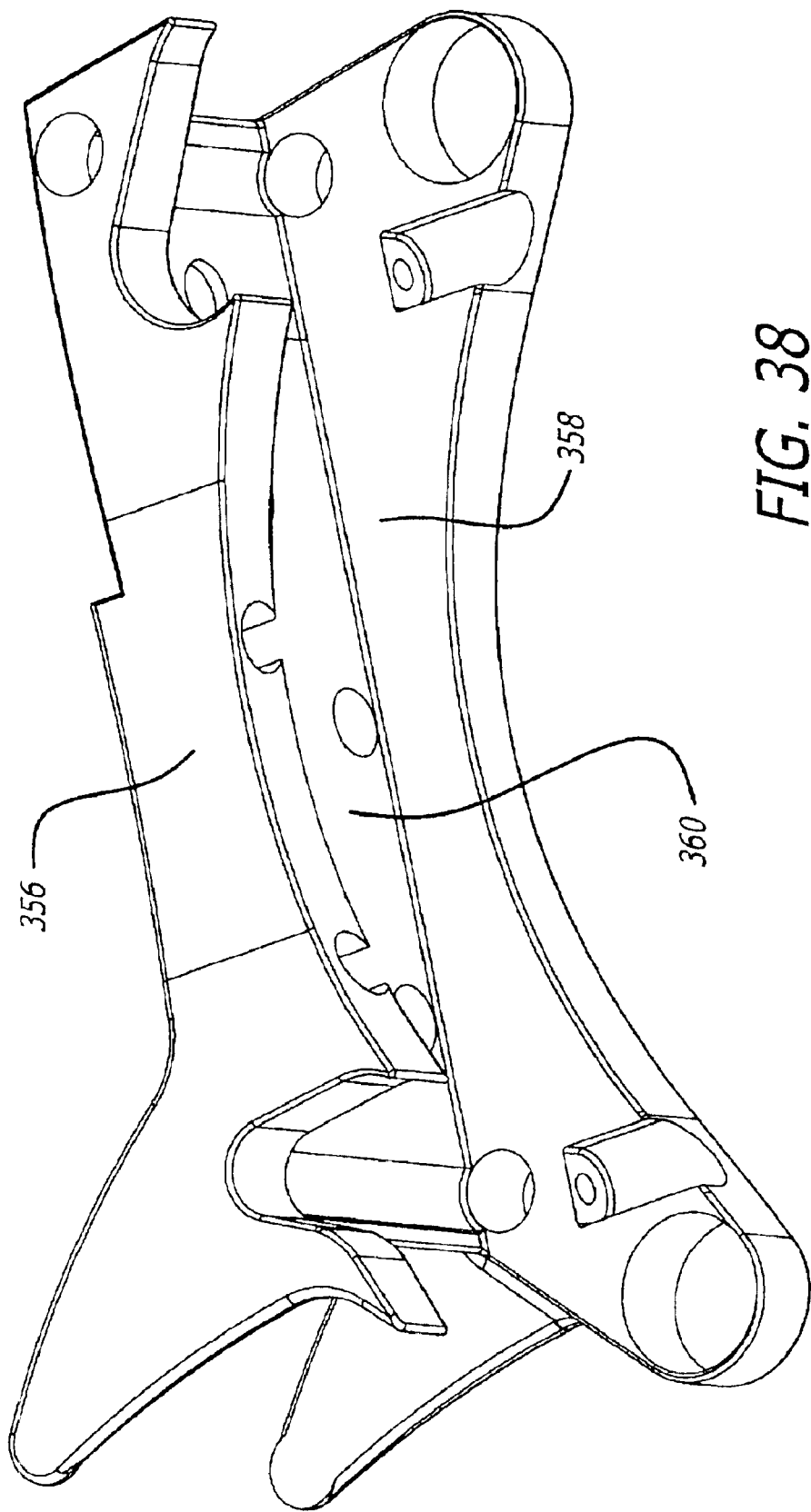
FIG. 38 is a lower right rear isometric view of the foam assembly of FIG. 37.
Figure 39:
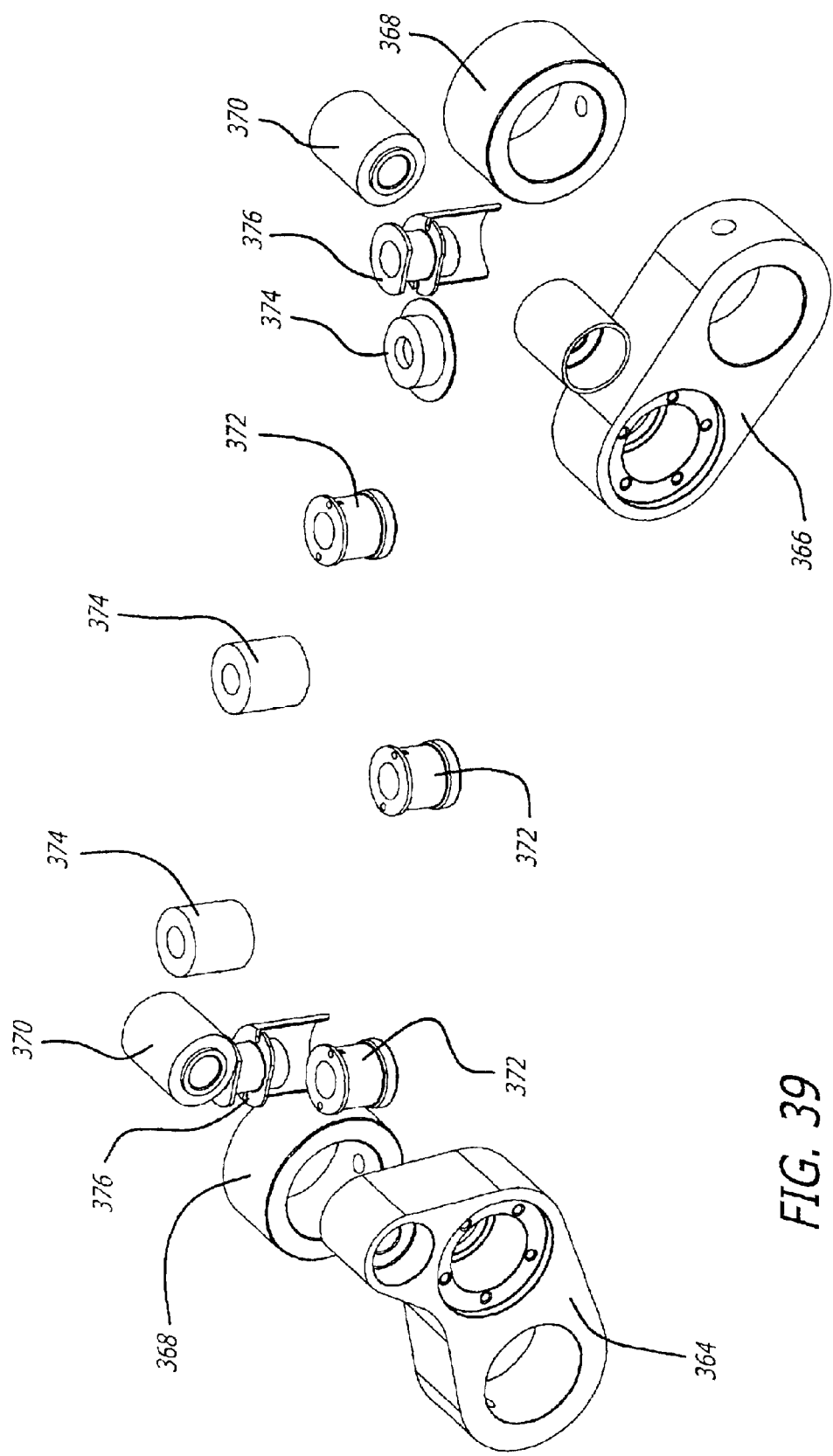
FIG. 39 is an upper right front isometric view of inserts for the carriage of FIG. 29A with the carriage of FIG. 30A shown in phantom.
Figure 40:
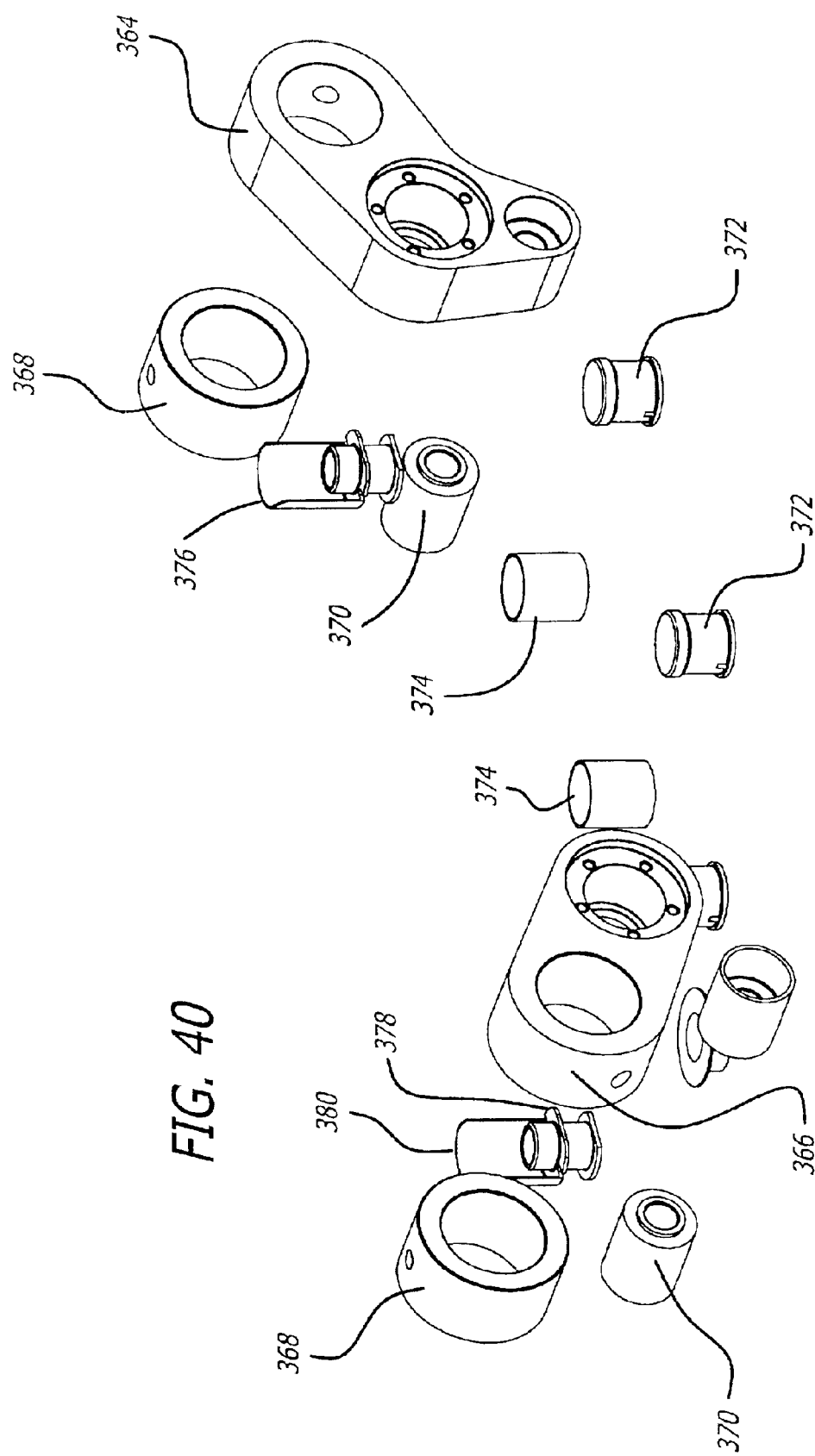
FIG. 40 is a bottom right front isometric view of the inserts of FIG. 39.
Figure 41:
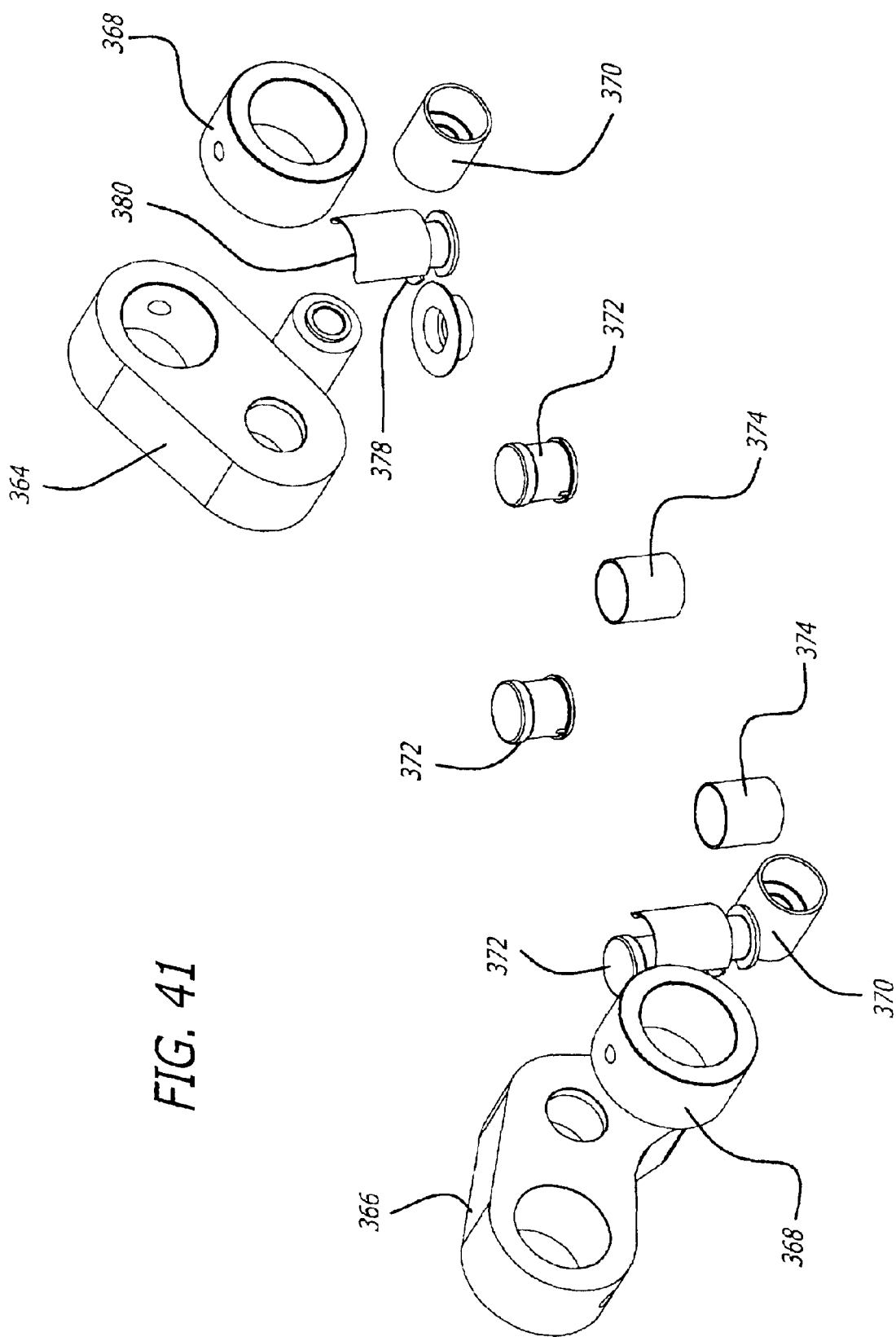
FIG. 41 is a bottom left rear isometric view of the inserts of FIG. 39.
Figure 42A:
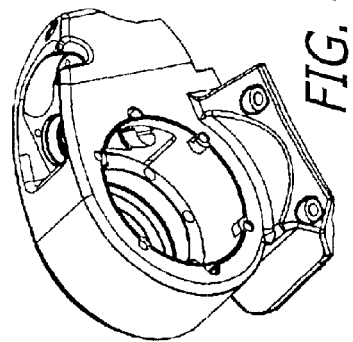
FIG. 42A is an upper right rear isometric view of a bearing housing for the saw of FIG. 3.
Figure 42B:
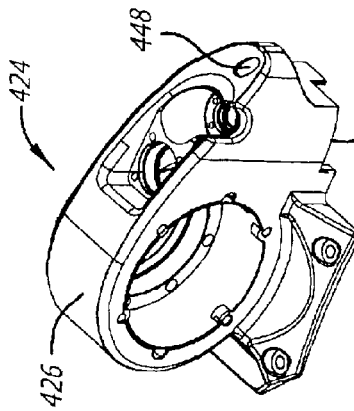
FIG. 42B is an upper right front isometric view of the bearing housing of FIG. 42A.
Figure 42C:
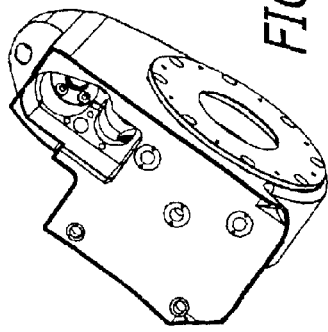
FIG. 42C is a bottom and left side isometric view of the housing of FIG. 42A.
Figure 42H:
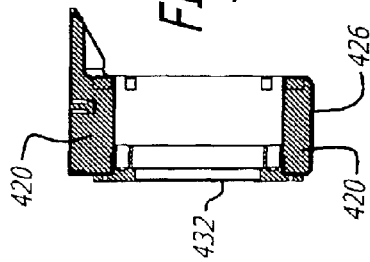
FIG. 42H is a vertical transverse section of the housing of FIG. 42E taken along line A—A.
Figure 42I:
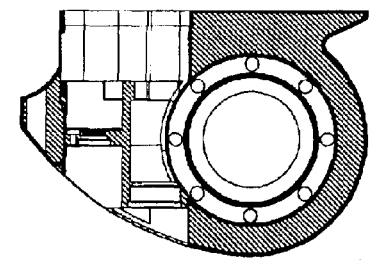
FIG. 42I is a vertical longitudinal cross-section of the housing of FIG. 42E taken along line B—B.
Figure 42E:
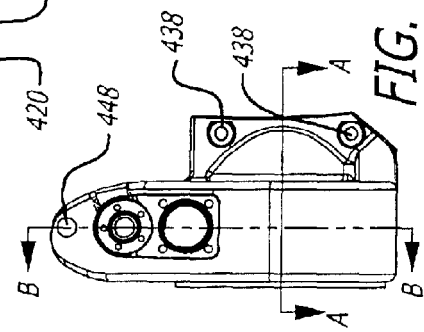
FIG. 42E is a top plan view of the housing of FIG. 42A.
Figure 42D:
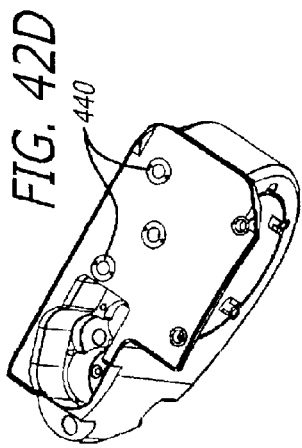
FIG. 42D is a bottom man right side isometric view of the housing of FIG. 42A.
Figure 42F:
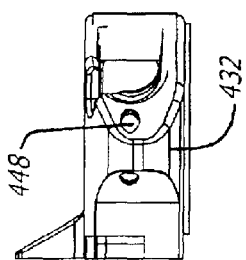
FIG. 42F is a front sideways view of the housing of FIG. 42A.
Figure 42G:
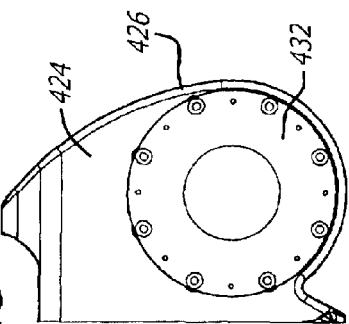
FIG. 42G is a left side elevation view of the housing of FIG. 42E.
Figure 44:
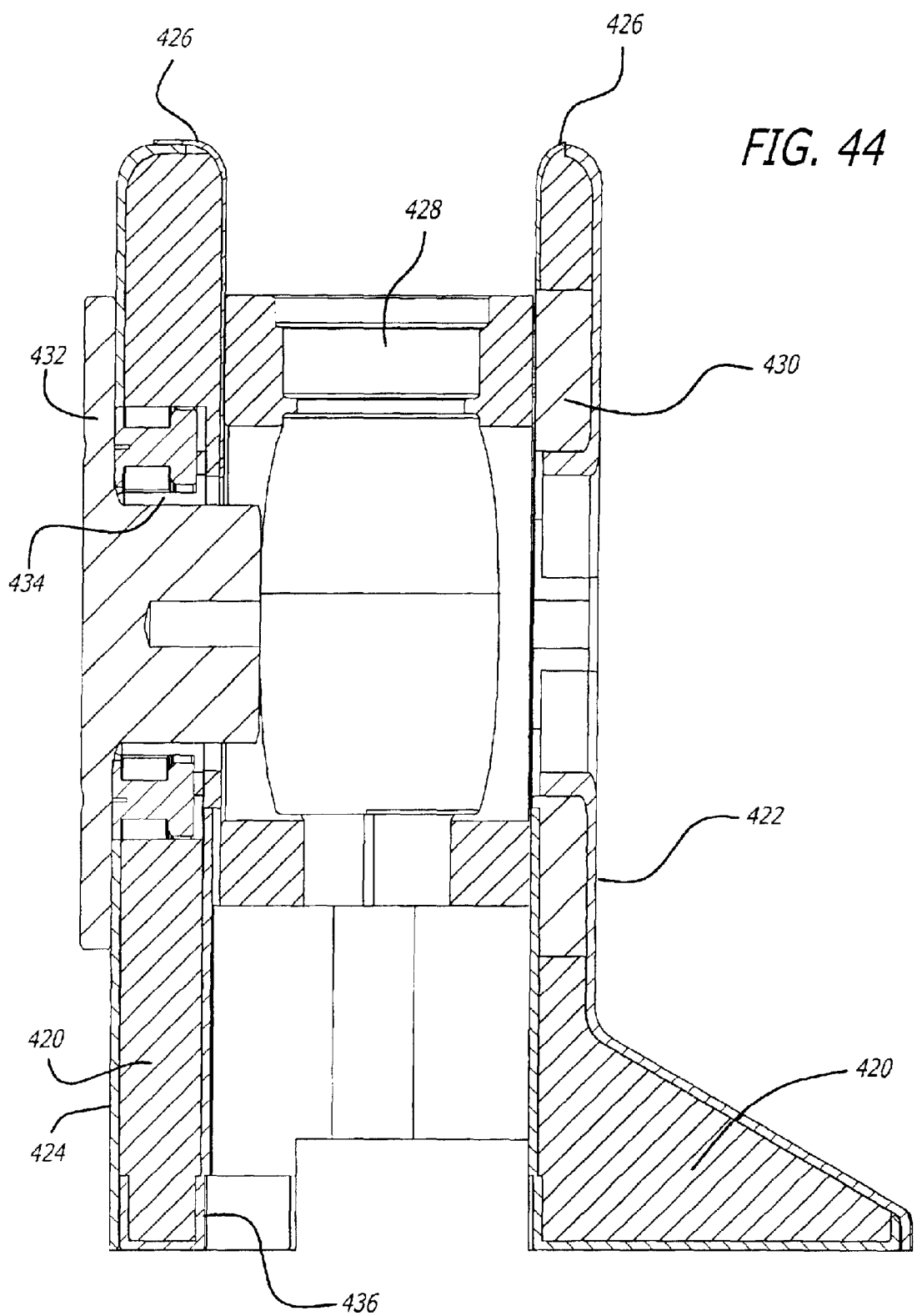
FIG. 44 is a vertical transverse section.
Figure 45:
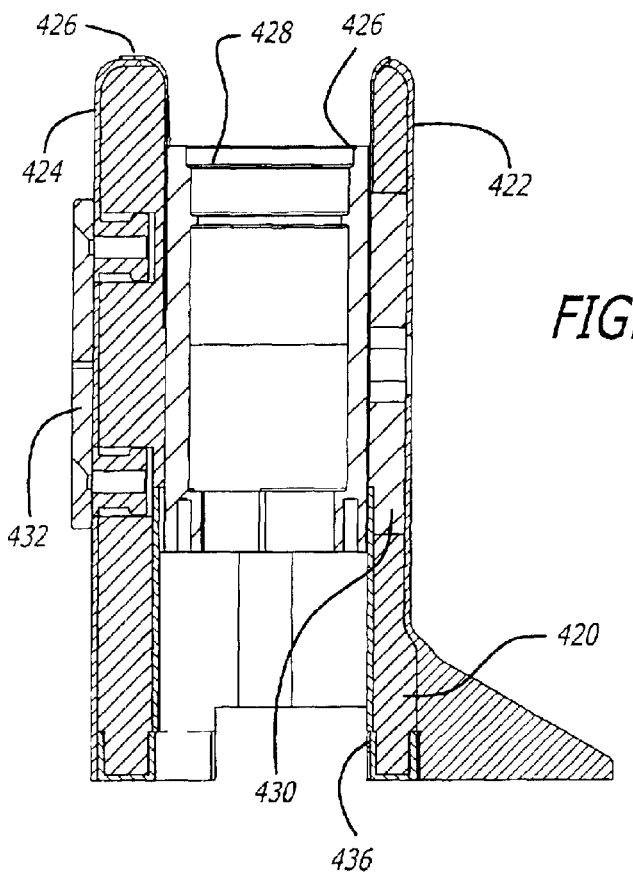
FIG. 45 is a right rear isometric view of a vertical transverse section of the bearing housing of FIG. 42A.
Figure 46:
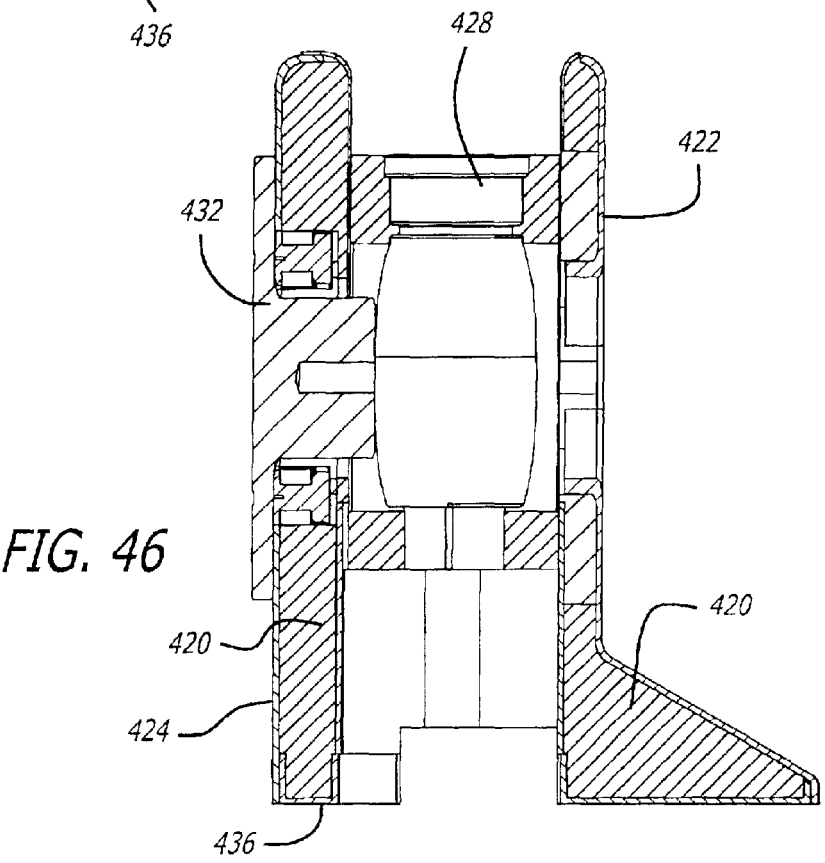
FIG. 46 is a right rear or isometric view of a vertical transverse section of the bearing housing of FIG. 42A.
Figure 47:
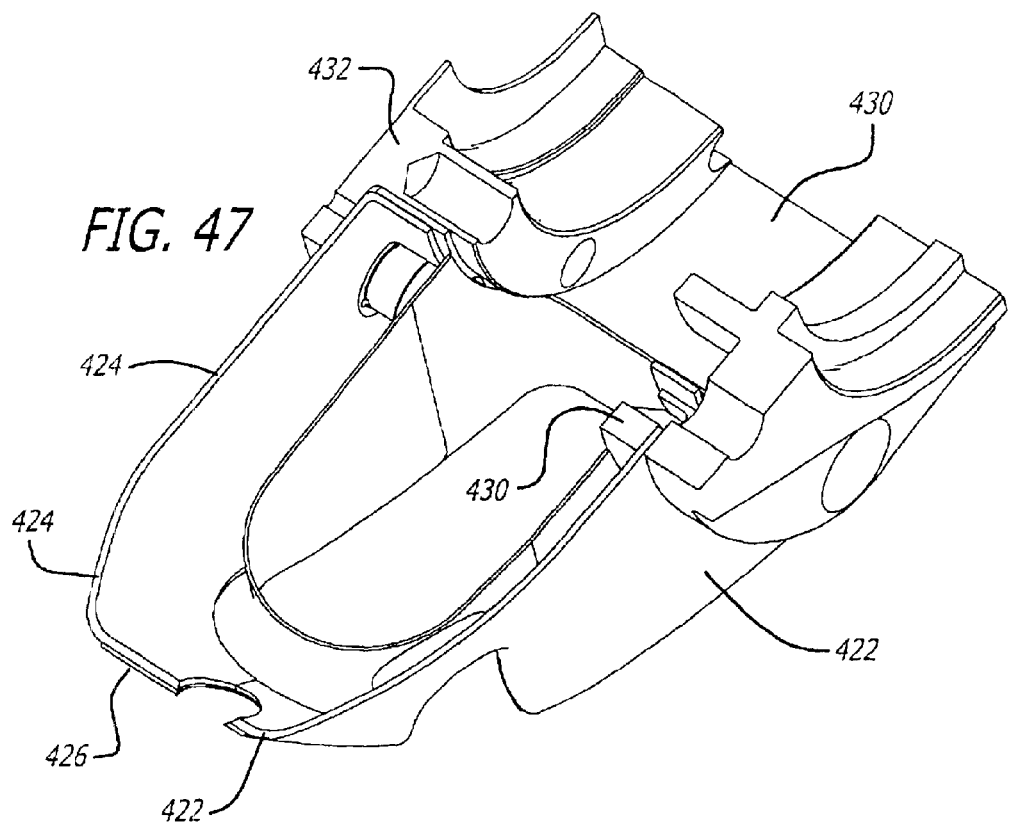
FIG. 47 is a bottom right isometric view of a horizontal longitudinal section of the bearing housing of FIG. 42A.
Figure 48:
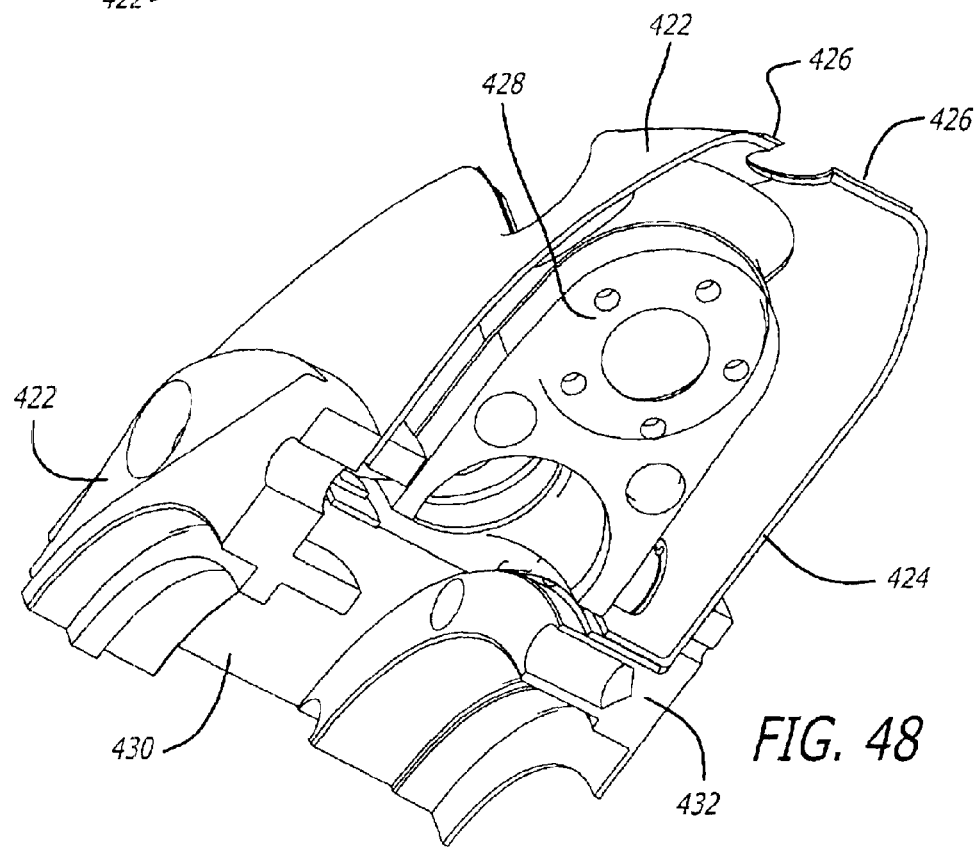
FIG. 48 is a bottom right isometric view of a horizontal longitudinal section of the bearing housing of FIG. 42A.
Figure 49A:
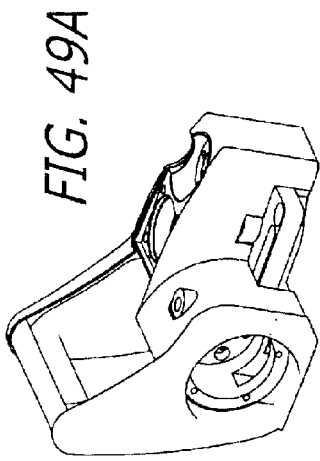
FIG. 49A is a left rear isometric view of a travel housing for the saw of FIG. 3.
Figure 49B:
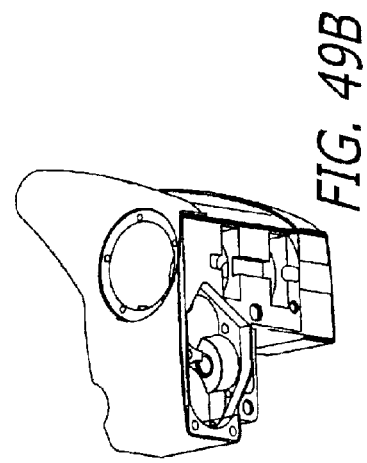
FIG. 49B is a bottom right rear isometric view of the travel housing of FIG. 49A.
Figure 49C:
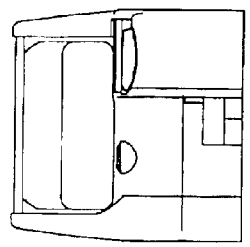
FIG. 49C is a front elevation view of the housing of FIG. 49A.
Figure 49G:
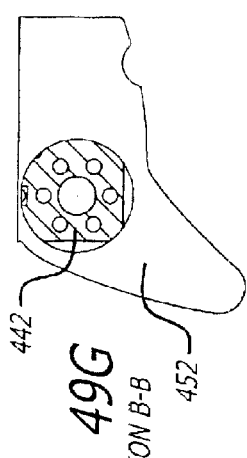
FIG. 49G is a vertical longitudinal section of the housing of FIG. 49F taken long line B—B.
Figure 49F:
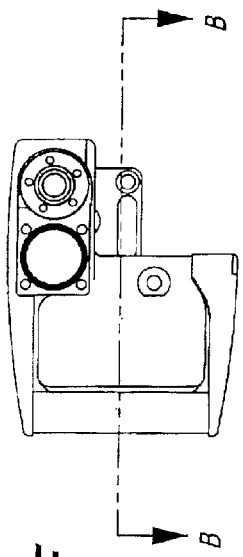
FIG. 49F is a top plan view of the housing of FIG. 49A.
Figure 49D:
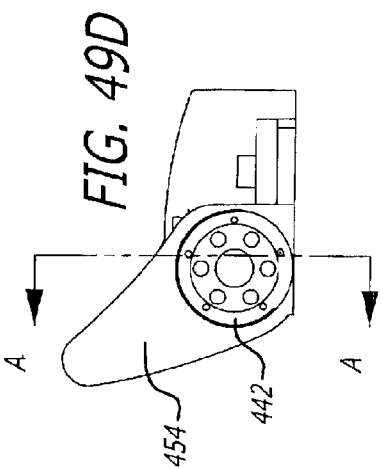
FIG. 49D is a left side elevation view of the housing of FIG. 49A.
Figure 49E:
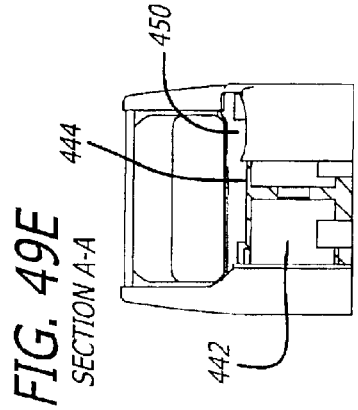
FIG. 49E is a vertical transverse section of the housing of FIG. 49D taken along line A—A.
Figure 51:
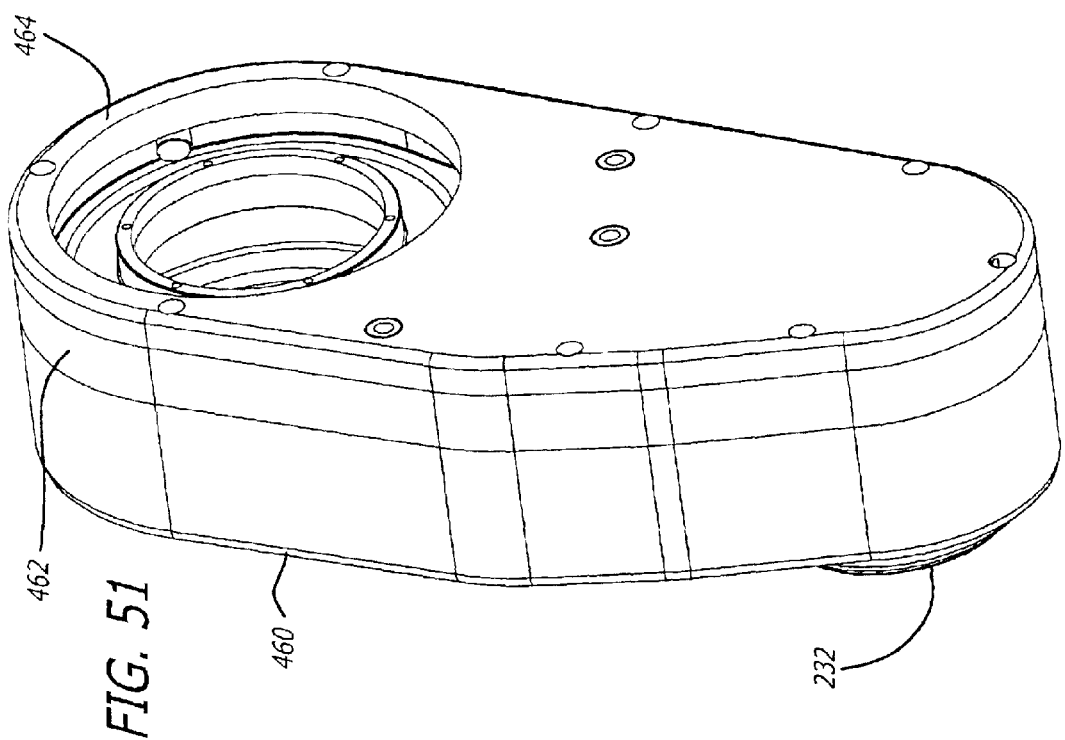
FIG. 51 is a left front isometric view of the gearbox of FIG. 50.
Figure 50:
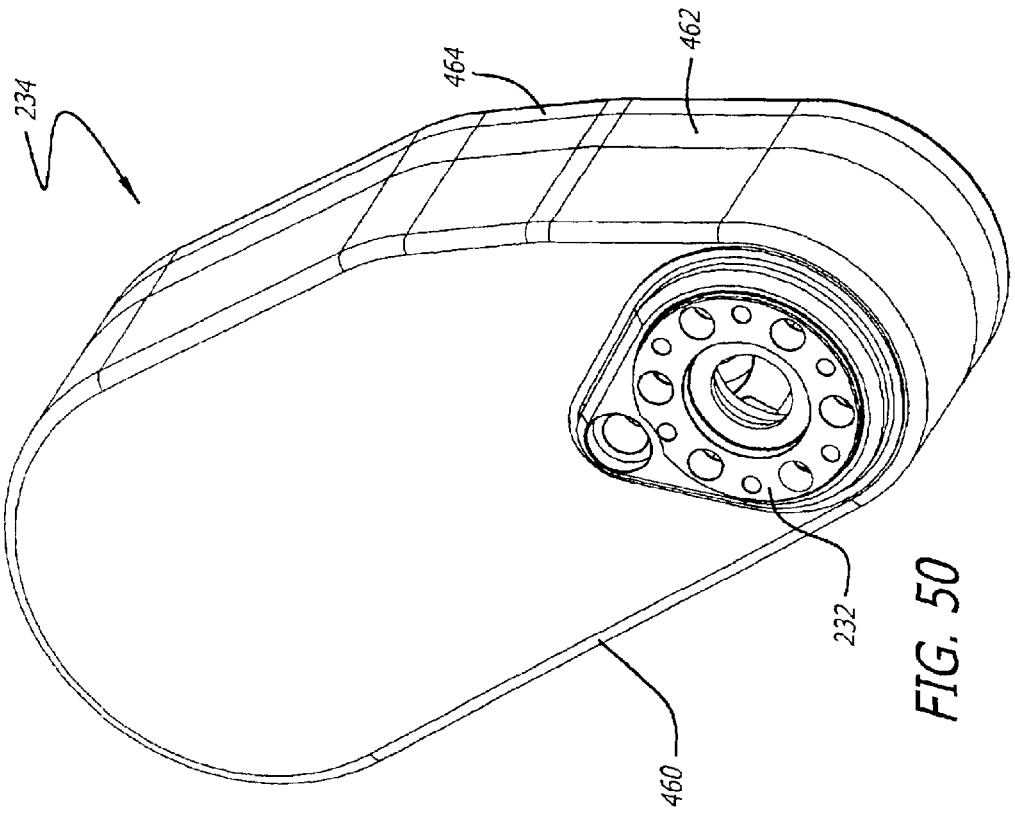
FIG. 50 is a bottom right isometric view of the gearbox for the saw of FIG. 3.

The carriage preferably includes a plurality of metal inserts for receiving moving components and/or fasteners or other components that do not bond or adhere well to the foam or the skin, but adhere better to the metal inserts. The inserts are preferably titanium AL46V or hard anodized 2024 T351 aluminum. As shown in FIGS. 39–41, the carriage inserts include roller inserts 364 and 366, roller inserts 368 and roller inserts 370. The carriage inserts also include heli-coil or re-thread inserts 372 for receiving aluminum fasteners. The inserts 372 are preferably substantially identical in geometry. The carriage also includes cap screw inserts 374, preferably having identical geometry's, and a third cap screw 374 having a flange for providing greater strength and support. The carriage may also include roller supports 376 having a flange 378 and a hemi-cylindrical wall 380 for providing added support and strength. Wherever any of the inserts are adjacent a foam surface or a skin surface, a suitable layer of adhesive is preferably applied in between the bond the inserts to any adjacent surface. As shown in FIGS. 37–38, the openings for receiving the cap screw inserts and the heli-coil inserts have foam surfaces to which the adhesive is applied at the same time as the insert. Similar comments applied to other inserts for the various housings. Likewise, any inserts surfaces adjacent a skin surface also have an adhesive layer applied to bond between the insert surface and the skin surface. Therefore, for example, the wall 380 of the insert 376 is adhered to the adjacent foam surface for support and strength. Likewise for the other surfaces of the inserts adjacent foam, and for the surfaces adjacent skin. The inserts can take a number of forms, preferably increasing the surface area of contact and also increasing the shear strength. For the fastener inserts, for example, the inserts may be formed with flanges extending over the skin surface opposite the direction from which the fastener is received. Alternatively, the ends of the insert may be flush with the foam surfaces and the adjacent skin extend over the ends of the insert to the opening of the insert. In this configuration, the sides of the insert are bonded to the foam and the ends of the insert are bonded to the overlying skin surfaces.

Figure 31:
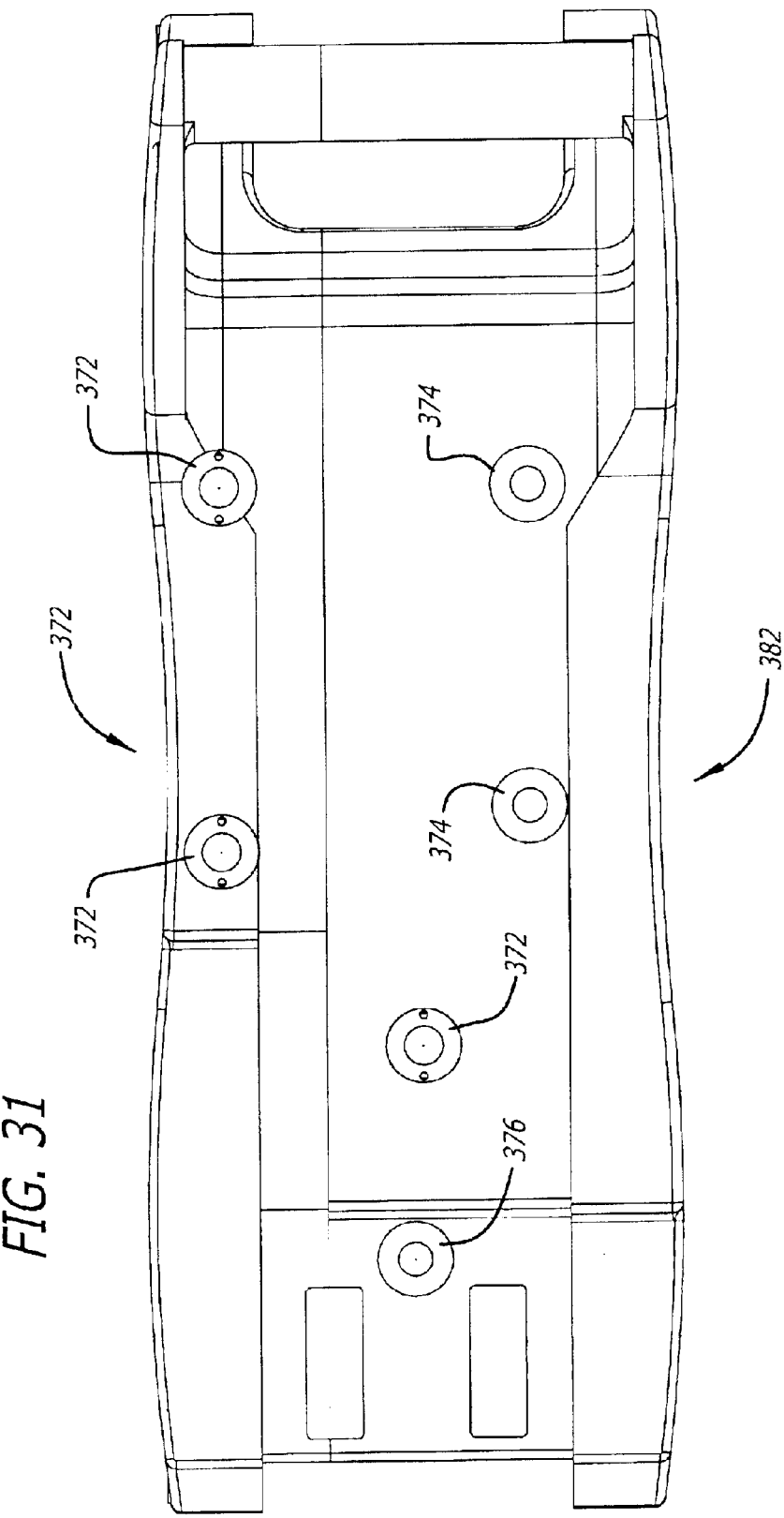
FIG. 31 is a top plan view and partial cutaway of the carriage of FIG. 30A.
Figure 32:
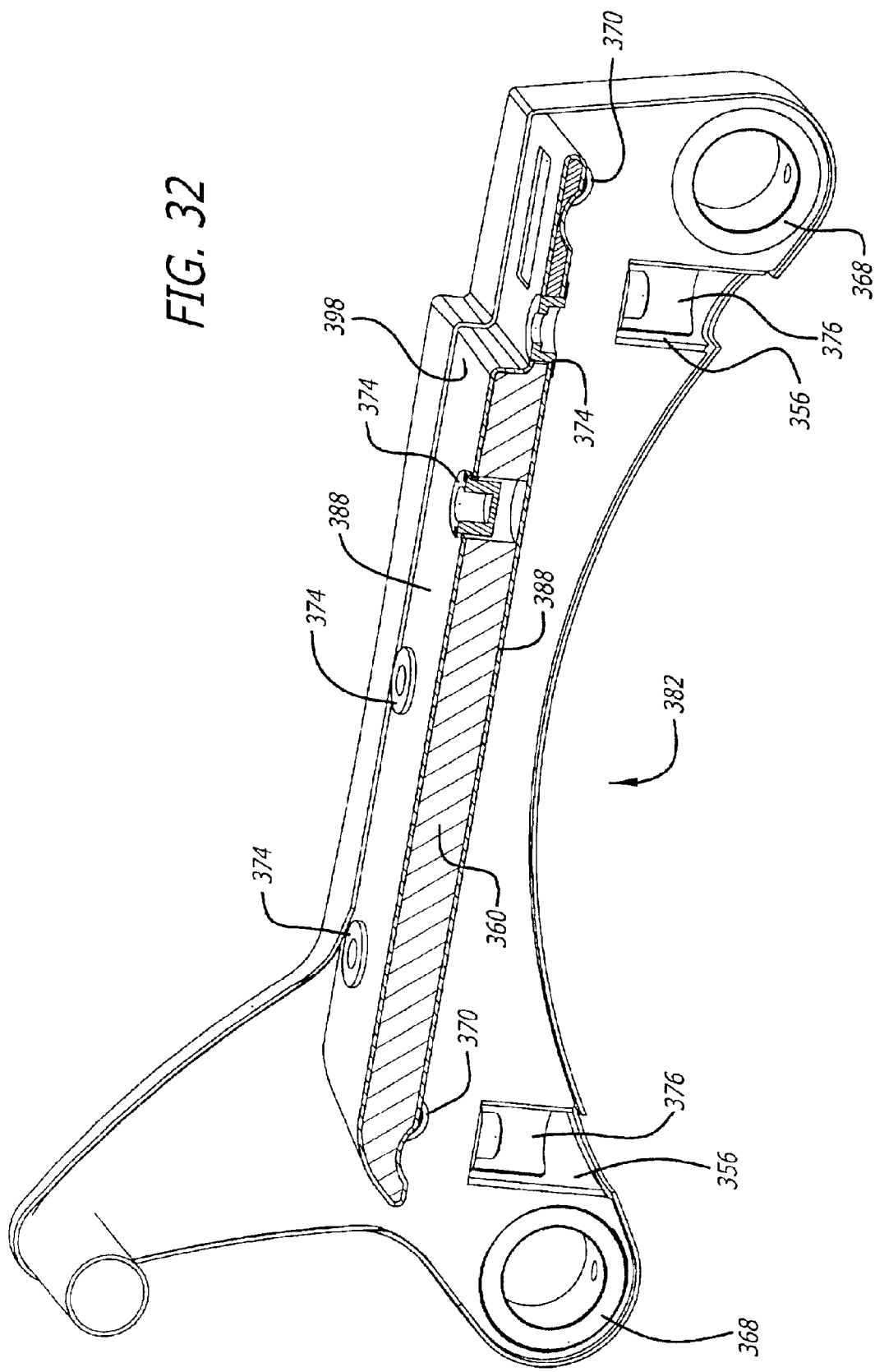
FIG. 32 is an upper right front isometric and vertical longitudinal cross-section of the carriage of FIG. 30A.

As shown in FIGS. 30E and 31, the sides of the carriage are preferably curved inward in a vertical plane centered along a vertical axis at approximately the center 382 of the length of the carriage. The sides of the carriage are also preferably curved in a horizontal plane centered along a horizontal transverse axis, as can be seen in FIG. 30I. The curvature, including the combined curvature, provides increased strength and structural support for the carriage.

The skins of the carriage, as well as the skins of the other housing components, are preferably formed from a carbon fiber composite with the epoxy resin, the skins having the characteristics set forth in the table below. The skins are preferably formed to maximize strength, durability and structural integrity. In one example, the left skin 384 is preferably formed to have a U-shaped cross-section at many of the vertical or transverse locations along the skin (see FIG. 33) so as to allow overlapping or lap joints 386 with adjacent skins, such as the center skin 388. A 0.005 inch gap designed into the skins is filled with a suitable adhesive to bond the lap joints or other joints. In the example shown in FIGS. 33–36, the lap joints are substantially continuous about each laterally-extending walls of the skins forming the lap joint, except for those locations where openings are formed for receiving inserts or other components, such as opening 390. To the extend that a given surface on the carriage or other housing is not straight, such as at the base 392 (FIG. 34) for receiving the travel housing, the overlapping surfaces of the left and center skins follow the contour, thereby enhancing the integrity of the structure. Similar comments apply with respect to the right skin 394 and the lap joints 396 and 398 with the center skin 388.

Considering the carriage housing, as assembled, the joined materials and surfaces will often include a first skin 400 adjacent a second skin 402 and between which adhesive layer 404 is applied. The second skin 402 is adjacent a portion of foam core material and an adhesive layer is placed between the two. Additionally, an adhesive layer is placed between the outer skin wall 406 and the adjacent foam wall 408, and adhesive layer is placed between the opposite skin wall 410 and the adjacent foam surface 412. An adhesive layer is also placed at 362 between adjacent foam portions. The top surface 414 of the foam section also includes an adhesive layer between the it and the adjacent surface 416 of the center skin 388, and adhesive layer is placed in the lap joint 386 between the center skin and the top horizontal surface of the left skin. Consequently, adhesive layer surrounds the foam core portion and also extends between the lap joints to provide strength and structural integrity. Similar structures exist with other combinations of foam, skin and lap joints to form a housing for supporting machine components.

The bearing housing 352 (FIGS. 42A–48) preferably includes machine closed cell foam cores 420, a right skin 422, a left skin 424 and a top skin 426, bonded and joined in ways similar to those described with respect to the carriage housing. The bearing housing also includes a main insert 428 for receiving and supporting a hydraulic motor. The housing also includes a hydraulic motor mount insert 430 for supporting the main hydraulic motor 168. The housing also includes a blade guard level ring gear insert 432 for supporting ring gear 238. A composite cylindrical tube 434, about 0.030 inch in wall thickness, extends from the left skin 424 to the outside surface of the right skin 422, to help support insert 432 and the hydraulic motor mount insert 430, as well as to help support the hydraulic motor. The tube 434 may be notch or cut to accommodate various surfaces to which it is adjacent. The tube is also bonded with a suitable layer of adhesive to adjacent surfaces. The bearing housing also includes a bottom skin 436. The skins, foam and inserts are preferably formed, configured and assembled into manner similar to that described above with respect to the carriage housing.

Additionally inserts may include cap screw inserts 438 for mounting the bearing housing to the carriage. Heli-coil inserts 440 may also be set in the bottom foam 420 through the bottom skin 436, also for mounting the bearing housing to the carriage.

The travel housing 354 preferably includes a travel gear insert 442 (FIGS. 49D and 49G) and transfer housing foam 444 around the insert 442. The foam includes a fastener insert 446 for receiving a fastener through the cap screw insert 448 (FIG. 42B) in the bearing housing. A travel motor mount 450 is also set into foam and secured with adhesive. Right skin 452 and left skin 454 are bonded to the foam and inserts in a manner similar to that described above with respect to the carriage housing.

Figure 52:
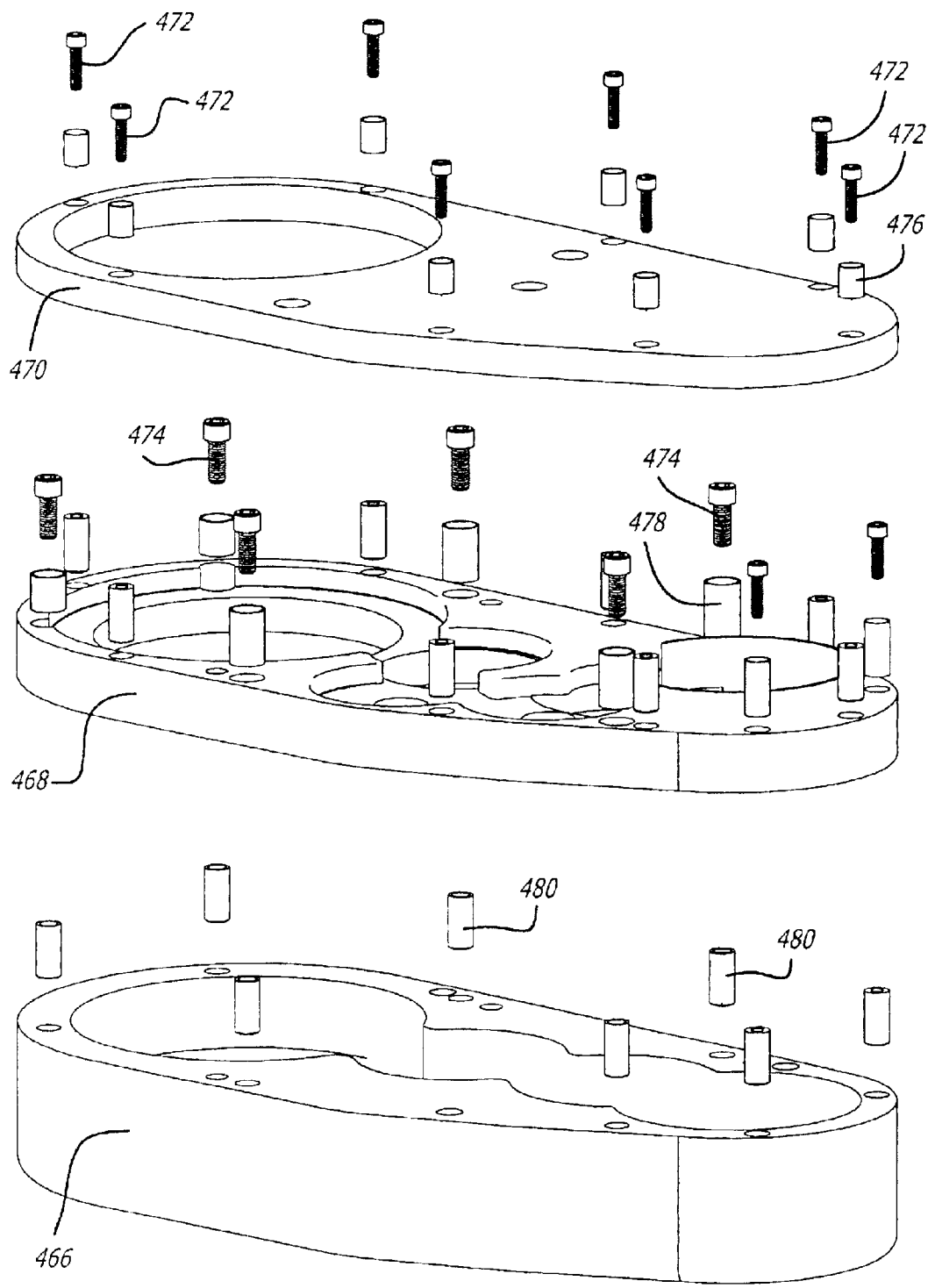
FIG. 52 is an exploded view of one embodiment of components of a gearbox housing for the gearbox of FIG. 50.

The gear box 146 includes the housing assembly 234 having in the present example an inner section 460, an intermediate section 462 and an outer section 464. The housing supports the saw blade drive gears and bearings and seals as well as the blade guard level gear train, bearings and seals. In one example, the sections 460,462 and 464 are formed from composite skin covered foam sections such as inner foam section 466, intermediate foam section 468, and outer foam section 470 for supporting metal inserts for fasteners and metal inserts for bearing assemblies, seals and the like (FIG. 52). The fasteners 472 and 474 engage respective inserts 476 and 478 and 480 to assemble and hold the three sections together. The inserts and the foam are bonded together with a suitable adhesive layer in a manner similar to that described above with respect to the carriage housing.

Each section may be formed as a composite assembly in ways similar to those described above with respect to the other housing assemblies. The inner section 460 is formed from the foam core 466 (FIG. 52) and covered with a composite skin. In one example, the skin on the inner section 460 is a double composite skin, and in another example, the skin on the inner section 460 is approximately twice the thickness of the 0.060 inch skins. As with the previous housings, the foam core is milled or cut to the desired shape for receiving the metal inserts, such as mounting bracket 232, and the bearing supports 482, 484 and 486 for receiving corresponding bearing assemblies. The inserts are bonded into the inner section 460 with a suitable adhesive layer.

The intermediate section 462 may also be formed from a composite skin over a milled foam core for receiving respective metal inserts 488, 490, 492 and 494. The inserts receive respective bearing assemblies, seals or other structures. The composite skin and the foam are adhesively bonded, and the inserts are adhesively bonded to the intermediate section. The outer section 464 is formed in a similar manner by taking a milled foam core and bonding the inserts 476 into respective openings and covering the assembly with a composite skin.

In an alternative construction, the intermediate section can be formed by milling a lightweight metal such as the aluminum referred to herein to have the desired surface shape and configuration for receiving the corresponding bearing assemblies, seals and other components.

The inner, intermediate and outer sections can then be assembled with the corresponding gear trains, bearings, seals and other components for the final gear box assembly.

| Fabric | | | |
|---|---|---|---|
| | Description | | 3K-135-8HS |
| | Fiber areal weight | | 366 +/− 14 GRAMS/ SQUARE METER |
| | Yarns per inch | | 24 × 23 |
| | yarn size | | 3000 FILAMENTS |
| | weave style | | 8 Harness satin |
| Fiber | Material | | carbon |
| | Number of filaments | | 3000 |
| | Tensile Strength (ksi) | | 512 |
| | Tensile Modulus (ksi) | | 33.4 |
| | Elongation % | | 1.5 |
| | Yield g/1000 m | | 198 |
| | Density g/cubic meter | | 1.76 |

-continued

| Fabric | | |
|---|---|---|
| Resin | material | epoxy |
| | density (g/cc) | 1.2290 |
| | Tg (from G" DMA Curve, F.) | 270.00 |
| | Tensile Modulus (ksi) | 440.00 |
| | Tensile Strength (ksi) | 10.70 |
| | Elongation at Break (%) | 4.00 |
| | Tg after 24-Hr water boil F. | 169.00 |
| | Water Absorption % | 3.90 |
| Adhesive | Material | epoxy |
| | lap shear strength R.T. | 4700.00 psi |
| | lap shear strength 250 | 3000.00 psi |
| | Tensile Properties @ R.T. | 6000.00 psi |
| | Tensile Properties @ 225 | 3000.00 psi |
| | Tensile Elongation @ R.T. | 3.10% |
| | Tensile Elongation @ 225 | 3.70% |
| | Compressive Properties @ RT | 10000.00 psi |
| | Compressive Properties @ 225 | 3700.00 psi |
| | Compressive Modulus @ R.T. | 300000.00 psi |
| | Compressive Modulus @ 225 | 200000.00 psi |
| Foam | Material | Closed cell polyurethane foam |
| | Temperature range | −320 to +275 |
| | CTE | 3.5 × 10−5 in/in/F. |
| | Closed cell content | 96% |
| | Thermal Conductivity (BTU/HR-ft2-F./in) | 0.302 |
| | Poisson's Ratio | 0.3 |
| | Hardness, Shore D 4 lbs/ft3 | 5.4 |
| | Hardness, Shore D 40 lbs/ft4 | 73 |
| | Tumbling Friability @ 4 lbs/ft3 | 22% |
| | Tumbling Friability @ 40 lbs/ft3 | 0.16% |
| | Water Absorption | .028 lbs/ft2 |
| | Dielectric constant | 1.4 @ 20 lbs/ft3 |
| | Compressive Strength parallel | 712 psi |
| | Compressive Strength perpendicular | 578 psi |
| | Compressive Strength parallel 250 deg F. | 281 psi |
| | Compressive Strength perpendicular 250 Deg. F. | 190 psi |
| | Compressive Modulus Parallel R.T. | 22203 psi |
| | Compressive Modulus Perpendicular R.T. | 14875 psi |
| | Compressive Modulus Parallel 250 deg. F. | 11853 Psi |
| | Compressive Modulus Perpendicular 250 Deg. F | 8060 Psi |
| | Shear Strength RT | 420 Psi |
| | Shear Modulus RT | 6400 Psi |
| | Tensile Strength RT | 570 Psi |
| | Tensile Modulus RT | 20785 Psi |
| | Flexural Strength RT | 864 Psi |
| | Flexural Modulus RT | 28220 Psi |
| | Density | 0.0056 lb/in³ |

Having thus described several exemplary implementations of the invention, it will be apparent that various alterations and modifications can be made without departing from the inventions or the concepts discussed herein. Such operations and modifications, though not expressly described above, are nonetheless intended and implied to be within the spirit and scope of the inventions. Accordingly, the foregoing description is intended to be illustrative only.

What is claimed is:

1. A wall saw comprising:

a carriage;

a gear housing supported by the carriage;

a saw blade supported by the gear housing;

a blade guard support supported by the gear housing and wherein the blade guard support is adapted to support a blade guard;

a transmission mechanism supported in part by the gear housing and including a first gear for transmitting movement of the gear housing to movement of the blade guard support relative to the gear housing;

a drive mechanism supported in part by the gear housing and including a second gear for transmitting drive movement from the carriage to produce rotation of the saw blade; and a first shaft supported by the gear housing and supporting both the first and second gears.

2. The saw of claim 1 further including a hollow coaxial shaft to which the second gear is mounted.

3. The saw of claim 1 wherein the first gear is mounted to the first shaft.

4. The saw of claim 3 wherein the first shaft supports a hollow shaft and wherein the second gear is mounted to the hollow shaft, and the first gear is mounted to the first shaft.

5. The saw of claim 4 further including at least one bearing assembly on the first shaft supporting the hollow shaft.

6. The saw of claim 1 wherein the first shaft is rotatable and the second gear is fixed relative to the first shaft and wherein rotation of the first shaft turns the saw blade.

7. The saw of claim 1 wherein the second gear is supported on the first shaft through bearings that allow the first shaft to rotate relative to the first gear.

8. The saw of claim 7 wherein the first gear is fixed relative to the blade guard support.

9. The saw of claim 8 wherein the first gear is configured so that movement of the gear housing relative to the carriage causes the first gear to move, which causes the blade guard support to move relative to the gear housing.

10. The saw of claim 9 further including a blade guard supported by the blade guard support so as to position the blade guard in a first orientation relative to the carriage, and wherein movement of the gear housing from a first position to a second position relative to the carriage does not change the first orientation of the blade guard.

11. The saw of claim 1 further including blade flanges holding the saw blade on the first shaft.

12. The saw of claim 1 wherein the first gear follows a third gear in the carriage that moves with the gear housing and further including a fourth gear coupled to the blade guard support and wherein the fourth gear moves with the first gear and wherein the gear ratio between the third and fourth gears is approximately 1:−1.

13. A wall saw comprising:

a carriage;

a saw drive mechanism associated with the carriage for moving the wall saw along a work surface;

a blade support movable relative to the carriage to move the blade closer to or away from a work surface;

a saw blade supported by and movable with the blade support relative to the carriage;

a saw blade drive mechanism for driving the saw blade and including a first drive element wherein the first drive element is supported by a first drive support for movement relative to an axis;

a blade guard support adapted to support a blade guard in a first orientation relative to the carriage; and a blade guard support linking the blade guard support to the carriage, wherein the blade guard support is adapted to maintain the blade guard in the first orientation when the blade support moves from a first position to a second position relative to the carriage, and wherein the blade guard support includes a first linkage element supported by the first drive support for movement relative to the axis.

14. A movable machine having a motor and a first drive mechanism for operating a tool and a transmission mechanism for operating a component of the machine, the drive mechanism including a first gear supported on the first support and the transmission mechanism including a second gear supported on a second support coaxial with the first support.

15. The movable machine of claim 14 wherein the first support is a shaft and the second support is a hollow shaft supported by the first shaft.

16. The movable machine of claim 15 wherein the tool is a saw blade.

17. The movable machine of claim 14 including a housing containing the first drive mechanism and the transmission mechanism, wherein the housing includes a first end portion having an input coupled to the motor and a second end portion spaced from the first end portion having an output coupled to a tool.

18. The movable machine of claim 17 wherein the housing includes a first side and a second side wherein the input is on the first side and the output is on the second side.

19. The machine of claim 14 wherein at least part of the transmission mechanism is supported by a gear housing, wherein the first drive mechanism operates a saw blade supported by the gear housing.

20. The machine of claim 19 wherein the first gear in the drive mechanism transmits drive movement from the drive mechanism to the saw blade and wherein the first gear is supported by a first hollow shaft.

21. The machine of claim 20 wherein the second gear in the transmission mechanism is supported on a second shaft extending within the first hollow shaft.

22. The machine of claim 21 further including a blade guard adjacent the saw blade supported by a blade guard support which in turn is supported by the gear housing, and wherein the second gear in the transmission mechanism is coupled to the blade guard support.

23. The machine of claim 22 further including a position element for controlling the position of the gear housing relative to the rest of the machine and wherein the second gear transmits movement of the position element to the blade guard support.

24. The machine of claim 23 wherein the transmission mechanism is configured so that the blade guard support maintains the blade guard in a given orientation relative to the machine between two different positions of the gear housing relative to the rest of the machine.

25. A wall saw comprising:

a housing;

a saw blade and a blade guard adjacent the saw blade wherein the blade guard includes an edge having a first orientation relative to a working surface;

a blade support for supporting the saw blade and positioning the saw blade relative to the working surface;

a blade guard support for supporting the blade guard adjacent the saw blade; and means for keeping the blade guard substantially in the first orientation when the saw blade moves from a first position to a second position relative to the working surface.

26. The saw of claim 25 wherein the means for keeping the blade guard substantially in the first orientation includes a gear.

27. The saw of claim 26 further including a plurality of gears having a ratio of 1:−1.

28. The saw of claim 25 further including a drive mechanism for moving the blade support relative to the working surface and wherein the means for keeping the blade guard substantially in the first orientation includes a plurality of gears including a first gear coupled to the drive mechanism and a second gear for moving the blade guard support, and wherein the plurality of gears are arranged so that clockwise rotation of the first gear produces counter clockwise rotation of the second gear.

29. The saw of claim 28 wherein the gear ratio between the first and second gears is approximately 1:–1.

30. The saw of claim 28 wherein the first gear engages a gear in the housing.

31. The saw of claim 28 further including a gear housing supporting at least the second gear in the plurality of gears, wherein the gear housing supported least a third gear for driving the saw blade and wherein the second and third gears are supported to be coaxial with respect to each other.

32. The saw of claim 31 wherein the second and third gears are supported by a common shaft.

33. The saw of claim 32 further including a blade mount supported on the common shaft and further including a fluid supply for supplying a fluid to the blade mount.

34. The saw of claim 32 wherein the common shaft is at least partly hollow.

35. The saw of claim 31 further including a drive element for the saw blade and a fourth gear driven through action of the drive element and wherein the first and fourth gears are supported in a gear housing.

36. The saw of claim 35 wherein the first and fourth gears are supported to be coaxial.

37. The saw of claim 35 wherein the first and fourth gears are supported on a common axis.

38. The saw of claim 37 wherein the first gear is supported on a first shaft and wherein the fourth gear is supported on a coaxial shaft and wherein the coaxial shaft is supported through bearings on the first shaft.

39. A saw having a motor having an output, a saw blade driven by the motor and a movable blade support movable to move the saw blade in a first direction and a second direction opposite the first direction, a blade guard movably supported by the blade support and a blade guard orientation control coupled to the movable blade support such that movement of the movable blade support keeps the blade guard orientation constant over a given range of movement of the blade support.

40. The saw of claim 39 wherein the movable blade support is a gear box including a drive train for driving the saw blade, and wherein the gear box supports the blade guard and wherein the blade guard orientation control includes a gear in the gear box.

41. The saw of claim 40 the motor includes a housing stationery relative to the motor and wherein the gear is coupled to a stationary gear in the housing.

42. The saw of claim 41 further including a blade guard support on the gear box coupled to the gear and wherein the gear ratio between the gear and the stationary gear in the housing is 1:–1.

* * * * *